(12) United States Patent
Fujisaki

(10) Patent No.: US 8,503,996 B1
(45) Date of Patent: *Aug. 6, 2013

(54) COMMUNICATION DEVICE

(76) Inventor: Iwao Fujisaki, Tokyo (JP)

( * ) Notice: Subject to any disclaimer, the term of this patent is extended or adjusted under 35 U.S.C. 154(b) by 293 days.

This patent is subject to a terminal disclaimer.

(21) Appl. No.: 12/979,528

(22) Filed: Dec. 28, 2010

Related U.S. Application Data

(63) Continuation of application No. 11/743,768, filed on May 3, 2007, now Pat. No. 7,890,089.

(51) Int. Cl.
H04M 3/42 (2006.01)
H04K 3/00 (2006.01)

(52) U.S. Cl.
USPC .............. 455/414.2; 455/456.1; 455/457

(58) Field of Classification Search
USPC .......... 455/414.2, 456.1, 456.3, 456.5, 456.6, 455/457
See application file for complete search history.

(56) References Cited

U.S. PATENT DOCUMENTS 7,890,089 B1 * 2/2011 Fujisaki .................. 455/414.2

* cited by examiner

Primary Examiner — Lee Nguyen

(57) ABSTRACT

The system comprising a first communication device and a second communication device, wherein when the door is locked by the first communication device, a door locked message is operable to be displayed on the first communication device and/or the second communication device, wherein when the door is unlocked by the first communication device, a door unlocked message is operable to be displayed on the first communication device and/or the second communication device, and wherein when a phone call is received by the first communication device, a phone call receiving log data is produced.

18 Claims, 1 Drawing Sheet

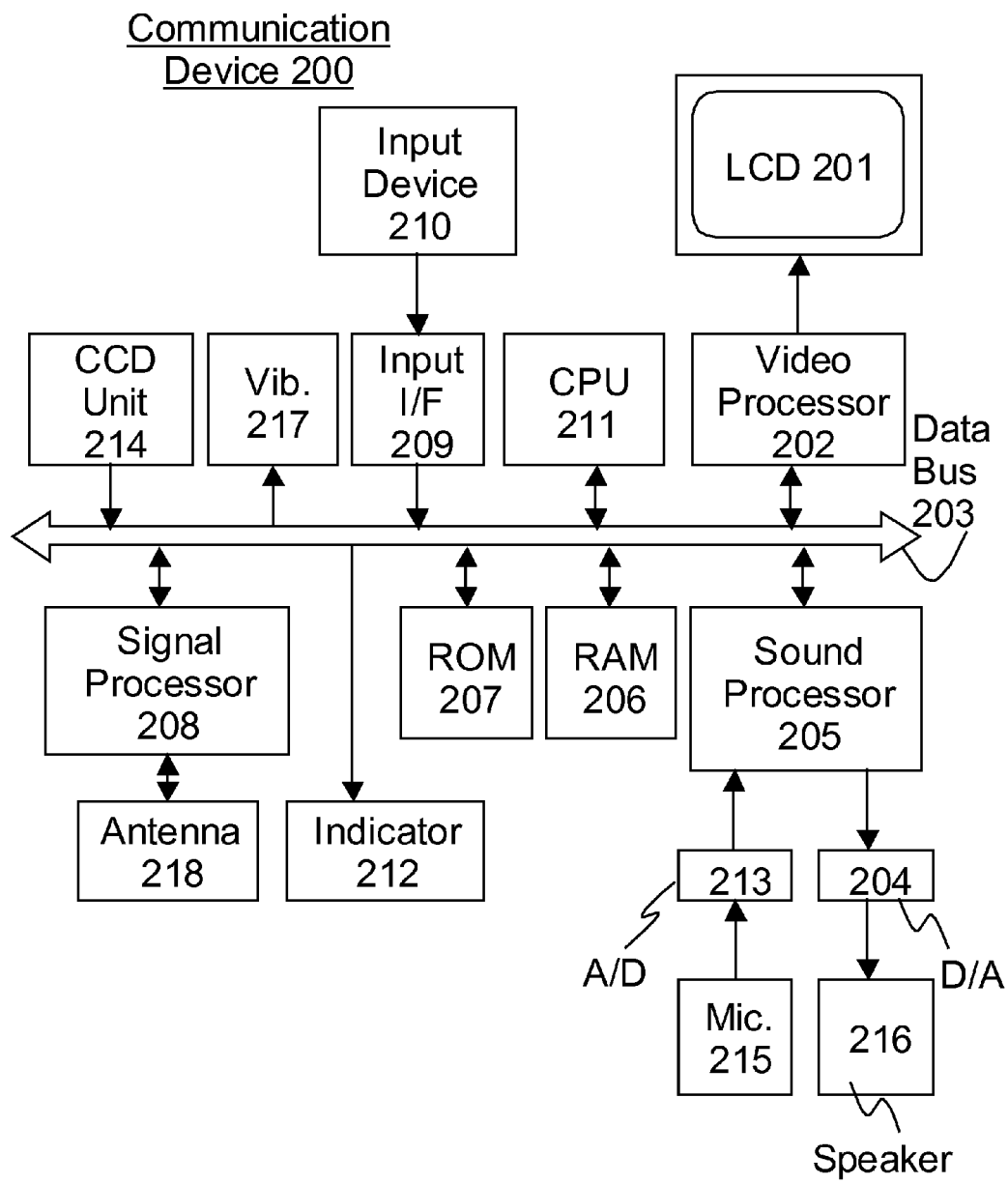

COMMUNICATION DEVICE

CROSS REFERENCE TO RELATED APPLICATIONS

This application is a continuation of U.S. Ser. No. 11/743,768, filed 2007 May 3 which is hereby incorporated herein by reference in its entirety.

BACKGROUND OF INVENTION

The invention relates to communication device and more particularly to the communication device which is capable to communicate with another communication device in a wireless fashion.

U.S. Patent Publication No. 20030045301 is introduced as prior art of the present invention of which the summary is the following: "The present invention is directed to an electronic system and method for managing location, calendar, and event information. The system comprises at least two hand portable electronic devices, each having a display device to display personal profile, location, and event information, and means for processing, storing, and wirelessly communicating data. A software program running in the electronic device can receive local and remote input data; store, process, and update personal profile, event, time, and location information; and convert location information into coordinates of a graphic map display. The system additionally includes at least one earth orbiting satellite device using remote sensing technology to determine the location coordinates of the electronic device. The electronic devices receive synchronization messages broadcast by the satellite device, causing the software program to update the personal profile, event, time, and location information stored in each hand portable electronic device". However, this prior art does not disclose the system comprising a first communication device and a second communication device, wherein when the door is locked by the first communication device, a door locked message is operable to be displayed on the first communication device and/or the second communication device, wherein when the door is unlocked by the first communication device, a door unlocked message is operable to be displayed on the first communication device and/or the second communication device, and wherein when a phone call is received by the first communication device, a phone call receiving log data is produced.

For the avoidance of doubt, the number of the prior arts introduced herein (and/or in IDS) may be of a large one, however, applicant has no intent to hide the more relevant prior art(s) in the less relevant ones.

SUMMARY OF INVENTION

It is an object of the present invention to provide a device capable to implement a plurality of functions.

It is another object of the present invention to provide merchandise to merchants attractive to the customers in the U.S.

It is another object of the present invention to provide mobility to the users of communication device.

It is another object of the present invention to provide more convenience to the customers in the U.S.

It is another object of the present invention to provide more convenience to the users of communication device or any tangible thing in which the communication device is fixedly or detachably (i.e., removably) installed.

It is another object of the present invention to overcome the shortcomings associated with the foregoing prior arts.

It is another object of the present invention to provide a device capable to implement a plurality of functions.

The present invention introduces the system comprising a first communication device and a second communication device, wherein when the door is locked by the first communication device, a door locked message is operable to be displayed on the first communication device and/or the second communication device, wherein when the door is unlocked by the first communication device, a door unlocked message is operable to be displayed on the first communication device and/or the second communication device, and wherein when a phone call is received by the first communication device, a phone call receiving log data is produced.

BRIEF DESCRIPTION OF DRAWINGS

The above and other aspects, features, and advantages of the invention will be better understood by reading the following more particular description of the invention, presented in conjunction with the following drawing, wherein:

FIG. 1 is a block diagram illustrating an exemplary embodiment of the present invention.

DETAILED DESCRIPTION

The following description is of the best presently contemplated mode of carrying out the present invention. This description is not to be taken in a limiting sense but is made merely for the purpose of describing the general principles of the invention. For example, each description of random access memory in this specification illustrate(s) only one function or mode in order to avoid complexity in its explanation, however, such description does not mean that only one function or mode can be implemented at a time. In other words, more than one function or mode can be implemented simultaneously by way of utilizing the same random access memory. In addition, the figure number is cited after the elements in parenthesis in a manner for example 'RAM 206 (FIG. 1)'. It is done so merely to assist the readers to have a better understanding of this specification, and must not be used to limit the scope of the claims in any manner since the figure numbers cited are not exclusive. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. The scope of the invention should be determined by referencing the appended claims.

FIG. 1 is a simplified block diagram of the Communication Device 200 utilized in the present invention. Referring to FIG. 1, Communication Device 200 includes CPU 211 which controls and administers the overall function and operation of Communication Device 200. CPU 211 uses RAM 206 to temporarily store data and/or to perform calculation to perform its function, and to implement the present invention, modes, functions, and systems explained hereinafter. Video Processor 202 generates analog and/or digital video signals which are displayed on LCD 201. ROM 207 stores the data and programs which are essential to operate Communication Device 200. Wireless signals are received by Antenna 218 and processed by Signal Processor 208. Input signals are input by Input Device 210, such as a dial pad, a joystick, and/or a keypad, and the signals are transferred via Input Interface 209 and Data Bus 203 to CPU 211. Indicator 212 is an LED lamp which is designed to output different colors (e.g., red, blue, green, etc). Analog audio data is input to Microphone 215. A/D 213 converts the analog audio data into a digital format. Speaker 216 outputs analog audio data which is converted into an analog format from digital format by D/A 204. Sound Processor 205 produces digital audio signals that are transferred to D/A 204 and also processes the digital audio signals transferred from A/D 213. CCD Unit 214 captures video image which is stored in RAM 206 in a digital format. Vibrator 217 vibrates the entire device by the command from CPU 211.

As another embodiment, LCD 201 or LCD 201/Video Processor 202 may be separated from the other elements described in FIG. 1, and be connected in a wireless fashion to be wearable and/or head-mountable.

When Communication Device 200 is in the voice communication mode, the analog audio data input to Microphone 215 is converted to a digital format by A/D 213 and transmitted to another device via Antenna 218 in a wireless fashion after being processed by Signal Processor 208, and the wireless signal representing audio data which is received via Antenna 218 is output from Speaker 216 after being processed by Signal Processor 208 and converted to analog signal by D/A 204. For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218. The definition of Communication Device 200 further includes any micro device embedded or installed into devices and equipments (e.g., VCR, TV, tape recorder, heater, air conditioner, fan, clock, micro wave oven, dish washer, refrigerator, oven, washing machine, dryer, door, window, automobile, motorcycle, and modem) to remotely control these devices and equipments. The size of Communication Device 200 is irrelevant. Communication Device 200 may be installed in houses, buildings, bridges, boats, ships, submarines, airplanes, and spaceships, and firmly fixed therein.

Paragraph [0024]—This Paragraph [0024] illustrate(s) the elements of Communication Device 200. The elements of Communication Device 200 described in this Paragraph [0024] is identical to the ones described in FIG. 1, except Communication Device 200 has new element, i.e., LED 219. Here, LED 219 receives infra red signals from other wireless devices, which are transferred to CPU 211 via Data Bus 203. LED 219 also sends infra red signals in a wireless fashion which are composed by CPU 211 and transferred via Data Bus 203. As the second embodiment, LED 219 may be connected to Signal Processor 208. Here, LED 219 transfers the received infra red signals to Signal Processor 208, and Signal Processor 208 processes and converts the signals to a CPU readable format which are transferred to CPU 211 via Data Bus 203. The data produced by CPU 211 are processed by Signal Processor 208 and transferred to another device via LED 219 in a wireless fashion. The task of LED 219 is as same as that of Antenna 218 described in FIG. 1 except that LED 219 utilizes infra red signals for implementing wireless communication in the second embodiment. For the avoidance of doubt, the reference to FIG. 1 (e.g., referring to FIG. 1 in parenthesis) automatically refers to this Paragraph [0024] in this specification.

Paragraph [0025]—This Paragraph [0025] illustrate(s) the data stored in Host H. In the present embodiment, Host H includes Host Information Storage Area H00a which stores various types of data to assist and/or co-operate with Communication Device 200 to implement all modes, functions, and systems described in this specification. As another embodiment, Host H may be composed of a plurality of computers, i.e., one master computer and a plurality of slave computers, wherein the master computer is connected to the plurality of slave computers. As another embodiment, Host H may also be composed of a plurality of master computers by way of utilizing peer-to-peer connection.

Paragraph [0026]—<<Phone Call Making Log Recording Function>>

Paragraph [0027]—Paragraph [0028] through Paragraph [0075] illustrate the phone call making log recording function, wherein when the voice communication mode is implemented, a phone call making log data is produced. The phone call making log data includes the selected phone number data to which the phone call was made, the current time data at the time the phone call was made, the 1st location data at the time the phone call was made, and/or the 2nd location data at the time the phone call was made. Here, the 1st location data indicates the geographic location of Device A. The 2nd location data indicates the geographic location of Device B. Each of Device A and Device B is Communication Device 200. When the phone call making log data is selected, the selected phone number data to which the phone call was made and the current time data at the time the phone call was made are displayed on LCD 201 (FIG. 1) of Device A, and the 1st location data and the 2nd location data at the time the phone call was made are indicated on the map displayed on LCD 201 (FIG. 1) of Device A.

Paragraph [0028]—This Paragraph [0028] illustrates the major elements utilized to implement the present function. In the present embodiment, Host H (Paragraph [0025]) is connected to Network NT (e.g., the Internet). Device A, a Communication Device 200, is connected to Network NT (e.g., the Internet) in a wireless fashion. Device B, another Communication Device 200, is connected to Network NT (e.g., the Internet) in a wireless fashion. Host H (Paragraph [0025]), Device A, and Device B are capable to communicate with each other via Network NT (e.g., the Internet) to implement the present function. Device A and Device B are also capable to communicate with each other directly in a wireless fashion to implement the present function.

Paragraph [0029]—This Paragraph [0029] illustrates the storage area included in Host H (Paragraph [0025]). In the present embodiment, Host H (Paragraph [0025]) includes Phone Call Making Log Recording Information Storage Area H572a of which the data and the software program(s) stored therein are described in Paragraph [0030].

Paragraph [0030]—This Paragraph [0030] illustrates the storage area(s) included in Phone Call Making Log Recording Information Storage Area H572a (Paragraph [0029]). In the present embodiment, Phone Call Making Log Recording Information Storage Area H572a includes Phone Call Making Log Recording Data Storage Area H572b and Phone Call Making Log Recording Software Storage Area H572c. Phone Call Making Log Recording Data Storage Area H572b stores the data necessary to implement the present function on the side of Host H (Paragraph [0025]), such as the one(s) described in Paragraph [0031]. Phone Call Making Log Recording Software Storage Area H572c stores the software program(s) necessary to implement the present function on the side of Host H (Paragraph [0025]), such as the one(s) described in Paragraph [0038].

Paragraph [0031]—This Paragraph [0031] illustrates the storage area(s) included in Phone Call Making Log Recording Data Storage Area H572b (Paragraph [0030]). In the present embodiment, Phone Call Making Log Recording Data Storage Area H572b includes Phone Line Connected Message Data Storage Area H572b1, Party Location Data Storage Area H572b2, Current Time Data Storage Area H572b3, Map Data Storage Area H572b4, Party Icon Data Storage Area H572b5, Preselected Phone Number Data Storage Area H572b6, Selected Phone Number Data Storage Area H572b7, Personal Data Storage Area H572b8, Phone Call Making Log Data Storage Area H572b9, Party Audiovisual Data Storage Area H572b10, and Work Area H572b11. Phone Line Connected Message Data Storage Area H572b1 stores the phone line connected message data which is the image data indicating that the phone line is connected. Party Location Data Storage Area H572b2 stores the data described in Paragraph [0032]. Current Time Data Storage Area H572b3 stores the current time data which indicates the current time and date. Map Data Storage Area H572b4 stores the map data which is the image data indicating a map. Party Icon Data Storage Area H572b5 stores the data described in Paragraph [0033]. Preselected Phone Number Data Storage Area H572b6 stores the data described in Paragraph [0034]. Selected Phone Number Data Storage Area H572b7 stores the selected phone number data which is one of the preselected phone number data selected by the user of Device A. Personal Data Storage Area H572b8 stores the data described in Paragraph [0035]. Phone Call Making Log Data Storage Area H572b9 stores the data described in Paragraph [0036]. Party Audiovisual Data Storage Area H572b10 stores the data described in Paragraph [0037]. Work Area H572b11 is utilized as a work area to perform calculation and temporarily store data.

Paragraph [0032]—This Paragraph [0032] illustrates the storage area(s) included in Party Location Data Storage Area H572b2 (Paragraph [0031]). In the present embodiment, Party Location Data Storage Area H572b2 includes 1st Location Data Storage Area H572b2a and 2nd Location Data Storage Area H572b2b. 1st Location Data Storage Area H572b2a stores the 1st location data which indicates the current geographic location of Device A in (x,y,z) format. 2nd Location Data Storage Area H572b2b stores the 2nd location data which indicates the current geographic location of Device B in (x,y,z) format.

Paragraph [0033]—This Paragraph [0033] illustrates the storage area(s) included in Party Icon Data Storage Area H572b5 (Paragraph [0031]). In the present embodiment, Party Icon Data Storage Area H572b5 includes 1st Icon Data Storage Area H572b5a and 2nd Icon Data Storage Area H572b5b. 1st Icon Data Storage Area H572b5a stores the 1st icon data which is the image data of the icon indicating the geographic location of Device A on the map data. 2nd Icon Data Storage Area H572b5b stores the 2nd icon data which is the image data of the icon indicating the geographic location of Device B on the map data.

Paragraph [0034]—This Paragraph [0034] illustrates the data stored in Preselected Phone Number Data Storage Area H572b6 (Paragraph [0031]). In the present embodiment, Preselected Phone Number Data Storage Area H572b6 comprises two columns, i.e., 'Preselected Phone Number ID' and 'Preselected Phone Number Data'. Column 'Preselected Phone Number ID' stores the preselected phone number IDs, and each preselected phone number ID is an identification of the corresponding preselected phone number data stored in column 'Preselected Phone Number Data'. Each preselected phone number ID may be the name or title of the corresponding preselected phone number data. Column 'Preselected Phone Number Data' stores the preselected phone number data, and each preselected phone number data is the numeric data indicating a phone number. In the present embodiment, Preselected Phone Number Data Storage Area H572b6 stores the following data: 'Preselected Phone Number#1' and the corresponding 'Preselected Phone Number Data#1'; 'Preselected Phone Number#2' and the corresponding 'Preselected Phone Number Data#2'; 'Preselected Phone Number#3' and the corresponding 'Preselected Phone Number Data#3'; and 'Preselected Phone Number#4' and the corresponding 'Preselected Phone Number Data#4'.

Paragraph [0035]—This Paragraph [0035] illustrates the data stored in Personal Data Storage Area H572b8 (Paragraph [0031]). In the present embodiment, Personal Data Storage Area H572b8 comprises two columns, i.e., 'Preselected Phone Number ID' and 'Personal Data'. Column 'Preselected Phone Number ID' stores the preselected phone number IDs, and each preselected phone number ID is an identification of the corresponding personal data stored in column 'Personal Data'. The preselected phone number IDs stored in the present column are identical to the ones described in the previous paragraph. Column 'Personal Data' stores the personal data, and each personal data is the data (e.g., name, street address, email address, phone number, and/or fax number) relating to the person indicated by the corresponding preselected phone number data. In the present embodiment, Personal Data Storage Area H572b8 stores the following data: 'Preselected Phone Number#1' and the corresponding 'Personal Data#1'; 'Preselected Phone Number#2' and the corresponding 'Personal Data#2'; 'Preselected Phone Number#3' and the corresponding 'Personal Data#3'; and 'Preselected Phone Number#4' and the corresponding 'Personal Data#4'.

Paragraph [0036]—This Paragraph [0036] illustrates the data stored in Phone Call Making Log Data Storage Area H572b9 (Paragraph [0031]). In the present embodiment, Phone Call Making Log Data Storage Area H572b9 comprises two columns, i.e., 'Phone Call Making Log ID' and 'Phone Call Making Log Data'. Column 'Phone Call Making Log ID' stores the phone call making log IDs, and each phone call making log ID is an identification of the corresponding phone call making log data stored in column 'Phone Call Making Log Data'. Each phone call making log ID may be the name or title of the corresponding phone call making log data. Column 'Phone Call Making Log Data' stores the phone call making log data, and each phone call making log data is the log of making phone call. In the present embodiment, Phone Call Making Log Data Storage Area H572b9 stores the following data: 'Phone Call Making Log#1' and the corresponding 'Phone Call Making Log Data#1'; 'Phone Call Making Log#2' and the corresponding 'Phone Call Making Log Data#2'; 'Phone Call Making Log#3' and the corresponding 'Phone Call Making Log Data#3'; and 'Phone Call Making Log#4' and the corresponding 'Phone Call Making Log Data#4'. Each phone call making log data includes the selected phone number data to which the phone call was made, the current time data at the time the phone call was made, the 1st location data at the time the phone call was made, and/or the 2nd location data at the time the phone call was made.

Paragraph [0037]—This Paragraph [0037] illustrates the storage area(s) included in Party Audiovisual Data Storage Area H572b10 (Paragraph [0031]). In the present embodiment, Party Audiovisual Data Storage Area H572b10 includes 1st Audiovisual Data Storage Area H572b10a and 2nd Audiovisual Data Storage Area H572b10b. 1st Audiovisual Data Storage Area H572b10a stores the 1st audiovisual data which is the audiovisual data of the user of Device A. 2nd Audiovisual Data Storage Area H572*b*10*b* stores the 2nd audiovisual data which is the audiovisual data of the user of Device B.

Paragraph [0038]—This Paragraph [0038] illustrates the software program(s) stored in Phone Call Making Log Recording Software Storage Area H572*c* (Paragraph [0030]). In the present embodiment, Phone Call Making Log Recording Software Storage Area H572*c* stores 1st Location Data Producing Software H572*c*1, Current Time Data Producing Software H572*c*3, Selected Phone Number Data Producing Software H572*c*4, Phone Call Making Software H572*c*5, Audiovisual Data Exchanging Software H572*c*6, and Phone Call Making Log Data Displaying Software H572*c*7. 1st Location Data Producing Software H572*c*1 is the software program described in Paragraph [0061]. Current Time Data Producing Software H572*c*3 is the software program described in Paragraph [0063]. Selected Phone Number Data Producing Software H572*c*4 is the software program described in Paragraph [0064]. Phone Call Making Software H572*c*5 is the software program described in Paragraph [0065]. Audiovisual Data Exchanging Software H572*c*6 is the software program described in Paragraph [0066]. Phone Call Making Log Data Displaying Software H572*c*7 is the software program described in Paragraph [0067].

Paragraph [0039]—This Paragraph [0039] illustrates the storage area included in RAM 206 (FIG. 1) of Device A. In the present embodiment, RAM 206 includes Phone Call Making Log Recording Information Storage Area 206A572*a* of which the data and the software program(s) stored therein are described in Paragraph [0041].

Paragraph [0040]—The data and/or the software program (s) necessary to implement the present function may be downloaded from Host H (Paragraph [0025]) to Device A in the manner described in Paragraph [0191] through Paragraph [0197]. Paragraph [0041]—This Paragraph [0041] illustrates the storage area(s) included in Phone Call Making Log Recording Information Storage Area 206A572*a* (Paragraph [0039]). In the present embodiment, Phone Call Making Log Recording Information Storage Area 206A572*a* includes Phone Call Making Log Recording Data Storage Area 206A572*b* and Phone Call Making Log Recording Software Storage Area 206A572*c*. Phone Call Making Log Recording Data Storage Area 206A572*b* stores the data necessary to implement the present function on the side of Device A, such as the one(s) described in Paragraph [0042]. Phone Call Making Log Recording Software Storage Area 206A572*c* stores the software program(s) necessary to implement the present function on the side of Device A, such as the one(s) described in Paragraph [0049].

Paragraph [0042]—This Paragraph [0042] illustrates the storage area(s) included in Phone Call Making Log Recording Data Storage Area 206A572*b* (Paragraph [0041]). In the present embodiment, Phone Call Making Log Recording Data Storage Area 206A572*b* includes Phone Line Connected Message Data Storage Area 206A572*b*1, Party Location Data Storage Area 206A572*b*2, Current Time Data Storage Area 206A572*b*3, Map Data Storage Area 206A572*b*4, Party Icon Data Storage Area 206A572*b*5, Preselected Phone Number Data Storage Area 206A572*b*6, Selected Phone Number Data Storage Area 206A572*b*7, Personal Data Storage Area 206A572*b*8, Phone Call Making Log Data Storage Area 206A572*b*9, Party Audiovisual Data Storage Area 206A572*b*10, and Work Area 206A572*b*11. Phone Line Connected Message Data Storage Area 206A572*b*1 stores the phone line connected message data which is the image data indicating that the phone line is connected. Party Location Data Storage Area 206A572*b*2 stores the data described in Paragraph [0043]. Current Time Data Storage Area 206A572*b*3 stores the current time data which indicates the current time and date. Map Data Storage Area 206A572*b*4 stores the map data which is the image data indicating a map. Party Icon Data Storage Area 206A572*b*5 stores the data described in Paragraph [0044]. Preselected Phone Number Data Storage Area 206A572*b*6 stores the data described in Paragraph [0045]. Selected Phone Number Data Storage Area 206A572*b*7 stores the selected phone number data which is one of the preselected phone number data selected by the user of Device A. Personal Data Storage Area 206A572*b*8 stores the data described in Paragraph [0046]. Phone Call Making Log Data Storage Area 206A572*b*9 stores the data described in Paragraph [0047]. Party Audiovisual Data Storage Area 206A572*b*10 stores the data described in Paragraph [0048]. Work Area 206A572*b*11 is utilized as a work area to perform calculation and temporarily store data.

Paragraph [0043]—This Paragraph [0043] illustrates the storage area(s) included in Party Location Data Storage Area 206A572*b*2 (Paragraph [0042]). In the present embodiment, Party Location Data Storage Area 206A572*b*2 includes 1st Location Data Storage Area 206A572*b*2*a* and 2nd Location Data Storage Area 206A572*b*2*b*. 1st Location Data Storage Area 206A572*b*2*a* stores the 1st location data which indicates the current geographic location of Device A in (x,y,z) format. 2nd Location Data Storage Area 206A572*b*2*b* stores the 2nd location data which indicates the current geographic location of Device B in (x,y,z) format.

Paragraph [0044]—This Paragraph [0044] illustrates the storage area(s) included in Party Icon Data Storage Area 206A572*b*5 (Paragraph [0042]). In the present embodiment, Party Icon Data Storage Area 206A572*b*5 includes 1st Icon Data Storage Area 206A572*b*5*a* and 2nd Icon Data Storage Area 206A572*b*5*b*. 1st Icon Data Storage Area 206A572*b*5*a* stores the 1st icon data which is the image data of the icon indicating the geographic location of Device A on the map data. 2nd Icon Data Storage Area 206A572*b*5*b* stores the 2nd icon data which is the image data of the icon indicating the geographic location of Device B on the map data.

Paragraph [0045]—This Paragraph [0045] illustrates the data stored in Preselected Phone Number Data Storage Area 206A572*b*6 (Paragraph [0042]). In the present embodiment, Preselected Phone Number Data Storage Area 206A572*b*6 comprises two columns, i.e., 'Preselected Phone Number ID' and 'Preselected Phone Number Data'. Column 'Preselected Phone Number ID' stores the preselected phone number IDs, and each preselected phone number ID is an identification of the corresponding preselected phone number data stored in column 'Preselected Phone Number Data'. Each preselected phone number ID may be the name or title of the corresponding preselected phone number data. Column 'Preselected Phone Number Data' stores the preselected phone number data, and each preselected phone number data is the numeric data indicating a phone number. In the present embodiment, Preselected Phone Number Data Storage Area 206A572*b*6 stores the following data: 'Preselected Phone Number#1' and the corresponding 'Preselected Phone Number Data#1'; 'Preselected Phone Number#2' and the corresponding 'Preselected Phone Number Data#2'; 'Preselected Phone Number#3' and the corresponding 'Preselected Phone Number Data#3'; and 'Preselected Phone Number#4' and the corresponding 'Preselected Phone Number Data#4'.

Paragraph [0046]—This Paragraph [0046] illustrates the data stored in Personal Data Storage Area 206A572*b*8 (Paragraph [0042]). In the present embodiment, Personal Data Storage Area 206A572*b*8 comprises two columns, i.e., 'Preselected Phone Number ID' and 'Personal Data'. Column 'Preselected Phone Number ID' stores the preselected phone number IDs, and each preselected phone number ID is an identification of the corresponding personal data stored in column 'Personal Data'. The preselected phone number IDs stored in the present column are identical to the ones described in the previous paragraph. Column 'Personal Data' stores the personal data, and each personal data is the data (e.g., name, street address, email address, phone number, and/or fax number) relating to the person indicated by the corresponding preselected phone number data. In the present embodiment, Personal Data Storage Area 206A572b8 stores the following data: 'Preselected Phone Number#1' and the corresponding 'Personal Data#1'; 'Preselected Phone Number#2' and the corresponding 'Personal Data#2'; 'Preselected Phone Number#3' and the corresponding 'Personal Data#3'; and 'Preselected Phone Number#4' and the corresponding 'Personal Data#4'.

Paragraph [0047]—This Paragraph [0047] illustrates the data stored in Phone Call Making Log Data Storage Area 206A572b9 (Paragraph [0042]). In the present embodiment, Phone Call Making Log Data Storage Area 206A572b9 comprises two columns, i.e., 'Phone Call Making Log ID' and 'Phone Call Making Log Data'. Column 'Phone Call Making Log ID' stores the phone call making log IDs, and each phone call making log ID is an identification of the corresponding phone call making log data stored in column 'Phone Call Making Log Data'. Each phone call making log ID may be the name or title of the corresponding phone call making log data. Column 'Phone Call Making Log Data' stores the phone call making log data, and each phone call making log data is the log of making phone call. In the present embodiment, Phone Call Making Log Data Storage Area 206A572b9 stores the following data: 'Phone Call Making Log#1' and the corresponding 'Phone Call Making Log Data#1'; 'Phone Call Making Log#2' and the corresponding 'Phone Call Making Log Data#2'; 'Phone Call Making Log#3' and the corresponding 'Phone Call Making Log Data#3'; and 'Phone Call Making Log#4' and the corresponding 'Phone Call Making Log Data#4'. Each phone call making log data includes the selected phone number data to which the phone call was made, the current time data at the time the phone call was made, the 1st location data at the time the phone call was made, and/or the 2nd location data at the time the phone call was made.

Paragraph [0048]—This Paragraph [0048] illustrates the storage area(s) included in Party Audiovisual Data Storage Area 206A572b10 (Paragraph [0042]). In the present embodiment, Party Audiovisual Data Storage Area 206A572b10 includes 1st Audiovisual Data Storage Area 206A572b10a and 2nd Audiovisual Data Storage Area 206A572b10b. 1st Audiovisual Data Storage Area 206A572b10a stores the 1st audiovisual data which is the audiovisual data of the user of Device A. 2nd Audiovisual Data Storage Area 206A572b10b stores the 2nd audiovisual data which is the audiovisual data of the user of Device B.

Paragraph [0049]—This Paragraph [0049] illustrates the software program(s) stored in Phone Call Making Log Recording Software Storage Area 206A572c (Paragraph [0041]). In the present embodiment, Phone Call Making Log Recording Software Storage Area 206A572c stores 1st Location Data Producing Software 206A572c1, Current Time Data Producing Software 206A572c3, Selected Phone Number Data Producing Software 206A572c4, Phone Call Making Software 206A572c5, Audiovisual Data Exchanging Software 206A572c6, and Phone Call Making Log Data Displaying Software 206A572c7. 1st Location Data Producing Software 206A572c1 is the software program described in Paragraph [0061] and Paragraph [0069]. Current Time Data Producing Software 206A572c3 is the software program described in Paragraph [0071]. Selected Phone Number Data Producing Software 206A572c4 is the software program described in Paragraph [0064], and Paragraph [0072]. Phone Call Making Software 206A572c5 is the software program described in Paragraph [0065] and Paragraph [0073]. Audiovisual Data Exchanging Software 206A572c6 is the software program described in Paragraph [0066], and Paragraph [0074]. Phone Call Making Log Data Displaying Software 206A572c7 is the software program described in Paragraph [0067], and Paragraph [0075].

Paragraph [0050]—This Paragraph [0050] illustrates the storage area included in RAM 206 (FIG. 1) of Device B. In the present embodiment, RAM 206 includes Phone Call Making Log Recording Information Storage Area 206B572a of which the data and the software program(s) stored therein are described in Paragraph [0052].

Paragraph [0051]—The data and/or the software program(s) necessary to implement the present function may be downloaded from Host H (Paragraph [0025]) to Device B in the manner described in Paragraph [0191] through Paragraph [0197].

Paragraph [0052]—This Paragraph [0052] illustrates the storage area(s) included in Phone Call Making Log Recording Information Storage Area 206B572a (Paragraph [0050]). In the present embodiment, Phone Call Making Log Recording Information Storage Area 206B572a includes Phone Call Making Log Recording Data Storage Area 206B572b and Phone Call Making Log Recording Software Storage Area 206B572c. Phone Call Making Log Recording Data Storage Area 206B572b stores the data necessary to implement the present function on the side of Device B, such as the one(s) described in Paragraph [0053]. Phone Call Making Log Recording Software Storage Area 206B572c stores the software program(s) necessary to implement the present function on the side of Device B, such as the one(s) described in Paragraph [0060].

Paragraph [0053]—This Paragraph [0053] illustrates the storage area(s) included in Phone Call Making Log Recording Data Storage Area 206B572b (Paragraph [0052]). In the present embodiment, Phone Call Making Log Recording Data Storage Area 206B572b includes Phone Line Connected Message Data Storage Area 206B572b1, Party Location Data Storage Area 206B572b2, Current Time Data Storage Area 206B572b3, Map Data Storage Area 206B572b4, Party Icon Data Storage Area 206B572b5, Preselected Phone Number Data Storage Area 206B572b6, Selected Phone Number Data Storage Area 206B572b7, Personal Data Storage Area 206B572b8, Phone Call Making Log Data Storage Area 206B572b9, Party Audiovisual Data Storage Area 206B572b10, and Work Area 206B572b11. Phone Line Connected Message Data Storage Area 206B572b1 stores the phone line connected message data which is the image data indicating that the phone line is connected. Party Location Data Storage Area 206B572b2 stores the data described in Paragraph [0054]. Current Time Data Storage Area 206B572b3 stores the current time data which indicates the current time and date. Map Data Storage Area 206B572b4 stores the map data which is the image data indicating a map. Party Icon Data Storage Area 206B572b5 stores the data described in Paragraph [0055]. Preselected Phone Number Data Storage Area 206B572b6 stores the data described in Paragraph [0056]. Selected Phone Number Data Storage Area 206B572b7 stores the selected phone number data which is one of the preselected phone number data selected by the user of Device B. Personal Data Storage Area 206B572b8 stores the data described in Paragraph [0057]. Phone Call Making Log Data Storage Area 206B572b9 stores the data described in Paragraph [0058]. Party Audiovisual Data Storage Area 206B572b10 stores the data described in Paragraph [0059]. Work Area 206B572b11 is utilized as a work area to perform calculation and temporarily store data.

Paragraph [0054]—This Paragraph [0054] illustrates the storage area(s) included in Party Location Data Storage Area 206B572b2 (Paragraph [0053]). In the present embodiment, Party Location Data Storage Area 206B572b2 includes 1st Location Data Storage Area 206B572b2a and 2nd Location Data Storage Area 206B572b2b. 1st Location Data Storage Area 206B572b2a stores the 1st location data which indicates the current geographic location of Device A in (x,y,z) format. 2nd Location Data Storage Area 206B572b2b stores the 2nd location data which indicates the current geographic location of Device B in (x,y,z) format.

Paragraph [0055]—This Paragraph [0055] illustrates the storage area(s) included in Party Icon Data Storage Area 206B572b5 (Paragraph [0053]). In the present embodiment, Party Icon Data Storage Area 206B572b5 includes 1st Icon Data Storage Area 206B572b5a and 2nd Icon Data Storage Area 206B572b5b. 1st Icon Data Storage Area 206B572b5a stores the 1st icon data which is the image data of the icon indicating the geographic location of Device A on the map data. 2nd Icon Data Storage Area 206B572b5b stores the 2nd icon data which is the image data of the icon indicating the geographic location of Device B on the map data.

Paragraph [0056]—This Paragraph [0056] illustrates the data stored in Preselected Phone Number Data Storage Area 206B572b6 (Paragraph [0053]). In the present embodiment, Preselected Phone Number Data Storage Area 206B572b6 comprises two columns, i.e., 'Preselected Phone Number ID' and 'Preselected Phone Number Data'. Column 'Preselected Phone Number ID' stores the preselected phone number IDs, and each preselected phone number ID is an identification of the corresponding preselected phone number data stored in column 'Preselected Phone Number Data'. Each preselected phone number ID may be the name or title of the corresponding preselected phone number data. Column 'Preselected Phone Number Data' stores the preselected phone number data, and each preselected phone number data is the numeric data indicating a phone number. In the present embodiment, Preselected Phone Number Data Storage Area 206B572b6 stores the following data: 'Preselected Phone Number#1' and the corresponding 'Preselected Phone Number Data#1'; 'Preselected Phone Number#2' and the corresponding 'Preselected Phone Number Data#2'; 'Preselected Phone Number#3' and the corresponding 'Preselected Phone Number Data#3'; and 'Preselected Phone Number#4' and the corresponding 'Preselected Phone Number Data#4'.

Paragraph [0057]—This Paragraph [0057] illustrates the data stored in Personal Data Storage Area 206B572b8 (Paragraph [0053]). In the present embodiment, Personal Data Storage Area 206B572b8 comprises two columns, i.e., 'Preselected Phone Number ID' and 'Personal Data'. Column 'Preselected Phone Number ID' stores the preselected phone number IDs, and each preselected phone number ID is an identification of the corresponding personal data stored in column 'Personal Data'. The preselected phone number IDs stored in the present column are identical to the ones described in the previous paragraph. Column 'Personal Data' stores the personal data, and each personal data is the data (e.g., name, street address, email address, phone number, and/or fax number) relating to the person indicated by the corresponding preselected phone number data. In the present embodiment, Personal Data Storage Area 206B572b8 stores the following data: 'Preselected Phone Number#1' and the corresponding 'Personal Data#1'; 'Preselected Phone Number#2' and the corresponding 'Personal Data#2'; 'Preselected Phone Number#3' and the corresponding 'Personal Data#3'; and 'Preselected Phone Number#4' and the corresponding 'Personal Data#4'.

Paragraph [0058]—This Paragraph [0058] illustrates the data stored in Phone Call Making Log Data Storage Area 206B572b9 (Paragraph [0053]). In the present embodiment, Phone Call Making Log Data Storage Area 206B572b9 comprises two columns, i.e., 'Phone Call Making Log ID' and 'Phone Call Making Log Data'. Column 'Phone Call Making Log ID' stores the phone call making log IDs, and each phone call making log ID is an identification of the corresponding phone call making log data stored in column 'Phone Call Making Log Data'. Each phone call making log ID may be the name or title of the corresponding phone call making log data. Column 'Phone Call Making Log Data' stores the phone call making log data, and each phone call making log data is the log of making phone call. In the present embodiment, Phone Call Making Log Data Storage Area 206B572b9 stores the following data: 'Phone Call Making Log#1' and the corresponding 'Phone Call Making Log Data#1'; 'Phone Call Making Log#2' and the corresponding 'Phone Call Making Log Data#2'; 'Phone Call Making Log#3' and the corresponding 'Phone Call Making Log Data#3'; and 'Phone Call Making Log#4' and the corresponding 'Phone Call Making Log Data#4'. Each phone call making log data includes the selected phone number data to which the phone call was made, the current time data at the time the phone call was made, the 1st location data at the time the phone call was made, and/or the 2nd location data at the time the phone call was made.

Paragraph [0059]—This Paragraph [0059] illustrates the storage area(s) included in Party Audiovisual Data Storage Area 206B572b10 (Paragraph [0053]). In the present embodiment, Party Audiovisual Data Storage Area 206B572b10 includes 1st Audiovisual Data Storage Area 206B572b10a and 2nd Audiovisual Data Storage Area 206B572b10b. 1st Audiovisual Data Storage Area 206B572b10a stores the 1st audiovisual data which is the audiovisual data of the user of Device A. 2nd Audiovisual Data Storage Area 206B572b10b stores the 2nd audiovisual data which is the audiovisual data of the user of Device B.

Paragraph [0060]—This Paragraph [0060] illustrates the software program(s) stored in Phone Call Making Log Recording Software Storage Area 206B572c (Paragraph [0052]). In the present embodiment, Phone Call Making Log Recording Software Storage Area 206B572c stores 2nd Location Data Producing Software 206B572c2, Phone Call Making Software 206B572c5, and Audiovisual Data Exchanging Software 206B572c6. 2nd Location Data Producing Software 206B572c2 is the software program described in Paragraph [0062] and Paragraph [0070]. Phone Call Making Software 206B572c5 is the software program described in Paragraph [0065] and Paragraph [0073]. Audiovisual Data Exchanging Software 206B572c6 is the software program described in Paragraph [0066], and Paragraph [0074].

Paragraph [0061]—This Paragraph [0061] illustrate(s) 1st Location Data Producing Software H572c1 (Paragraph [0038]) of Host H (Paragraph [0025]) and 1st Location Data Producing Software 206A572c1 (Paragraph [0049]) of Device A, which produce(s) the 1st location data. In the present embodiment, CPU 211 (FIG. 1) of Device A identifies the current location of Device A (S1). CPU 211 (FIG. 1) of Device A produces the 1st location data by utilizing the current location identified in the previous step and sends the data to Host H (Paragraph [0025]) in a wireless fashion (S2). Host H (Paragraph [0025]) receives the 1st location data from Host H (Paragraph [0025]) and stores the data in 1st Location Data Storage Area H572b2a (Paragraph [0032]) (S3). The foregoing sequence is repeated periodically.

Paragraph [0062]—This Paragraph [0062] illustrate(s) 2nd Location Data Producing Software 206B572c2 (Paragraph [0060]) of Device B, which produce(s) the 2nd location data. In the present embodiment, CPU 211 (FIG. 1) of Device B identifies the current location of Device B (S1). CPU 211 (FIG. 1) of Device B produces the 2nd location data by utilizing the current location identified in the previous step (S2). CPU 211 (FIG. 1) of Device B stores the 2nd location data produced in the previous step in 2nd Location Data Storage Area 206B572b2b (Paragraph [0054]) (S3). The foregoing sequence is repeated periodically.

Paragraph [0063]—This Paragraph [0063] illustrate(s) Current Time Data Producing Software H572c3 (Paragraph [0038]) of Host H (Paragraph [0025]), which produce(s) the current time data. In the present embodiment, Host H (Paragraph [0025]) identifies the current time and date (S1). Host H (Paragraph [0025]) produces the current time data by referring to the current time and date identified in the previous step (S2). Host H (Paragraph [0025]) stores the current time data produced in the previous step in Current Time Data Storage Area H572b3 (Paragraph [0031]) (S3). The foregoing sequence is repeated periodically.

Paragraph [0064]—This Paragraph [0064] illustrate(s) Selected Phone Number Data Producing Software H572c4 (Paragraph [0038]) of Host H (Paragraph [0025]) and Selected Phone Number Data Producing Software 206A572c4 (Paragraph [0049]) of Device A, which produce(s) the selected phone number data. In the present embodiment, the user of Device A inputs, by utilizing Input Device 210 (FIG. 1) or via voice recognition system, the preselected phone number data displaying command (S1). Here, the preselected phone number data displaying command is the command to display the preselected phone number data. CPU 211 (FIG. 1) of Device A sends the preselected phone number data displaying command input in the previous step to Host H (Paragraph [0025]) in a wireless fashion (S2). Host H (Paragraph [0025]) receives the preselected phone number data displaying command from Host H (Paragraph [0025]) (S3). Host H (Paragraph [0025]) retrieves all preselected phone number IDs (e.g., Preselected Phone Number#1 through #4) from Preselected Phone Number Data Storage Area H572b6 (Paragraph [0034]) and sends the data to Host H (Paragraph [0025]) (S4). CPU 211 (FIG. 1) of Device A receives the preselected phone number IDs (e.g., Preselected Phone Number#1 through #4) from Host H (Paragraph [0025]) in a wireless fashion and displays the data on LCD 201 (FIG. 1) of Device A (S5). The user of Device A selects, by utilizing Input Device 210 (FIG. 1) or via voice recognition system, a preselected phone number ID (e.g., Preselected Phone Number#1) (S6). CPU 211 (FIG. 1) of Device A sends the preselected phone number ID (e.g., Preselected Phone Number#1) selected in the previous step to Host H (Paragraph [0025]) in a wireless fashion (S7). Host H (Paragraph [0025]) receives the preselected phone number ID (e.g., Preselected Phone Number#1) from Host H (Paragraph [0025]) (S8). Host H (Paragraph [0025]) retrieves the preselected phone number data (e.g., Preselected Phone Number Data#1) corresponding to the preselected phone number ID (e.g., Preselected Phone Number#1) received in the previous step from Preselected Phone Number Data Storage Area H572b6 (Paragraph [0034]) (S9). Host H (Paragraph [0025]) stores the preselected phone number data (e.g., Preselected Phone Number Data#1) retrieved in the previous step as the selected phone number data in Selected Phone Number Data Storage Area H572b7 (Paragraph [0031]) (S10).

Paragraph [0065]—This Paragraph [0065] illustrate(s) Phone Call Making Software H572c5 (Paragraph [0038]) of Host H (Paragraph [0025]), Phone Call Making Software 206A572c5 (Paragraph [0049]) of Device A, and Phone Call Making Software 206B572c5 (Paragraph [0060]) of Device B, which make(s) a phone call to the phone number indicated by the selected phone number data. Assuming that a phone call is made to Device B. In the present embodiment, the user of Device A inputs, by utilizing Input Device 210 (FIG. 1) or via voice recognition system, the phone call making command (S1). Here, the phone call making command is the command to make phone call to the phone number indicated by the selected phone number data. CPU 211 (FIG. 1) of Device A sends the phone call making command input in the previous step to Host H (Paragraph [0025]) in a wireless fashion (S2). Host H (Paragraph [0025]) receives the phone call making command from Host H (Paragraph [0025]) (S3). Host H (Paragraph [0025]) retrieves the selected phone number data from Selected Phone Number Data Storage Area H572b7 (Paragraph [0031]) and sends the data to Host H (Paragraph [0025]) (S4). CPU 211 (FIG. 1) of Device A receives the selected phone number data from Host H (Paragraph [0025]) in a wireless fashion and displays the data on LCD 201 (FIG. 1) of Device A (S5). Host H (Paragraph [0025]) retrieves the personal data (e.g., Personal Data#1) corresponding to the selected phone number data retrieved in S4 from Personal Data Storage Area H572b8 (Paragraph [0035]) and sends the data to Host H (Paragraph [0025]) (S6). CPU 211 (FIG. 1) of Device A receives the personal data (e.g., Personal Data#1) from Host H (Paragraph [0025]) in a wireless fashion and displays the data on LCD 201 (FIG. 1) of Device A (S7). Host H (Paragraph [0025]) sends the phone conversation request to the phone number indicated by the selected phone number data (S8). Here, the phone conversation request is the request to implement phone conversation. Assuming that Device B receives the phone conversation request. CPU 211 (FIG. 1) of Device B receives the phone conversation request from Host H (Paragraph [0025]) in a wireless fashion (S9). If the phone call is answered by Device B, CPU 211 (FIG. 1) of Device B proceeds to the next step (S10). CPU 211 (FIG. 1) of Device B sends the phone call answered notice to Host H (Paragraph [0025]) in a wireless fashion (S11). Here, the phone call answered notice indicates that the phone call made to the phone number indicated by the selected phone number data is answered. Host H (Paragraph [0025]) receives the phone call answered notice from Device B (S12). Host H (Paragraph [0025]) retrieves the phone line connected message data from Phone Line Connected Message Data Storage Area H572b1 (Paragraph [0031]) and sends the data to Device A (S13). CPU 211 (FIG. 1) of Device A receives the phone line connected message data from Host H (Paragraph [0025]) in a wireless fashion and displays the data on LCD 201 (FIG. 1) of Device A (S14). Host H (Paragraph [0025]) retrieves the selected phone number data from Selected Phone Number Data Storage Area H572b7 (Paragraph [0031]) (S15). Host H (Paragraph [0025]) stores the selected phone number data retrieved in the previous step in Work Area H572b11 (Paragraph [0031]) (S16). Host H (Paragraph [0025]) retrieves the current time data from Current Time Data Storage Area H572b3 (Paragraph [0031]) (S17). Host H (Paragraph [0025]) stores the current time data retrieved in the previous step in Work Area H572b11 (Paragraph [0031]) (S18). Host H (Paragraph [0025]) retrieves the 1st location data from 1st Location Data Storage Area H572*b*2*a* (Paragraph [0032]) (S19). Host H (Paragraph [0025]) stores the 1st location data retrieved in the previous step in Work Area H572*b*11 (Paragraph [0031]) (S20). Host H (Paragraph [0025]) sends the 2nd location data transferring request to Device B (S21). Here, the 2nd location data transferring request is the request to transfer the 2nd location data. CPU 211 (FIG. 1) of Device B receives the 2nd location data transferring request from Host H (Paragraph [0025]) in a wireless fashion (S22). CPU 211 (FIG. 1) of Device B retrieves the 2nd location data from 2nd Location Data Storage Area 206B572*b*2*b* (Paragraph [0054]) and sends the data to Host H (Paragraph [0025]) in a wireless fashion (S23). Host H (Paragraph [0025]) receives the 2nd location data from Device B and stores the data in 2nd Location Data Storage Area H572*b*2*b* (Paragraph [0032]) (S24). Host H (Paragraph [0025]) retrieves the 2nd location data from 2nd Location Data Storage Area H572*b*2*b* (Paragraph [0032]) and stores the data in Work Area H572*b*11 (Paragraph [0031]) (S25). Host H (Paragraph [0025]) retrieves the selected phone number data, the current time data, the 1st location data, and the 2nd location data from Work Area H572*b*11 (Paragraph [0031]) and produces the phone call making log data (e.g., Phone Call Making Log Data#4) therefrom (S26). Host H (Paragraph [0025]) stores the phone call making log data (e.g., Phone Call Making Log Data#4) produced in the previous step in Phone Call Making Log Data Storage Area H572*b*9 (Paragraph [0036]) (S27). The sequence described in the next paragraph is implemented thereafter (S28).

Paragraph [0066]—This Paragraph [0066] illustrate(s) Audiovisual Data Exchanging Software H572*c*6 (Paragraph [0038]) of Host H (Paragraph [0025]), Audiovisual Data Exchanging Software 206A572*c*6 (Paragraph [0049]) of Device A, and Audiovisual Data Exchanging Software 206B572*c*6 (Paragraph [0060]) of Device B, which exchange(s) the 1st audiovisual data and the 2nd audiovisual data. In the present embodiment, CPU 211 (FIG. 1) of Device A retrieves audio data from Microphone 215 (FIG. 1) and visual data from CCD Unit 214 (FIG. 1) of Device A (S1). CPU 211 (FIG. 1) of Device A produces the 1st audiovisual data by utilizing the audio data and the visual data retrieved in the previous step and sends the data to Host H (Paragraph [0025]) in a wireless fashion (S2). Host H (Paragraph [0025]) receives the 1st audiovisual data from Device A and stores the data in 1st Audiovisual Data Storage Area H572*b*10*a* (Paragraph [0037]) (S3). Host H (Paragraph [0025]) retrieves the 1st audiovisual data from 1st Audiovisual Data Storage Area H572*b*10*a* (Paragraph [0037]) and sends the data to Device A (S4). CPU 211 (FIG. 1) of Device A receives the 1st audiovisual data from Host H (Paragraph [0025]) in a wireless fashion and outputs the data from Speaker 216 (FIG. 1) and LCD 201 (FIG. 1) of Device A (S5). Host H (Paragraph [0025]) retrieves the 1st audiovisual data from 1st Audiovisual Data Storage Area H572*b*10*a* (Paragraph [0037]) and sends the data to Device B (S6). CPU 211 (FIG. 1) of Device B receives the 1st audiovisual data from Host H (Paragraph [0025]) in a wireless fashion and stores the data in 1st Audiovisual Data Storage Area 206B572*b*10*a* (Paragraph [0059]) (S7). CPU 211 (FIG. 1) of Device B retrieves the 1st audiovisual data from 1st Audiovisual Data Storage Area 206B572*b*10*a* (Paragraph [0059]) and outputs the data from Speaker 216 (FIG. 1) and LCD 201 (FIG. 1) of Device B (S8). CPU 211 (FIG. 1) of Device B retrieves audio data from Microphone 215 (FIG. 1) and visual data from CCD Unit 214 (FIG. 1) of Device B (S9). CPU 211 (FIG. 1) of Device B produces the 2nd audiovisual data by utilizing the audio data and the visual data retrieved in the previous step (S10). CPU 211 (FIG. 1) of Device B stores the 2nd audiovisual data produced in the previous step in 2nd Audiovisual Data Storage Area 206B572*b*10*b* (Paragraph [0059]) (S11). CPU 211 (FIG. 1) of Device B retrieves the 2nd audiovisual data from 2nd Audiovisual Data Storage Area 206B572*b*10*b* (Paragraph [0059]) (S12). CPU 211 (FIG. 1) of Device B outputs the 2nd audiovisual data retrieved in the previous step from Speaker 216 (FIG. 1) and LCD 201 (FIG. 1) of Device B (S13). CPU 211 (FIG. 1) of Device B retrieves the 2nd audiovisual data from 2nd Audiovisual Data Storage Area 206B572*b*10*b* (Paragraph [0059]) and sends the data to Host H (Paragraph [0025]) in a wireless fashion (S14). Host H (Paragraph [0025]) receives the 2nd audiovisual data from Device B and stores the data in 2nd Audiovisual Data Storage Area H572*b*10*b* (Paragraph [0037]) (S15). Host H (Paragraph [0025]) retrieves the 2nd audiovisual data from 2nd Audiovisual Data Storage Area H572*b*10*b* (Paragraph [0037]) and sends the data to Device A (S16). CPU 211 (FIG. 1) of Device A receives the 2nd audiovisual data from Host H (Paragraph [0025]) in a wireless fashion and outputs the data from Speaker 216 (FIG. 1) and LCD 201 (FIG. 1) of Device A (S17). The foregoing sequence is repeated periodically.

Paragraph [0067]—This Paragraph [0067] illustrate(s) Phone Call Making Log Data Displaying Software H572*c*7 (Paragraph [0038]) of Host H (Paragraph [0025]) and Phone Call Making Log Data Displaying Software 206A572*c*7 (Paragraph [0049]) of Device A, which display(s) the phone call making log data. In the present embodiment, the user of Device A inputs, by utilizing Input Device 210 (FIG. 1) or via voice recognition system, the phone call making log data displaying command (S1). Here, the phone call making log data displaying command is the command to display the phone call making log data. CPU 211 (FIG. 1) of Device A sends the phone call making log data displaying command to Host H (Paragraph [0025]) in a wireless fashion (S2). Host H (Paragraph [0025]) receives the phone call making log data displaying command from Device A (S3). Host H (Paragraph [0025]) retrieves all phone call making log IDs (e.g., Phone Call Making Log#1 through #4) from Phone Call Making Log Data Storage Area H572*b*9 (Paragraph [0036]) and sends the data to Device A (S4). CPU 211 (FIG. 1) of Device A receives the phone call making log IDs (e.g., Phone Call Making Log#1 through #4) from Host H (Paragraph [0025]) in a wireless fashion and displays the data on LCD 201 (FIG. 1) of Device A (S5). The user of Device A selects, by utilizing Input Device 210 (FIG. 1) or via voice recognition system, a phone call making log ID (e.g., Phone Call Making Log#4) (S6). CPU 211 (FIG. 1) of Device A sends the phone call making log ID (e.g., Phone Call Making Log#4) selected in the previous step to Host H (Paragraph [0025]) in a wireless fashion (S7). Host H (Paragraph [0025]) receives the phone call making log ID (e.g., Phone Call Making Log#4) from Device A (S8). Host H (Paragraph [0025]) retrieves the phone call making log data (e.g., Phone Call Making Log Data#4) corresponding to the phone call making log ID (e.g., Phone Call Making Log#4) received in the previous step from Phone Call Making Log Data Storage Area H572*b*9 (Paragraph [0036]) (S9). Host H (Paragraph [0025]) stores the phone call making log data (e.g., Phone Call Making Log Data#4) retrieved in the previous step in Work Area H572*b*11 (Paragraph [0031]) (S10). Host H (Paragraph [0025]) retrieves the selected phone number data from the phone call making log data (e.g., Phone Call Making Log Data#4) stored in the previous step and sends the data to Device A (S11). CPU 211 (FIG. 1) of Device A receives the selected phone number data from Host H (Paragraph [0025]) in a wireless fashion and displays the data on LCD 201 (FIG. 1) of Device A (S12).

Host H (Paragraph [0025]) retrieves the current time data from the phone call making log data (e.g., Phone Call Making Log Data#4) stored in S10 and sends the data to Device A (S13). CPU 211 (FIG. 1) of Device A receives the current time data from Host H (Paragraph [0025]) in a wireless fashion and displays the data on LCD 201 (FIG. 1) of Device A (S14). Host H (Paragraph [0025]) retrieves the map data from Map Data Storage Area H572b4 (Paragraph [0031]) and sends the data to Device A (S15). CPU 211 (FIG. 1) of Device A receives the map data from Host H (Paragraph [0025]) in a wireless fashion and displays the data on LCD 201 (FIG. 1) of Device A (S16). Host H (Paragraph [0025]) retrieves the 1st location data from the phone call making log data (e.g., Phone Call Making Log Data#4) stored in S10 and sends the data to Device A (S17). CPU 211 (FIG. 1) of Device A receives the 1st location data from Host H (Paragraph [0025]) in a wireless fashion (S18). Host H (Paragraph [0025]) retrieves the 1st icon data from 1st Icon Data Storage Area H572b5a (Paragraph [0033]) and sends the data to Device A (S19). CPU 211 (FIG. 1) of Device A receives the 1st icon data from Host H (Paragraph [0025]) in a wireless fashion (S20). CPU 211 (FIG. 1) of Device A displays the 1st icon data received in the previous step at the location corresponding to the 1st location data received in S18 on the map data displayed in S16 (S21). Host H (Paragraph [0025]) retrieves the 2nd location data from the phone call making log data (e.g., Phone Call Making Log Data#4) stored in S10 and sends the data to Device A (S22). CPU 211 (FIG. 1) of Device A receives the 2nd location data from Host H (Paragraph [0025]) in a wireless fashion (S23). Host H (Paragraph [0025]) retrieves the 2nd icon data from 2nd Icon Data Storage Area H572b5b (Paragraph [0033]) and sends the data to Device A (S24). CPU 211 (FIG. 1) of Device A receives the 2nd icon data from Host H (Paragraph [0025]) in a wireless fashion (S25). CPU 211 (FIG. 1) of Device A displays the 2nd icon data received in the previous step at the location corresponding to the 2nd location data received in S23 on the map data displayed in S16 (S26). Thus, the selected phone number data to which the phone call was made, the current time data at the time the phone call was made, the 1st location data at the time the phone call was made, and the 2nd location data at the time the phone call was made are indicated on LCD 201 (FIG. 1) of Device A.

Paragraph [0068]—Paragraph [0069] through Paragraph [0075] illustrate another embodiment wherein Device A plays the major role in implementing the present function.

Paragraph [0069]—This Paragraph [0069] illustrate(s) 1st Location Data Producing Software 206A572c1 (Paragraph [0049]) of Device A, which produce(s) the 1st location data. In the present embodiment, CPU 211 (FIG. 1) of Device A identifies the current location of Device A (S1). CPU 211 (FIG. 1) of Device A produces the 1st location data by utilizing the current location identified in the previous step (S2). CPU 211 (FIG. 1) of Device A stores the 1st location data produced in the previous step in 1st Location Data Storage Area 206A572b2a (Paragraph [0043]) (S3). The foregoing sequence is repeated periodically.

Paragraph [0070]—This Paragraph [0070] illustrate(s) 2nd Location Data Producing Software 206B572c2 (Paragraph [0060]) of Device B, which produce(s) the 2nd location data. In the present embodiment, CPU 211 (FIG. 1) of Device B identifies the current location of Device B (S1). CPU 211 (FIG. 1) of Device B produces the 2nd location data by utilizing the current location identified in the previous step (S2). CPU 211 (FIG. 1) of Device B stores the 2nd location data produced in the previous step in 2nd Location Data Storage Area 206B572b2b (Paragraph [0054]) (S3). The foregoing sequence is repeated periodically.

Paragraph [0071]—This Paragraph [0071] illustrate(s) Current Time Data Producing Software 206A572c3 (Paragraph [0049]) of Device A, which produce(s) the current time data. In the present embodiment, CPU 211 (FIG. 1) of Device A identifies the current time and date (S1). CPU 211 (FIG. 1) of Device A produces the current time data by referring to the current time and date identified in the previous step (S2). CPU 211 (FIG. 1) of Device A stores the current time data produced in the previous step in Current Time Data Storage Area 206A572b3 (Paragraph [0042]) (S3). The foregoing sequence is repeated periodically.

Paragraph [0072]—This Paragraph [0072] illustrate(s) Selected Phone Number Data Producing Software 206A572c4 (Paragraph [0049]) of Device A, which produce(s) the selected phone number data. In the present embodiment, the user of Device A inputs, by utilizing Input Device 210 (FIG. 1) or via voice recognition system, the preselected phone number data displaying command (S1). Here, the preselected phone number data displaying command is the command to display the preselected phone number data. CPU 211 (FIG. 1) of Device A retrieves all preselected phone number IDs (e.g., Preselected Phone Number#1 through #4) from Preselected Phone Number Data Storage Area 206A572b6 (Paragraph [0045]) (S2). CPU 211 (FIG. 1) of Device A displays the preselected phone number IDs (e.g., Preselected Phone Number#1 through #4) retrieved in the previous step on LCD 201 (FIG. 1) of Device A (S3). The user of Device A selects, by utilizing Input Device 210 (FIG. 1) or via voice recognition system, a preselected phone number ID (e.g., Preselected Phone Number#1) (S4). CPU 211 (FIG. 1) of Device A retrieves the preselected phone number data (e.g., Preselected Phone Number Data#1) corresponding to the preselected phone number ID (e.g., Preselected Phone Number#1) selected in the previous step from Preselected Phone Number Data Storage Area 206A572b6 (Paragraph [0045]) (S5). CPU 211 (FIG. 1) of Device A stores the preselected phone number data (e.g., Preselected Phone Number Data#1) retrieved in the previous step as the selected phone number data in Selected Phone Number Data Storage Area 206A572b7 (Paragraph [0042]) (S6).

Paragraph [0073]—This Paragraph [0073] illustrate(s) Phone Call Making Software 206A572c5 (Paragraph [0049]) of Device A and Phone Call Making Software 206B572c5 (Paragraph [0060]) of Device B, which make(s) a phone call to the phone number indicated by the selected phone number data. Assuming that a phone call is made to Device B. In the present embodiment, the user of Device A inputs, by utilizing Input Device 210 (FIG. 1) or via voice recognition system, the phone call making command (S1). Here, the phone call making command is the command to make phone call to the phone number indicated by the selected phone number data. CPU 211 (FIG. 1) of Device A retrieves the selected phone number data from Selected Phone Number Data Storage Area 206A572b7 (Paragraph [0042]) (S2). CPU 211 (FIG. 1) of Device A displays the selected phone number data retrieved in the previous step on LCD 201 (FIG. 1) of Device A (S3). CPU 211 (FIG. 1) of Device A retrieves the personal data (e.g., Personal Data#1) corresponding to the selected phone number data retrieved in S2 from Personal Data Storage Area 206A572b8 (Paragraph [0046]) (S4). CPU 211 (FIG. 1) of Device A displays the personal data (e.g., Personal Data#1) retrieved in the previous step on LCD 201 (FIG. 1) of Device A (S5). CPU 211 (FIG. 1) of Device A sends the phone conversation request to the phone number indicated by the selected phone number data in a wireless fashion (S6). Here, the phone conversation request is the request to implement phone conversation. Assuming that Device B receives the phone conversation request. CPU 211 (FIG. 1) of Device B receives the phone conversation request from Device A in a wireless fashion (S7). If the phone call is answered by Device B, CPU 211 (FIG. 1) of Device B proceeds to the next step (S8). CPU 211 (FIG. 1) of Device B sends the phone call answered notice to Device A in a wireless fashion (S9). Here, the phone call answered notice indicates that the phone call made to the phone number indicated by the selected phone number data is answered. CPU 211 (FIG. 1) of Device A receives the phone call answered notice from Device B in a wireless fashion (S10). CPU 211 (FIG. 1) of Device A retrieves the phone line connected message data from Phone Line Connected Message Data Storage Area 206A572b1 (Paragraph [0042]) (S11). CPU 211 (FIG. 1) of Device A displays the phone line connected message data retrieved in the previous step on LCD 201 (FIG. 1) of Device A (S12). CPU 211 (FIG. 1) of Device A retrieves the selected phone number data from Selected Phone Number Data Storage Area 206A572b7 (Paragraph [0042]) (S13). CPU 211 (FIG. 1) of Device A stores the selected phone number data retrieved in the previous step in Work Area 206A572b11 (Paragraph [0042]) (S14). CPU 211 (FIG. 1) of Device A retrieves the current time data from Current Time Data Storage Area 206A572b3 (Paragraph [0042]) (S15). CPU 211 (FIG. 1) of Device A stores the current time data retrieved in the previous step in Work Area 206A572b11 (Paragraph [0042]) (S16). CPU 211 (FIG. 1) of Device A retrieves the 1st location data from 1st Location Data Storage Area 206A572b2a (Paragraph [0043]) (S17). CPU 211 (FIG. 1) of Device A stores the 1st location data retrieved in the previous step in Work Area 206A572b11 (Paragraph [0042]) (S18). CPU 211 (FIG. 1) of Device A sends the 2nd location data transferring request to Device B in a wireless fashion (S19). Here, the 2nd location data transferring request is the request to transfer the 2nd location data. CPU 211 (FIG. 1) of Device B receives the 2nd location data transferring request from Device A in a wireless fashion (S20). CPU 211 (FIG. 1) of Device B retrieves the 2nd location data from 2nd Location Data Storage Area 206B572b2b (Paragraph [0054]) and sends the data to Device A in a wireless fashion (S21). CPU 211 (FIG. 1) of Device A receives the 2nd location data from Device B in a wireless fashion and stores the data in 2nd Location Data Storage Area 206A572b2b (Paragraph [0043]) (S22). CPU 211 (FIG. 1) of Device A retrieves the 2nd location data from 2nd Location Data Storage Area 206A572b2b (Paragraph [0043]) and stores the data in Work Area 206A572b11 (Paragraph [0042]) (S23). CPU 211 (FIG. 1) of Device A retrieves the selected phone number data, the current time data, the 1st location data, and the 2nd location data from Work Area 206A572b11 (Paragraph [0042]) and produces the phone call making log data (e.g., Phone Call Making Log Data#4) therefrom (S24). CPU 211 (FIG. 1) of Device A stores the phone call making log data (e.g., Phone Call Making Log Data#4) produced in the previous step in Phone Call Making Log Data Storage Area 206A572b9 (Paragraph [0047]) (S25). The sequence described in the next paragraph is implemented thereafter (S26).

Paragraph [0074]—This Paragraph [0074] illustrate(s) Audiovisual Data Exchanging Software 206A572c6 (Paragraph [0049]) of Device A and Audiovisual Data Exchanging Software 206B572c6 (Paragraph [0060]) of Device B, which exchange(s) the 1st audiovisual data and the 2nd audiovisual data. In the present embodiment, CPU 211 (FIG. 1) of Device A retrieves audio data from Microphone 215 (FIG. 1) and visual data from CCD Unit 214 (FIG. 1) of Device A (S1). CPU 211 (FIG. 1) of Device A produces the 1st audiovisual data by utilizing the audio data and the visual data retrieved in the previous step (S2). CPU 211 (FIG. 1) of Device A stores the 1st audiovisual data produced in the previous step in 1st Audiovisual Data Storage Area 206A572b10a (Paragraph [0048]) (S3). CPU 211 (FIG. 1) of Device A retrieves the 1st audiovisual data from 1st Audiovisual Data Storage Area 206A572b10a (Paragraph [0048]) (S4). CPU 211 (FIG. 1) of Device A outputs the 1st audiovisual data retrieved in the previous step from Speaker 216 (FIG. 1) and LCD 201 (FIG. 1) of Device A (S5). CPU 211 (FIG. 1) of Device A retrieves the 1st audiovisual data from 1st Audiovisual Data Storage Area 206A572b10a (Paragraph [0048]) and sends the data to Device B in a wireless fashion (S6). CPU 211 (FIG. 1) of Device B receives the 1st audiovisual data from Device A in a wireless fashion and stores the data in 1st Audiovisual Data Storage Area 206B572b10a (Paragraph [0059]) (S7). CPU 211 (FIG. 1) of Device B retrieves the 1st audiovisual data from 1st Audiovisual Data Storage Area 206B572b10a (Paragraph [0059]) and outputs the data from Speaker 216 (FIG. 1) and LCD 201 (FIG. 1) of Device B (S8). CPU 211 (FIG. 1) of Device B retrieves audio data from Microphone 215 (FIG. 1) and visual data from CCD Unit 214 (FIG. 1) of Device B (S9). CPU 211 (FIG. 1) of Device B produces the 2nd audiovisual data by utilizing the audio data and the visual data retrieved in the previous step (S10). CPU 211 (FIG. 1) of Device B stores the 2nd audiovisual data produced in the previous step in 2nd Audiovisual Data Storage Area 206B572b10b (Paragraph [0059]) (S11). CPU 211 (FIG. 1) of Device B retrieves the 2nd audiovisual data from 2nd Audiovisual Data Storage Area 206B572b10b (Paragraph [0059]) (S12). CPU 211 (FIG. 1) of Device B outputs the 2nd audiovisual data retrieved in the previous step from Speaker 216 (FIG. 1) and LCD 201 (FIG. 1) of Device B (S13). CPU 211 (FIG. 1) of Device B retrieves the 2nd audiovisual data from 2nd Audiovisual Data Storage Area 206B572b10b (Paragraph [0059]) and sends the data to Device A in a wireless fashion (S14). CPU 211 (FIG. 1) of Device A receives the 2nd audiovisual data from Device B in a wireless fashion and stores the data in 2nd Audiovisual Data Storage Area 206A572b10b (Paragraph [0048]) (S15). CPU 211 (FIG. 1) of Device A retrieves the 2nd audiovisual data from 2nd Audiovisual Data Storage Area 206A572b10b (Paragraph [0048]) and outputs the data from Speaker 216 (FIG. 1) and LCD 201 (FIG. 1) of Device A (S16). The foregoing sequence is repeated periodically.

Paragraph [0075]—This Paragraph [0075] illustrate(s) Phone Call Making Log Data Displaying Software 206A572c7 (Paragraph [0049]) of Device A, which display(s) the phone call making log data. In the present embodiment, the user of Device A inputs, by utilizing Input Device 210 (FIG. 1) or via voice recognition system, the phone call making log data displaying command (S1). Here, the phone call making log data displaying command is the command to display the phone call making log data. CPU 211 (FIG. 1) of Device A retrieves all phone call making log IDs (e.g., Phone Call Making Log#1 through #4) from Phone Call Making Log Data Storage Area 206A572b9 (Paragraph [0047]) (S2). CPU 211 (FIG. 1) of Device A displays the phone call making log IDs (e.g., Phone Call Making Log#1 through #4) retrieved in the previous step on LCD 201 (FIG. 1) of Device A (S3). The user of Device A selects, by utilizing Input Device 210 (FIG. 1) or via voice recognition system, a phone call making log ID (e.g., Phone Call Making Log#4) (S4). CPU 211 (FIG. 1) of Device A retrieves the phone call making log data (e.g., Phone Call Making Log Data#4) corresponding to the phone call making log ID (e.g., Phone Call Making Log#4) selected in the previous step from Phone Call Making Log Data Storage Area 206A572b9 (Paragraph [0047]) (S5). CPU 211 (FIG. 1) of Device A stores the phone call making log data (e.g., Phone Call Making Log Data#4) retrieved in the previous step in Work Area 206A572b11 (Paragraph [0042]) (S6). CPU 211 (FIG. 1) of Device A retrieves the selected phone number data from the phone call making log data (e.g., Phone Call Making Log Data#4) stored in the previous step and displays the data on LCD 201 (FIG. 1) of Device A (S7). CPU 211 (FIG. 1) of Device A retrieves the current time data from the phone call making log data (e.g., Phone Call Making Log Data#4) stored in S6 and displays the data on LCD 201 (FIG. 1) of Device A (S8). CPU 211 (FIG. 1) of Device A retrieves the map data from Map Data Storage Area 206A572b4 (Paragraph [0042]) (S9). CPU 211 (FIG. 1) of Device A displays the map data retrieved in the previous step on LCD 201 (FIG. 1) of Device A (S10). CPU 211 (FIG. 1) of Device A retrieves the 1st location data from the phone call making log data (e.g., Phone Call Making Log Data#4) stored in S6 (S11). CPU 211 (FIG. 1) of Device A retrieves the 1st icon data from 1st Icon Data Storage Area 206A572b5a (Paragraph [0044]) (S12). CPU 211 (FIG. 1) of Device A displays the 1st icon data retrieved in the previous step at the location corresponding to the 1st location data retrieved in S11 on the map data displayed in S10 (S13). CPU 211 (FIG. 1) of Device A retrieves the 2nd location data from the phone call making log data (e.g., Phone Call Making Log Data#4) stored in S6 (S14). CPU 211 (FIG. 1) of Device A retrieves the 2nd icon data from 2nd Icon Data Storage Area 206A572b5b (Paragraph [0044]) (S15). CPU 211 (FIG. 1) of Device A displays the 2nd icon data retrieved in the previous step at the location corresponding to the 2nd location data retrieved in S14 on the map data displayed in S10 (S16). Thus, the selected phone number data to which the phone call was made, the current time data at the time the phone call was made, the 1st location data at the time the phone call was made, and the 2nd location data at the time the phone call was made are indicated on LCD 201 (FIG. 1) of Device A.

Paragraph [0076]—<<Phone Call Receiving Log Recording Function>>

Paragraph [0077]—Paragraph [0078] through Paragraph [0123] illustrate the phone call receiving log recording function, wherein when Communication Device 200 receives a phone call, the phone call receiving log data is produced. The phone call receiving log data includes the phone number received data which indicates the phone number of the caller, the current time data at the time the phone call was received, the 1st location data at the time the phone call was received, the 2nd location data at the time the phone call was received, and/or the personal data of the caller. When a phone call receiving log data is selected, the phone number received data which indicates the phone number of the caller, the current time data at the time the phone call was received, the personal data of the caller are displayed on LCD 201 (FIG. 1), and/or the 1st location data and the 2nd location data at the time the phone call was received are indicated on the map displayed on LCD 201 (FIG. 1).

Paragraph [0078]—This Paragraph [0078] illustrates the major elements utilized to implement the present function. In the present embodiment, Host H (Paragraph [0025]) is connected to Network NT (e.g., the Internet). Device A, a Communication Device 200, is connected to Network NT (e.g., the Internet) in a wireless fashion. Device B, another Communication Device 200, is connected to Network NT (e.g., the Internet) in a wireless fashion. Host H (Paragraph [0025]), Device A, and Device B are capable to communicate with each other via Network NT (e.g., the Internet) to implement the present function. Device A and Device B are also capable to communicate with each other directly in a wireless fashion to implement the present function.

Paragraph [0079]—This Paragraph [0079] illustrates the storage area included in Host H (Paragraph [0025]). In the present embodiment, Host H (Paragraph [0025]) includes Phone Call Receiving Log Recording Information Storage Area H573a of which the data and the software program(s) stored therein are described in Paragraph [0080].

Paragraph [0080]—This Paragraph [0080] illustrates the storage area(s) included in Phone Call Receiving Log Recording Information Storage Area H573a (Paragraph [0079]). In the present embodiment, Phone Call Receiving Log Recording Information Storage Area H573a includes Phone Call Receiving Log Recording Data Storage Area H573b and Phone Call Receiving Log Recording Software Storage Area H573c. Phone Call Receiving Log Recording Data Storage Area H573b stores the data necessary to implement the present function on the side of Host H (Paragraph [0025]), such as the one(s) described in Paragraph [0081]. Phone Call Receiving Log Recording Software Storage Area H573c stores the software program(s) necessary to implement the present function on the side of Host H (Paragraph [0025]), such as the one(s) described in Paragraph [0088].

Paragraph [0081]—This Paragraph [0081] illustrates the storage area(s) included in Phone Call Receiving Log Recording Data Storage Area H573b (Paragraph [0080]). In the present embodiment, Phone Call Receiving Log Recording Data Storage Area H573b includes Party Location Data Storage Area H573b1, Current Time Data Storage Area H573b2, Map Data Storage Area H573b3, Party Icon Data Storage Area H573b4, Phone Number Data Storage Area H573b5, Phone Number Received Data Storage Area H573b6, Personal Data Storage Area H573b7, Phone Call Receiving Log Data Storage Area H573b8, Party Audiovisual Data Storage Area H573b9, and Work Area H573b10. Party Location Data Storage Area H573b1 stores the data described in Paragraph [0082]. Current Time Data Storage Area H573b2 stores the current time data which indicates the current time and date. Map Data Storage Area H573b3 stores the map data which is the image data indicating a map. Party Icon Data Storage Area H573b4 stores the data described in Paragraph [0083]. Phone Number Data Storage Area H573b5 stores the data described in Paragraph [0084]. Phone Number Received Data Storage Area H573b6 stores the phone number received data which indicates the phone number of the caller. Personal Data Storage Area H573b7 stores the data described in Paragraph [0085]. Phone Call Receiving Log Data Storage Area H573b8 stores the data described in Paragraph [0086]. Party Audiovisual Data Storage Area H573b9 stores the data described in Paragraph [0087]. Work Area H573b10 is utilized as a work area to perform calculation and temporarily store data.

Paragraph [0082]—This Paragraph [0082] illustrates the storage area(s) included in Party Location Data Storage Area H573b1 (Paragraph [0081]). In the present embodiment, Party Location Data Storage Area H573b1 includes 1st Location Data Storage Area H573b1a and 2nd Location Data Storage Area H573b1b. 1st Location Data Storage Area H573b1a stores the 1st location data which indicates the current geographic location of Device A in (x,y,z) format. 2nd Location Data Storage Area H573b1b stores the 2nd location data which indicates the current geographic location of Device B in (x,y,z) format.

Paragraph [0083]—This Paragraph [0083] illustrates the storage area(s) included in Party Icon Data Storage Area H573b4 (Paragraph [0081]). In the present embodiment, Party Icon Data Storage Area H573b4 includes 1st Icon Data Storage Area H573b4a and 2nd Icon Data Storage Area H573b4b. 1st Icon Data Storage Area H573b4a stores the 1st icon data which is the image data of the icon indicating the geographic location of Device A on the map data. 2nd Icon Data Storage Area H573b4b stores the 2nd icon data which is the image data of the icon indicating the geographic location of Device B on the map data.

Paragraph [0084]—This Paragraph [0084] illustrates the data stored in Phone Number Data Storage Area H573b5 (Paragraph [0081]). In the present embodiment, Phone Number Data Storage Area H573b5 comprises two columns, i.e., 'Phone Number ID' and 'Phone Number Data'. Column 'Phone Number ID' stores the phone number IDs, and each phone number ID is an identification of the corresponding phone number data stored in column 'Phone Number Data'. Each phone number ID may be the name or title of the corresponding phone number data. Column 'Phone Number Data' stores the phone number data, and each phone number data is the numeric data indicating a phone number. In the present embodiment, Phone Number Data Storage Area H573b5 stores the following data: 'Phone Number#1' and the corresponding 'Phone Number Data#1'; 'Phone Number#2' and the corresponding 'Phone Number Data#2'; 'Phone Number#3' and the corresponding 'Phone Number Data#3'; and 'Phone Number#4' and the corresponding 'Phone Number Data#4'.

Paragraph [0085]—This Paragraph [0085] illustrates the data stored in Personal Data Storage Area H573b7 (Paragraph [0081]). In the present embodiment, Personal Data Storage Area H573b7 comprises two columns, i.e., 'Phone Number ID' and 'Personal Data'. Column 'Phone Number ID' stores the phone number IDs, and each phone number ID is an identification of the corresponding personal data stored in column 'Personal Data'. The phone number IDs stored in the present column are identical to the ones described in the previous paragraph. Column 'Personal Data' stores the personal data, and each personal data is the data (e.g., name, street address, email address, phone number, and/or fax number) relating to the person indicated by the corresponding phone number data. In the present embodiment, Personal Data Storage Area H573b7 stores the following data: 'Phone Number#1' and the corresponding 'Personal Data#1'; 'Phone Number#2' and the corresponding 'Personal Data#2'; 'Phone Number#3' and the corresponding 'Personal Data#3'; and 'Phone Number#4' and the corresponding 'Personal Data#4'.

Paragraph [0086]—This Paragraph [0086] illustrates the data stored in Phone Call Receiving Log Data Storage Area H573b8 (Paragraph [0081]). In the present embodiment, Phone Call Receiving Log Data Storage Area H573b8 comprises two columns, i.e., 'Phone Call Receiving Log ID' and 'Phone Call Receiving Log Data'. Column 'Phone Call Receiving Log ID' stores the phone call receiving log IDs, and each phone call receiving log ID is an identification of the corresponding phone call receiving log data stored in column 'Phone Call Receiving Log Data'. Each phone call receiving log ID may be the name or title of the corresponding phone call receiving log data. Column 'Phone Call Receiving Log Data' stores the phone call receiving log data, and each phone call receiving log data is the log of the received phone call. In the present embodiment, Phone Call Receiving Log Data Storage Area H573b8 stores the following data: 'Phone Call Receiving Log#1' and the corresponding 'Phone Call Receiving Log Data#1'; 'Phone Call Receiving Log#2' and the corresponding 'Phone Call Receiving Log Data#2'; 'Phone Call Receiving Log#3' and the corresponding 'Phone Call Receiving Log Data#3'; and 'Phone Call Receiving Log#4' and the corresponding 'Phone Call Receiving Log Data#4'. Each phone call receiving log data includes the phone number received data which indicates the phone number of the caller, the current time data at the time the phone call was received, the personal data of the caller, the 1st location data at the time the phone call was received, and/or the 2nd location data at the time the phone call was received.

Paragraph [0087]—This Paragraph [0087] illustrates the storage area(s) included in Party Audiovisual Data Storage Area H573b9 (Paragraph [0081]). In the present embodiment, Party Audiovisual Data Storage Area H573b9 includes 1st Audiovisual Data Storage Area H573b9a and 2nd Audiovisual Data Storage Area H573b9b. 1st Audiovisual Data Storage Area H573b9a stores the 1st audiovisual data which is the audiovisual data of the user of Device A. 2nd Audiovisual Data Storage Area H573b9b stores the 2nd audiovisual data which is the audiovisual data of the user of Device B.

Paragraph [0088]—This Paragraph [0088] illustrates the software program(s) stored in Phone Call Receiving Log Recording Software Storage Area H573c (Paragraph [0080]). In the present embodiment, Phone Call Receiving Log Recording Software Storage Area H573c stores 2nd Location Data Producing Software H573c2, Current Time Data Producing Software H573c3, Phone Call Receiving Software H573c4, Audiovisual Data Exchanging Software H573c5, and Phone Call Receiving Log Data Displaying Software H573c6. 2nd Location Data Producing Software H573c2 is the software program described in Paragraph [0112]. Current Time Data Producing Software H573c3 is the software program described in Paragraph [0113]. Phone Call Receiving Software H573c4 is the software program described in Paragraph [0114]. Audiovisual Data Exchanging Software H573c5 is the software program described in Paragraph [0115]. Phone Call Receiving Log Data Displaying Software H573c6 is the software program described in Paragraph [0116].

Paragraph [0089]—This Paragraph [0089] illustrates the storage area included in RAM 206 (FIG. 1) of Device A. In the present embodiment, RAM 206 includes Phone Call Receiving Log Recording Information Storage Area 206A573a of which the data and the software program(s) stored therein are described in Paragraph [0091].

Paragraph [0090]—The data and/or the software program (s) necessary to implement the present function may be downloaded from Host H (Paragraph [0025]) to Device A in the manner described in Paragraph [0191] through Paragraph [0197].

Paragraph [0091]—This Paragraph [0091] illustrates the storage area(s) included in Phone Call Receiving Log Recording Information Storage Area 206A573a (Paragraph [0089]). In the present embodiment, Phone Call Receiving Log Recording Information Storage Area 206A573a includes Phone Call Receiving Log Recording Data Storage Area 206A573b and Phone Call Receiving Log Recording Software Storage Area 206A573c. Phone Call Receiving Log Recording Data Storage Area 206A573b stores the data necessary to implement the present function on the side of Device A, such as the one(s) described in Paragraph [0092]. Phone Call Receiving Log Recording Software Storage Area 206A573c stores the software program(s) necessary to implement the present function on the side of Device A, such as the one(s) described in Paragraph [0099].

Paragraph [0092]—This Paragraph [0092] illustrates the storage area(s) included in Phone Call Receiving Log Recording Data Storage Area 206A573b (Paragraph [0091]). In the present embodiment, Phone Call Receiving Log Recording Data Storage Area 206A573b includes Party Location Data Storage Area 206A573b1, Current Time Data Storage Area 206A573b2, Map Data Storage Area 206A573b3, Party Icon Data Storage Area 206A573b4, Phone Number Data Storage Area 206A573$b$5, Phone Number Received Data Storage Area 206A573$b$6, Personal Data Storage Area 206A573$b$7, Phone Call Receiving Log Data Storage Area 206A573$b$8, Party Audiovisual Data Storage Area 206A573$b$9, and Work Area 206A573$b$10. Party Location Data Storage Area 206A573$b$1 stores the data described in Paragraph [0093]. Current Time Data Storage Area 206A573$b$2 stores the current time data which indicates the current time and date. Map Data Storage Area 206A573$b$3 stores the map data which is the image data indicating a map. Party Icon Data Storage Area 206A573$b$4 stores the data described in Paragraph [0094]. Phone Number Data Storage Area 206A573$b$5 stores the data described in Paragraph [0095]. Phone Number Received Data Storage Area 206A573$b$6 stores the phone number received data which indicates the phone number of the caller. Personal Data Storage Area 206A573$b$7 stores the data described in Paragraph [0096]. Phone Call Receiving Log Data Storage Area 206A573$b$8 stores the data described in Paragraph [0097]. Party Audiovisual Data Storage Area 206A573$b$9 stores the data described in Paragraph [0098]. Work Area 206A573$b$10 is utilized as a work area to perform calculation and temporarily store data.

Paragraph [0093]—This Paragraph [0093] illustrates the storage area(s) included in Party Location Data Storage Area 206A573$b$1 (Paragraph [0092]). In the present embodiment, Party Location Data Storage Area 206A573$b$1 includes 1st Location Data Storage Area 206A573$b$1$a$ and 2nd Location Data Storage Area 206A573$b$1$b$. 1st Location Data Storage Area 206A573$b$1$a$ stores the 1st location data which indicates the current geographic location of Device A in (x,y,z) format. 2nd Location Data Storage Area 206A573$b$1$b$ stores the 2nd location data which indicates the current geographic location of Device B in (x,y,z) format.

Paragraph [0094]—This Paragraph [0094] illustrates the storage area(s) included in Party Icon Data Storage Area 206A573$b$4 (Paragraph [0092]). In the present embodiment, Party Icon Data Storage Area 206A573$b$4 includes 1st Icon Data Storage Area 206A573$b$4$a$ and 2nd Icon Data Storage Area 206A573$b$4$b$. 1st Icon Data Storage Area 206A573$b$4$a$ stores the 1st icon data which is the image data of the icon indicating the geographic location of Device A on the map data. 2nd Icon Data Storage Area 206A573$b$4$b$ stores the 2nd icon data which is the image data of the icon indicating the geographic location of Device B on the map data.

Paragraph [0095]—This Paragraph [0095] illustrates the data stored in Phone Number Data Storage Area 206A573$b$5 (Paragraph [0092]). In the present embodiment, Phone Number Data Storage Area 206A573$b$5 comprises two columns, i.e., 'Phone Number ID' and 'Phone Number Data'. Column 'Phone Number ID' stores the phone number IDs, and each phone number ID is an identification of the corresponding phone number data stored in column 'Phone Number Data'. Each phone number ID may be the name or title of the corresponding phone number data. Column 'Phone Number Data' stores the phone number data, and each phone number data is the numeric data indicating a phone number. In the present embodiment, Phone Number Data Storage Area 206A573$b$5 stores the following data: 'Phone Number#1' and the corresponding 'Phone Number Data#1'; 'Phone Number#2' and the corresponding 'Phone Number Data#2'; 'Phone Number#3' and the corresponding 'Phone Number Data#3'; and 'Phone Number#4' and the corresponding 'Phone Number Data#4'.

Paragraph [0096]—This Paragraph [0096] illustrates the data stored in Personal Data Storage Area 206A573$b$7 (Paragraph [0092]). In the present embodiment, Personal Data Storage Area 206A573$b$7 comprises two columns, i.e., 'Phone Number ID' and 'Personal Data'. Column 'Phone Number ID' stores the phone number IDs, and each phone number ID is an identification of the corresponding personal data stored in column 'Personal Data'. The phone number IDs stored in the present column are identical to the ones described in the previous paragraph. Column 'Personal Data' stores the personal data, and each personal data is the data (e.g., name, street address, email address, phone number, and/or fax number) relating to the person indicated by the corresponding phone number data. In the present embodiment, Personal Data Storage Area 206A573$b$7 stores the following data: 'Phone Number#1' and the corresponding 'Personal Data#1'; 'Phone Number#2' and the corresponding 'Personal Data#2'; 'Phone Number#3' and the corresponding 'Personal Data#3'; and 'Phone Number#4' and the corresponding 'Personal Data#4'.

Paragraph [0097]—This Paragraph [0097] illustrates the data stored in Phone Call Receiving Log Data Storage Area 206A573$b$8 (Paragraph [0092]). In the present embodiment, Phone Call Receiving Log Data Storage Area 206A573$b$8 comprises two columns, i.e., 'Phone Call Receiving Log ID' and 'Phone Call Receiving Log Data'. Column 'Phone Call Receiving Log ID' stores the phone call receiving log IDs, and each phone call receiving log ID is an identification of the corresponding phone call receiving log data stored in column 'Phone Call Receiving Log Data'. Each phone call receiving log ID may be the name or title of the corresponding phone call receiving log data. Column 'Phone Call Receiving Log Data' stores the phone call receiving log data, and each phone call receiving log data is the log of the received phone call. In the present embodiment, Phone Call Receiving Log Data Storage Area 206A573$b$8 stores the following data: 'Phone Call Receiving Log#1' and the corresponding 'Phone Call Receiving Log Data#1'; 'Phone Call Receiving Log#2' and the corresponding 'Phone Call Receiving Log Data#2'; 'Phone Call Receiving Log#3' and the corresponding 'Phone Call Receiving Log Data#3'; and 'Phone Call Receiving Log#4' and the corresponding 'Phone Call Receiving Log Data#4'. Each phone call receiving log data includes the phone number received data which indicates the phone number of the caller, the current time data at the time the phone call was received, the personal data of the caller, the 1st location data at the time the phone call was received, and/or the 2nd location data at the time the phone call was received.

Paragraph [0098]—This Paragraph [0098] illustrates the storage area(s) included in Party Audiovisual Data Storage Area 206A573$b$9 (Paragraph [0092]). In the present embodiment, Party Audiovisual Data Storage Area 206A573$b$9 includes 1st Audiovisual Data Storage Area 206A573$b$9$a$ and 2nd Audiovisual Data Storage Area 206A573$b$9$b$. 1st Audiovisual Data Storage Area 206A573$b$9$a$ stores the 1st audiovisual data which is the audiovisual data of the user of Device A. 2nd Audiovisual Data Storage Area 206A573$b$9$b$ stores the 2nd audiovisual data which is the audiovisual data of the user of Device B.

Paragraph [0099]—This Paragraph [0099] illustrates the software program(s) stored in Phone Call Receiving Log Recording Software Storage Area 206A573$c$ (Paragraph [0091]). In the present embodiment, Phone Call Receiving Log Recording Software Storage Area 206A573$c$ stores 1st Location Data Producing Software 206A573$c$1, Phone Call Receiving Software 206A573$c$4, and Audiovisual Data Exchanging Software 206A573$c$5. 1st Location Data Producing Software 206A573$c$1 is the software program described in Paragraph [0111] and Paragraph [0118]. Phone Call Receiving Software 206A573$c$4 is the software program described in Paragraph [0114] and Paragraph [0121]. Audiovisual Data Exchanging Software 206A573c5 is the software program described in Paragraph [0115], and Paragraph [0122].

Paragraph [0100]—This Paragraph [0100] illustrates the storage area included in RAM 206 (FIG. 1) of Device B. In the present embodiment, RAM 206 includes Phone Call Receiving Log Recording Information Storage Area 206B573a of which the data and the software program(s) stored therein are described in Paragraph [0102].

Paragraph [0101]—The data and/or the software program(s) necessary to implement the present function may be downloaded from Host H (Paragraph [0025]) to Device B in the manner described in Paragraph [0191] through Paragraph [0197].

Paragraph [0102]—This Paragraph [0102] illustrates the storage area(s) included in Phone Call Receiving Log Recording Information Storage Area 206B573a (Paragraph [0100]). In the present embodiment, Phone Call Receiving Log Recording Information Storage Area 206B573a includes Phone Call Receiving Log Recording Data Storage Area 206B573b and Phone Call Receiving Log Recording Software Storage Area 206B573c. Phone Call Receiving Log Recording Data Storage Area 206B573b stores the data necessary to implement the present function on the side of Device B, such as the one(s) described in Paragraph [0103]. Phone Call Receiving Log Recording Software Storage Area 206B573c stores the software program(s) necessary to implement the present function on the side of Device B, such as the one(s) described in Paragraph [0110].

Paragraph [0103]—This Paragraph [0103] illustrates the storage area(s) included in Phone Call Receiving Log Recording Data Storage Area 206B573b (Paragraph [0102]). In the present embodiment, Phone Call Receiving Log Recording Data Storage Area 206B573b includes Party Location Data Storage Area 206B573b1, Current Time Data Storage Area 206B573b2, Map Data Storage Area 206B573b3, Party Icon Data Storage Area 206B573b4, Phone Number Data Storage Area 206B573b5, Phone Number Received Data Storage Area 206B573b6, Personal Data Storage Area 206B573b7, Phone Call Receiving Log Data Storage Area 206B573b8, Party Audiovisual Data Storage Area 206B573b9, and Work Area 206B573b10. Party Location Data Storage Area 206B573b1 stores the data described in Paragraph [0104]. Current Time Data Storage Area 206B573b2 stores the current time data which indicates the current time and date. Map Data Storage Area 206B573b3 stores the map data which is the image data indicating a map. Party Icon Data Storage Area 206B573b4 stores the data described in Paragraph [0105]. Phone Number Data Storage Area 206B573b5 stores the data described in Paragraph [0106]. Phone Number Received Data Storage Area 206B573b6 stores the phone number received data which indicates the phone number of the caller. Personal Data Storage Area 206B573b7 stores the data described in Paragraph [0107]. Phone Call Receiving Log Data Storage Area 206B573b8 stores the data described in Paragraph [0108]. Party Audiovisual Data Storage Area 206B573b9 stores the data described in Paragraph [0109]. Work Area 206B573b10 is utilized as a work area to perform calculation and temporarily store data.

Paragraph [0104]—This Paragraph [0104] illustrates the storage area(s) included in Party Location Data Storage Area 206B573b1 (Paragraph [0103]). In the present embodiment, Party Location Data Storage Area 206B573b1 includes 1st Location Data Storage Area 206B573b1a and 2nd Location Data Storage Area 206B573b1b. 1st Location Data Storage Area 206B573b1a stores the 1st location data which indicates the current geographic location of Device A in (x,y,z) format. 2nd Location Data Storage Area 206B573b1b stores the 2nd location data which indicates the current geographic location of Device B in (x,y,z) format.

Paragraph [0105]—This Paragraph [0105] illustrates the storage area(s) included in Party Icon Data Storage Area 206B573b4 (Paragraph [0103]). In the present embodiment, Party Icon Data Storage Area 206B573b4 includes 1st Icon Data Storage Area 206B573b4a and 2nd Icon Data Storage Area 206B573b4b. 1st Icon Data Storage Area 206B573b4a stores the 1st icon data which is the image data of the icon indicating the geographic location of Device A on the map data. 2nd Icon Data Storage Area 206B573b4b stores the 2nd icon data which is the image data of the icon indicating the geographic location of Device B on the map data.

Paragraph [0106]—This Paragraph [0106] illustrates the data stored in Phone Number Data Storage Area 206B573b5 (Paragraph [0103]). In the present embodiment, Phone Number Data Storage Area 206B573b5 comprises two columns, i.e., 'Phone Number ID' and 'Phone Number Data'. Column 'Phone Number ID' stores the phone number IDs, and each phone number ID is an identification of the corresponding phone number data stored in column 'Phone Number Data'. Each phone number ID may be the name or title of the corresponding phone number data. Column 'Phone Number Data' stores the phone number data, and each phone number data is the numeric data indicating a phone number. In the present embodiment, Phone Number Data Storage Area 206B573b5 stores the following data: 'Phone Number#1' and the corresponding 'Phone Number Data#1'; 'Phone Number#2' and the corresponding 'Phone Number Data#2'; 'Phone Number#3' and the corresponding 'Phone Number Data#3'; and 'Phone Number#4' and the corresponding 'Phone Number Data#4'.

Paragraph [0107]—This Paragraph [0107] illustrates the data stored in Personal Data Storage Area 206B573b7 (Paragraph [0103]). In the present embodiment, Personal Data Storage Area 206B573b7 comprises two columns, i.e., 'Phone Number ID' and 'Personal Data'. Column 'Phone Number ID' stores the phone number IDs, and each phone number ID is an identification of the corresponding personal data stored in column 'Personal Data'. The phone number IDs stored in the present column are identical to the ones described in the previous paragraph. Column 'Personal Data' stores the personal data, and each personal data is the data (e.g., name, street address, email address, phone number, and/or fax number) relating to the person indicated by the corresponding phone number data. In the present embodiment, Personal Data Storage Area 206B573b7 stores the following data: 'Phone Number#1' and the corresponding 'Personal Data#1'; 'Phone Number#2' and the corresponding 'Personal Data#2'; 'Phone Number#3' and the corresponding 'Personal Data#3'; and 'Phone Number#4' and the corresponding 'Personal Data#4'.

Paragraph [0108]—This Paragraph [0108] illustrates the data stored in Phone Call Receiving Log Data Storage Area 206B573b8 (Paragraph [0103]). In the present embodiment, Phone Call Receiving Log Data Storage Area 206B573b8 comprises two columns, i.e., 'Phone Call Receiving Log ID' and 'Phone Call Receiving Log Data'. Column 'Phone Call Receiving Log ID' stores the phone call receiving log IDs, and each phone call receiving log ID is an identification of the corresponding phone call receiving log data stored in column 'Phone Call Receiving Log Data'. Each phone call receiving log ID may be the name or title of the corresponding phone call receiving log data. Column 'Phone Call Receiving Log Data' stores the phone call receiving log data, and each phone call receiving log data is the log of the received phone call. In the present embodiment, Phone Call Receiving Log Data Storage Area 206B573b8 stores the following data: 'Phone Call Receiving Log#1' and the corresponding 'Phone Call Receiving Log Data#1'; 'Phone Call Receiving Log#2' and the corresponding 'Phone Call Receiving Log Data#2'; 'Phone Call Receiving Log#3' and the corresponding 'Phone Call Receiving Log Data#3'; and 'Phone Call Receiving Log#4' and the corresponding 'Phone Call Receiving Log Data#4'. Each phone call receiving log data includes the phone number received data which indicates the phone number of the caller, the current time data at the time the phone call was received, the personal data of the caller, the 1st location data at the time the phone call was received, and/or the 2nd location data at the time the phone call was received.

Paragraph [0109]—This Paragraph [0109] illustrates the storage area(s) included in Party Audiovisual Data Storage Area 206B573b9 (Paragraph [0103]). In the present embodiment, Party Audiovisual Data Storage Area 206B573b9 includes 1st Audiovisual Data Storage Area 206B573b9a and 2nd Audiovisual Data Storage Area 206B573b9b. 1st Audiovisual Data Storage Area 206B573b9a stores the 1st audiovisual data which is the audiovisual data of the user of Device A. 2nd Audiovisual Data Storage Area 206B573b9b stores the 2nd audiovisual data which is the audiovisual data of the user of Device B.

Paragraph [0110]—This Paragraph [0110] illustrates the software program(s) stored in Phone Call Receiving Log Recording Software Storage Area 206B573c (Paragraph [0102]). In the present embodiment, Phone Call Receiving Log Recording Software Storage Area 206B573c stores 1st Location Data Producing Software 206B573c1, 2nd Location Data Producing Software 206B573c2, Current Time Data Producing Software 206B573c3, Phone Call Receiving Software 206B573c4, Audiovisual Data Exchanging Software 206B573c5, and Phone Call Receiving Log Data Displaying Software 206B573c6. 1st Location Data Producing Software 206B573c1 is the software program described in Paragraph [0111]. 2nd Location Data Producing Software 206B573c2 is the software program described in Paragraph [0112] and Paragraph [0119]. Current Time Data Producing Software 206B573c3 is the software program described in Paragraph [0120]. Phone Call Receiving Software 206B573c4 is the software program described in Paragraph [0114] and Paragraph [0121]. Audiovisual Data Exchanging Software 206B573c5 is the software program described in Paragraph [0115], and Paragraph [0122]. Phone Call Receiving Log Data Displaying Software 206B573c6 is the software program described in Paragraph [0116], and Paragraph [0123].

Paragraph [0111]—This Paragraph [0111] illustrate(s) 1st Location Data Producing Software 206A573c1 (Paragraph [0099]) of Device A, which produce(s) the 1st location data. In the present embodiment, CPU 211 (FIG. 1) of Device A identifies the current location of Device A (S1). CPU 211 (FIG. 1) of Device A produces the 1st location data by utilizing the current location identified in the previous step (S2). CPU 211 (FIG. 1) of Device A stores the 1st location data produced in the previous step in 1st Location Data Storage Area 206A573b1a (Paragraph [0093]) (S3). The foregoing sequence is repeated periodically.

Paragraph [0112]—This Paragraph [0112] illustrate(s) 2nd Location Data Producing Software H573c2 (Paragraph [0088]) of Host H (Paragraph [0025]) and 2nd Location Data Producing Software 206B573c2 (Paragraph [0110]) of Device B, which produce(s) the 2nd location data. In the present embodiment, CPU 211 (FIG. 1) of Device B identifies the current location of Device B (S1). CPU 211 (FIG. 1) of Device B produces the 2nd location data by utilizing the current location identified in the previous step and sends the data to Host H (Paragraph [0025]) in a wireless fashion (S2). Host H (Paragraph [0025]) receives the 2nd location data from Device B and stores the data in 2nd Location Data Storage Area H573b1b (Paragraph [0082]) (S3). The foregoing sequence is repeated periodically.

Paragraph [0113]—This Paragraph [0113] illustrate(s) Current Time Data Producing Software H573c3 (Paragraph [0088]) of Host H (Paragraph [0025]), which produce(s) the current time data. In the present embodiment, Host H (Paragraph [0025]) identifies the current time and date (S1). Host H (Paragraph [0025]) produces the current time data by referring to the current time and date identified in the previous step (S2). Host H (Paragraph [0025]) stores the current time data produced in the previous step in Current Time Data Storage Area H573b2 (Paragraph [0081]) (S3). The foregoing sequence is repeated periodically.

Paragraph [0114]—This Paragraph [0114] illustrate(s) Phone Call Receiving Software H573c4 (Paragraph [0088]) of Host H (Paragraph [0025]), Phone Call Receiving Software 206A573c4 (Paragraph [0099]) of Device A, and Phone Call Receiving Software 206B573c4 (Paragraph [0110]) of Device B, which receive(s) phone call. Assuming that Device B receives a phone call from Device A. In the present embodiment, Host H (Paragraph [0025]) periodically checks the incoming signal (S1). If the phone conversation request is detected in the incoming signal, Host H (Paragraph [0025]) proceeds to the next step (S2). Here, the phone conversation request is the request to implement phone conversation. The phone conversation request includes the phone number of the caller. Assuming that Device B receives the phone conversation request sent by Device A. Host H (Paragraph [0025]) sends the phone conversation request detected in the previous step to Device B (S3). CPU 211 (FIG. 1) of Device B receives the phone conversation request from Host H (Paragraph [0025]) in a wireless fashion (S4). If the phone call is answered by Device B, CPU 211 (FIG. 1) of Device B proceeds to the next step (S5). CPU 211 (FIG. 1) of Device B sends the phone call answered notice to Host H (Paragraph [0025]) in a wireless fashion (S6). Here, the phone call answered notice indicates that the phone call is answered. Host H (Paragraph [0025]) receives the phone call answered notice from Device B and sends the data to Device A (S7). CPU 211 (FIG. 1) of Device A receives the phone call answered notice from Host H (Paragraph [0025]) in a wireless fashion (S8). Host H (Paragraph [0025]) retrieves the phone number of Device A from the phone conversation request detected in S2 (S9). Host H (Paragraph [0025]) stores the phone number retrieved in the previous step as the phone number received data in Phone Number Received Data Storage Area H573b6 (Paragraph [0081]) (S10). Host H (Paragraph [0025]) retrieves the phone number received data from Phone Number Received Data Storage Area H573b6 (Paragraph [0081]) (S11). Host H (Paragraph [0025]) stores the phone number received data retrieved in the previous step in Work Area H573b10 (Paragraph [0081]) (S12). Host H (Paragraph [0025]) retrieves the current time data from Current Time Data Storage Area H573b2 (Paragraph [0081]) (S13). Host H (Paragraph [0025]) stores the current time data retrieved in the previous step in Work Area H573b10 (Paragraph [0081]) (S14). Host H (Paragraph [0025]) sends the 1st location data transferring request to Device A (S15). Here, the 1st location data transferring request is the request to transfer the 1st location data. CPU 211 (FIG. 1) of Device A receives the 1st location data transferring request from Host H (Paragraph [0025]) in a wireless fashion (S16). CPU 211 (FIG. 1) of Device A retrieves the 1st location data from 1st Location Data Storage Area 206A573b1a (Paragraph [0093]) and sends the data to Host H (Paragraph [0025]) in a wireless fashion (S17). Host H (Paragraph [0025]) receives the 1st location data from Device A and stores the data in 1st Location Data Storage Area H573b1a (Paragraph [0082]) (S18). Host H (Paragraph [0025]) retrieves the 1st location data from 1st Location Data Storage Area H573b1a (Paragraph [0082]) and stores the data in Work Area H573b10 (Paragraph [0081]) (S19). Host H (Paragraph [0025]) retrieves the 2nd location data from 2nd Location Data Storage Area H573b1b (Paragraph [0082]) (S20). Host H (Paragraph [0025]) stores the 2nd location data retrieved in the previous step in Work Area H573b10 (Paragraph [0081]) (S21). Host H (Paragraph [0025]) retrieves the phone number received data from Phone Number Received Data Storage Area H573b6 (Paragraph [0081]) (S22). Host H (Paragraph [0025]) identifies the phone number data (e.g., Phone Number Data#1) identical to the phone number received data retrieved in the previous step in Phone Number Data Storage Area H573b5 (Paragraph [0084]) (S23). Host H (Paragraph [0025]) identifies the personal data (e.g., Personal Data#1) corresponding to the phone number data (e.g., Phone Number Data#1) identified in the previous step in Personal Data Storage Area H573b7 (Paragraph [0085]) (S24). Host H (Paragraph [0025]) retrieves the personal data (e.g., Personal Data#1) identified in the previous step from Personal Data Storage Area H573b7 (Paragraph [0085]) (S25). Host H (Paragraph [0025]) stores the personal data (e.g., Personal Data#1) retrieved in the previous step in Work Area H573b10 (Paragraph [0081]) (S26). Host H (Paragraph [0025]) retrieves the phone number received data, the current time data, the 1st location data, the 2nd location data, and the personal data (e.g., Personal Data#1) from Work Area H573b10 (Paragraph [0081]) and produces the phone call receiving log data (e.g., Phone Call Receiving Log Data#4) therefrom (S27). Host H (Paragraph [0025]) stores the phone call receiving log data (e.g., Phone Call Receiving Log Data#4) produced in the previous step in Phone Call Receiving Log Data Storage Area H573b8 (Paragraph [0086]) (S28). The sequence described in the next paragraph is implemented (S29). The foregoing sequence is repeated periodically.

Paragraph [0115]—This Paragraph [0115] illustrate(s) Audiovisual Data Exchanging Software H573c5 (Paragraph [0088]) of Host H (Paragraph [0025]), Audiovisual Data Exchanging Software 206A573c5 (Paragraph [0099]) of Device A, and Audiovisual Data Exchanging Software 206B573c5 (Paragraph [0110]) of Device B, which exchange(s) the 1st audiovisual data and the 2nd audiovisual data. In the present embodiment, CPU 211 (FIG. 1) of Device A retrieves audio data from Microphone 215 (FIG. 1) and visual data from CCD Unit 214 (FIG. 1) of Device A (S1). CPU 211 (FIG. 1) of Device A produces the 1st audiovisual data by utilizing the audio data and the visual data retrieved in the previous step (S2). CPU 211 (FIG. 1) of Device A stores the 1st audiovisual data produced in the previous step in 1st Audiovisual Data Storage Area 206A573b9a (Paragraph [0098]) (S3). CPU 211 (FIG. 1) of Device A retrieves the 1st audiovisual data from 1st Audiovisual Data Storage Area 206A573b9a (Paragraph [0098]) (S4). CPU 211 (FIG. 1) of Device A outputs the 1st audiovisual data retrieved in the previous step from Speaker 216 (FIG. 1) and LCD 201 (FIG. 1) of Device A (S5). CPU 211 (FIG. 1) of Device A retrieves the 1st audiovisual data from 1st Audiovisual Data Storage Area 206A573b9a (Paragraph [0098]) and sends the data to Host H (Paragraph [0025]) in a wireless fashion (S6). Host H (Paragraph [0025]) receives the 1st audiovisual data from Device A and stores the data in 1st Audiovisual Data Storage Area H573b9a (Paragraph [0087]) (S7). Host H (Paragraph [0025]) retrieves the 1st audiovisual data from 1st Audiovisual Data Storage Area H573b9a (Paragraph [0087]) and sends the data to Device B (S8). CPU 211 (FIG. 1) of Device B receives the 1st audiovisual data from Host H (Paragraph [0025]) in a wireless fashion and outputs the data from Speaker 216 (FIG. 1) and LCD 201 (FIG. 1) of Device B (S9). CPU 211 (FIG. 1) of Device B retrieves audio data from Microphone 215 (FIG. 1) and visual data from CCD Unit 214 (FIG. 1) of Device B (S10). CPU 211 (FIG. 1) of Device B produces the 2nd audiovisual data by utilizing the audio data and the visual data retrieved in the previous step and sends the data to Host H (Paragraph [0025]) in a wireless fashion (S11). Host H (Paragraph [0025]) receives the 2nd audiovisual data from Device B and stores the data in 2nd Audiovisual Data Storage Area H573b9b (Paragraph [0087]) (S12). Host H (Paragraph [0025]) retrieves the 2nd audiovisual data from 2nd Audiovisual Data Storage Area H573b9b (Paragraph [0087]) and sends the data to Device B (S13). CPU 211 (FIG. 1) of Device B receives the 2nd audiovisual data from Host H (Paragraph [0025]) in a wireless fashion and outputs the data from Speaker 216 (FIG. 1) and LCD 201 (FIG. 1) of Device B (S14). Host H (Paragraph [0025]) retrieves the 2nd audiovisual data from 2nd Audiovisual Data Storage Area H573b9b (Paragraph [0087]) and sends the data to Device A (S15). CPU 211 (FIG. 1) of Device A receives the 2nd audiovisual data from Host H (Paragraph [0025]) in a wireless fashion and stores the data in 2nd Audiovisual Data Storage Area 206A573b9b (Paragraph [0098]) (S16). CPU 211 (FIG. 1) of Device A retrieves the 2nd audiovisual data from 2nd Audiovisual Data Storage Area 206A573b9b (Paragraph [0098]) and outputs the data from Speaker 216 (FIG. 1) and LCD 201 (FIG. 1) of Device A (S17). The foregoing sequence is repeated periodically.

Paragraph [0116]—This Paragraph [0116] illustrate(s) Phone Call Receiving Log Data Displaying Software H573c6 (Paragraph [0088]) of Host H (Paragraph [0025]) and Phone Call Receiving Log Data Displaying Software 206B573c6 (Paragraph [0110]) of Device B, which display(s) the phone call receiving log data. In the present embodiment, the user of Device B inputs, by utilizing Input Device 210 (FIG. 1) or via voice recognition system, the phone call receiving log data displaying command (S1). Here, the phone call receiving log data displaying command is the command to display the phone call receiving log data. CPU 211 (FIG. 1) of Device B sends the phone call receiving log data displaying command input in the previous step to Host H (Paragraph [0025]) in a wireless fashion (S2). Host H (Paragraph [0025]) receives the phone call receiving log data displaying command from Device B (S3). Host H (Paragraph [0025]) retrieves all phone call receiving log IDs (e.g., Phone Call Receiving Log#1 through #4) from Phone Call Receiving Log Data Storage Area H573b8 (Paragraph [0086]) and sends the data to Device B (S4). CPU 211 (FIG. 1) of Device B receives the phone call receiving log IDs (e.g., Phone Call Receiving Log#1 through #4) from Host H (Paragraph [0025]) in a wireless fashion and displays the data on LCD 201 (FIG. 1) of Device B (S5). The user of Device B selects, by utilizing Input Device 210 (FIG. 1) or via voice recognition system, a phone call receiving log ID (e.g., Phone Call Receiving Log#4) (S6). CPU 211 (FIG. 1) of Device B sends the phone call receiving log ID (e.g., Phone Call Receiving Log#4) selected in the previous step to Host H (Paragraph [0025]) in a wireless fashion (S7). Host H (Paragraph [0025]) receives the phone call receiving log ID (e.g., Phone Call Receiving Log#4) from Device B (S8). Host H (Paragraph [0025]) retrieves the phone call receiving log data (e.g., Phone Call Receiving Log Data#4) corresponding to the phone call receiving log ID (e.g., Phone Call Receiving Log#4) received in the previous step from Phone Call Receiving Log Data Storage Area H573*b*8 (Paragraph [0086]) (S9). Host H (Paragraph [0025]) stores the phone call receiving log data (e.g., Phone Call Receiving Log Data#4) retrieved in the previous step in Work Area H573*b*10 (Paragraph [0081]) (S10). Host H (Paragraph [0025]) retrieves the phone number received data from the phone call receiving log data (e.g., Phone Call Receiving Log Data#4) stored in the previous step and sends the data to Device B (S11). CPU 211 (FIG. 1) of Device B receives the phone number received data from Host H (Paragraph [0025]) in a wireless fashion and displays the data on LCD 201 (FIG. 1) of Device B (S12). Host H (Paragraph [0025]) retrieves the current time data from the phone call receiving log data (e.g., Phone Call Receiving Log Data#4) stored in S10 and sends the data to Device B (S13). CPU 211 (FIG. 1) of Device B receives the current time data from Host H (Paragraph [0025]) in a wireless fashion and displays the data on LCD 201 (FIG. 1) of Device B (S14). Host H (Paragraph [0025]) retrieves the personal data (e.g., Personal Data#1) from the phone call receiving log data (e.g., Phone Call Receiving Log Data#4) stored in S10 and sends the data to Device B (S15). CPU 211 (FIG. 1) of Device B receives the personal data (e.g., Personal Data#1) from Host H (Paragraph [0025]) in a wireless fashion and displays the data on LCD 201 (FIG. 1) of Device B (S16). Host H (Paragraph [0025]) retrieves the map data from Map Data Storage Area H573*b*3 (Paragraph [0081]) and sends the data to Device B (S17). CPU 211 (FIG. 1) of Device B receives the map data from Host H (Paragraph [0025]) in a wireless fashion and displays the data on LCD 201 (FIG. 1) of Device B (S18). Host H (Paragraph [0025]) retrieves the 1st location data from the phone call receiving log data (e.g., Phone Call Receiving Log Data#4) stored in S10 and sends the data to Device B (S19). CPU 211 (FIG. 1) of Device B receives the 1st location data from Host H (Paragraph [0025]) in a wireless fashion (S20). Host H (Paragraph [0025]) retrieves the 1st icon data from 1st Icon Data Storage Area H573*b*4*a* (Paragraph [0083]) and sends the data to Device B (S21). CPU 211 (FIG. 1) of Device B receives the 1st icon data from Host H (Paragraph [0025]) in a wireless fashion (S22). CPU 211 (FIG. 1) of Device B displays the 1st icon data received in the previous step at the location corresponding to the 1st location data received in S20 on the map data displayed in S18 (S23). Host H (Paragraph [0025]) retrieves the 2nd location data from the phone call receiving log data (e.g., Phone Call Receiving Log Data#4) stored in S10 and sends the data to Device B (S24). CPU 211 (FIG. 1) of Device B receives the 2nd location data from Host H (Paragraph [0025]) in a wireless fashion (S25). Host H (Paragraph [0025]) retrieves the 2nd icon data from 2nd Icon Data Storage Area H573*b*4*b* (Paragraph [0083]) and sends the data to Device B (S26). CPU 211 (FIG. 1) of Device B receives the 2nd icon data from Host H (Paragraph [0025]) in a wireless fashion (S27). CPU 211 (FIG. 1) of Device B displays the 2nd icon data received in the previous step at the location corresponding to the 2nd location data received in S25 on the map data displayed in S18 (S28). Thus, the phone number received data from which the phone call was received, the current time data at the time the phone call was received, the 1st location data at the time the phone call was received, the 2nd location data at the time the phone call was received, and the personal data of the caller are indicated on LCD 201 (FIG. 1) of Device B.

Paragraph [0117]—Paragraph [0118] through Paragraph [0123] illustrate another embodiment wherein Device B plays the major role in implementing the present function.

Paragraph [0118]—This Paragraph [0118] illustrate(s) 1st Location Data Producing Software 206A573*c*1 (Paragraph [0099]) of Device A, which produce(s) the 1st location data. In the present embodiment, CPU 211 (FIG. 1) of Device A identifies the current location of Device A (S1). CPU 211 (FIG. 1) of Device A produces the 1st location data by utilizing the current location identified in the previous step (S2). CPU 211 (FIG. 1) of Device A stores the 1st location data produced in the previous step in 1st Location Data Storage Area 206A573*b*1*a* (Paragraph [0093]) (S3). The foregoing sequence is repeated periodically.

Paragraph [0119]—This Paragraph [0119] illustrate(s) 2nd Location Data Producing Software 206B573*c*2 (Paragraph [0110]) of Device B, which produce(s) the 2nd location data. In the present embodiment, CPU 211 (FIG. 1) of Device B identifies the current location of Device B (S1). CPU 211 (FIG. 1) of Device B produces the 2nd location data by utilizing the current location identified in the previous step (S2). CPU 211 (FIG. 1) of Device B stores the 2nd location data produced in the previous step in 2nd Location Data Storage Area 206B573*b*1*b* (Paragraph [0104]) (S3). The foregoing sequence is repeated periodically.

Paragraph [0120]—This Paragraph [0120] illustrate(s) Current Time Data Producing Software 206B573*c*3 (Paragraph [0110]) of Device B, which produce(s) the current time data. In the present embodiment, CPU 211 (FIG. 1) of Device B identifies the current time and date (S1). CPU 211 (FIG. 1) of Device B produces the current time data by referring to the current time and date identified in the previous step (S2). CPU 211 (FIG. 1) of Device B stores the current time data produced in the previous step in Current Time Data Storage Area 206B573*b*2 (Paragraph [0103]) (S3). The foregoing sequence is repeated periodically.

Paragraph [0121]—This Paragraph [0121] illustrate(s) Phone Call Receiving Software 206A573*c*4 (Paragraph [0099]) of Device A and Phone Call Receiving Software 206B573*c*4 (Paragraph [0110]) of Device B, which receive(s) phone call. Assuming that Device B receives a phone call from Device A. In the present embodiment, CPU 211 (FIG. 1) of Device B periodically checks the incoming signal (S1). If the phone conversation request is detected in the incoming signal, CPU 211 (FIG. 1) of Device B proceeds to the next step (S2). Here, the phone conversation request is the request to implement phone conversation. The phone conversation request includes the phone number of the caller. Assuming that Device B receives the phone conversation request sent by Device A. If the phone call is answered by Device B, CPU 211 (FIG. 1) of Device B proceeds to the next step (S3). CPU 211 (FIG. 1) of Device B sends the phone call answered notice to Device A in a wireless fashion (S4). Here, the phone call answered notice indicates that the phone call is answered. CPU 211 (FIG. 1) of Device A receives the phone call answered notice from Device B in a wireless fashion (S5). CPU 211 (FIG. 1) of Device B retrieves the phone number of Device A from the phone conversation request detected in S2 (S6). CPU 211 (FIG. 1) of Device B stores the phone number retrieved in the previous step as the phone number received data in Phone Number Received Data Storage Area 206B573*b*6 (Paragraph [0103]) (S7). CPU 211 (FIG. 1) of Device B retrieves the phone number received data from Phone Number Received Data Storage Area 206B573*b*6 (Paragraph [0103]) (S8). CPU 211 (FIG. 1) of Device B stores the phone number received data retrieved in the previous step in Work Area 206B573*b*10 (Paragraph [0103]) (S9). CPU 211

(FIG. 1) of Device B retrieves the current time data from Current Time Data Storage Area 206B573b2 (Paragraph [0103]) (S10). CPU 211 (FIG. 1) of Device B stores the current time data retrieved in the previous step in Work Area 206B573b10 (Paragraph [0103]) (S11). CPU 211 (FIG. 1) of Device B sends the 1st location data transferring request to Device A in a wireless fashion (S12). Here, the 1st location data transferring request is the request to transfer the 1st location data. CPU 211 (FIG. 1) of Device A receives the 1st location data transferring request from Device B in a wireless fashion (S13). CPU 211 (FIG. 1) of Device A retrieves the 1st location data from 1st Location Data Storage Area 206A573b1a (Paragraph [0093]) and sends the data to Device B in a wireless fashion (S14). CPU 211 (FIG. 1) of Device B receives the 1st location data from Device A in a wireless fashion and stores the data in 1st Location Data Storage Area 206B573b1a (Paragraph [0104]) (S15). CPU 211 (FIG. 1) of Device B retrieves the 1st location data from 1st Location Data Storage Area 206B573b1a (Paragraph [0104]) and stores the data in Work Area 206B573b10 (Paragraph [0103]) (S16). CPU 211 (FIG. 1) of Device B retrieves the 2nd location data from 2nd Location Data Storage Area 206B573b1b (Paragraph [0104]) (S17). CPU 211 (FIG. 1) of Device B stores the 2nd location data retrieved in the previous step in Work Area 206B573b10 (Paragraph [0103]) (S18). CPU 211 (FIG. 1) of Device B retrieves the phone number received data from Phone Number Received Data Storage Area 206B573b6 (Paragraph [0103]) (S19). CPU 211 (FIG. 1) of Device B identifies the phone number data (e.g., Phone Number Data#1) identical to the phone number received data retrieved in the previous step in Phone Number Data Storage Area 206B573b5 (Paragraph [0106]) (S20). CPU 211 (FIG. 1) of Device B identifies the personal data (e.g., Personal Data#1) corresponding to the phone number data (e.g., Phone Number Data#1) identified in the previous step in Personal Data Storage Area 206B573b7 (Paragraph [0107]) (S21). CPU 211 (FIG. 1) of Device B retrieves the personal data (e.g., Personal Data#1) identified in the previous step from Personal Data Storage Area 206B573b7 (Paragraph [0107]) (S22). CPU 211 (FIG. 1) of Device B stores the personal data (e.g., Personal Data#1) retrieved in the previous step in Work Area 206B573b10 (Paragraph [0103]) (S23). CPU 211 (FIG. 1) of Device B retrieves the phone number received data, the current time data, the 1st location data, the 2nd location data, and the personal data (e.g., Personal Data#1) from Work Area 206B573b10 (Paragraph [0103]) and produces the phone call receiving log data (e.g., Phone Call Receiving Log Data#4) therefrom (S24). CPU 211 (FIG. 1) of Device B stores the phone call receiving log data (e.g., Phone Call Receiving Log Data#4) produced in the previous step in Phone Call Receiving Log Data Storage Area 206B573b8 (Paragraph [0108]) (S25). The sequence described in the next paragraph is implemented (S26). The foregoing sequence is repeated periodically.

Paragraph [0122]—This Paragraph [0122] illustrate(s) Audiovisual Data Exchanging Software 206A573c5 (Paragraph [0099]) of Device A and Audiovisual Data Exchanging Software 206B573c5 (Paragraph [0110]) of Device B, which exchange(s) the 1st audiovisual data and the 2nd audiovisual data. In the present embodiment, CPU 211 (FIG. 1) of Device A retrieves audio data from Microphone 215 (FIG. 1) and visual data from CCD Unit 214 (FIG. 1) of Device A (S1). CPU 211 (FIG. 1) of Device A produces the 1st audiovisual data by utilizing the audio data and the visual data retrieved in the previous step (S2). CPU 211 (FIG. 1) of Device A stores the 1st audiovisual data produced in the previous step in 1st Audiovisual Data Storage Area 206A573b9a (Paragraph [0098]) (S3). CPU 211 (FIG. 1) of Device A retrieves the 1st audiovisual data from 1st Audiovisual Data Storage Area 206A573b9a (Paragraph [0098]) (S4). CPU 211 (FIG. 1) of Device A outputs the 1st audiovisual data retrieved in the previous step from Speaker 216 (FIG. 1) and LCD 201 (FIG. 1) of Device A (S5). CPU 211 (FIG. 1) of Device A retrieves the 1st audiovisual data from 1st Audiovisual Data Storage Area 206A573b9a (Paragraph [0098]) and sends the data to Device B in a wireless fashion (S6). CPU 211 (FIG. 1) of Device B receives the 1st audiovisual data from Device A in a wireless fashion and stores the data in 1st Audiovisual Data Storage Area 206B573b9a (Paragraph [0109]) (S7). CPU 211 (FIG. 1) of Device B retrieves the 1st audiovisual data from 1st Audiovisual Data Storage Area 206B573b9a (Paragraph [0109]) and outputs the data from Speaker 216 (FIG. 1) and LCD 201 (FIG. 1) of Device B (S8). CPU 211 (FIG. 1) of Device B retrieves audio data from Microphone 215 (FIG. 1) and visual data from CCD Unit 214 (FIG. 1) of Device B (S9). CPU 211 (FIG. 1) of Device B produces the 2nd audiovisual data by utilizing the audio data and the visual data retrieved in the previous step (S10). CPU 211 (FIG. 1) of Device B stores the 2nd audiovisual data produced in the previous step in 2nd Audiovisual Data Storage Area 206B573b9b (Paragraph [0109]) (S11). CPU 211 (FIG. 1) of Device B retrieves the 2nd audiovisual data from 2nd Audiovisual Data Storage Area 206B573b9b (Paragraph [0109]) (S12). CPU 211 (FIG. 1) of Device B outputs the 2nd audiovisual data retrieved in the previous step from Speaker 216 (FIG. 1) and LCD 201 (FIG. 1) of Device B (S13). CPU 211 (FIG. 1) of Device B retrieves the 2nd audiovisual data from 2nd Audiovisual Data Storage Area 206B573b9b (Paragraph [0109]) and sends the data to Device A in a wireless fashion (S14). CPU 211 (FIG. 1) of Device A receives the 2nd audiovisual data from Device B in a wireless fashion and stores the data in 2nd Audiovisual Data Storage Area 206A573b9b (Paragraph [0098]) (S15). CPU 211 (FIG. 1) of Device A retrieves the 2nd audiovisual data from 2nd Audiovisual Data Storage Area 206A573b9b (Paragraph [0098]) and outputs the data from Speaker 216 (FIG. 1) and LCD 201 (FIG. 1) of Device A (S16). The foregoing sequence is repeated periodically.

Paragraph [0123]—This Paragraph [0123] illustrate(s) Phone Call Receiving Log Data Displaying Software 206B573c6 (Paragraph [0110]) of Device B, which display(s) the phone call receiving log data. In the present embodiment, the user of Device B inputs, by utilizing Input Device 210 (FIG. 1) or via voice recognition system, the phone call receiving log data displaying command (S1). Here, the phone call receiving log data displaying command is the command to display the phone call receiving log data. CPU 211 (FIG. 1) of Device B retrieves all phone call receiving log IDs (e.g., Phone Call Receiving Log#1 through #4) from Phone Call Receiving Log Data Storage Area 206B573b8 (Paragraph [0108]) (S2). CPU 211 (FIG. 1) of Device B displays the phone call receiving log IDs (e.g., Phone Call Receiving Log#1 through #4) retrieved in the previous step on LCD 201 (FIG. 1) of Device B (S3). The user of Device B selects, by utilizing Input Device 210 (FIG. 1) or via voice recognition system, a phone call receiving log ID (e.g., Phone Call Receiving Log#4) (S4). CPU 211 (FIG. 1) of Device B retrieves the phone call receiving log data (e.g., Phone Call Receiving Log Data#4) corresponding to the phone call receiving log ID (e.g., Phone Call Receiving Log#4) selected in the previous step from Phone Call Receiving Log Data Storage Area 206B573b8 (Paragraph [0108]) (S5). CPU 211 (FIG. 1) of Device B stores the phone call receiving log data (e.g., Phone Call Receiving Log Data#4) retrieved in the previous step in Work Area 206B573b10 (Paragraph [0103])

(S6). CPU 211 (FIG. 1) of Device B retrieves the phone number received data from the phone call receiving log data (e.g., Phone Call Receiving Log Data#4) stored in the previous step and displays the data on LCD 201 (FIG. 1) of Device B (S7). CPU 211 (FIG. 1) of Device B retrieves the current time data from the phone call receiving log data (e.g., Phone Call Receiving Log Data#4) stored in S6 and displays the data on LCD 201 (FIG. 1) of Device B (S8). CPU 211 (FIG. 1) of Device B retrieves the personal data (e.g., Personal Data#1) from the phone call receiving log data (e.g., Phone Call Receiving Log Data#4) stored in S6 and displays the data on LCD 201 (FIG. 1) of Device B (S9). CPU 211 (FIG. 1) of Device B retrieves the map data from Map Data Storage Area 206B573b3 (Paragraph [0103]) (S10). CPU 211 (FIG. 1) of Device B displays the map data retrieved in the previous step on LCD 201 (FIG. 1) of Device B (S11). CPU 211 (FIG. 1) of Device B retrieves the 1st location data from the phone call receiving log data (e.g., Phone Call Receiving Log Data#4) stored in S6 (S12). CPU 211 (FIG. 1) of Device B retrieves the 1st icon data from 1st Icon Data Storage Area 206B573b4a (Paragraph [0105]) (S13). CPU 211 (FIG. 1) of Device B displays the 1st icon data retrieved in the previous step at the location corresponding to the 1st location data retrieved in S12 on the map data displayed in S11 (S14). CPU 211 (FIG. 1) of Device B retrieves the 2nd location data from the phone call receiving log data (e.g., Phone Call Receiving Log Data#4) stored in S6 (S15). CPU 211 (FIG. 1) of Device B retrieves the 2nd icon data from 2nd Icon Data Storage Area 206B573b4b (Paragraph [0105]) (S16). CPU 211 (FIG. 1) of Device B displays the 2nd icon data retrieved in the previous step at the location corresponding to the 2nd location data retrieved in S15 on the map data displayed in S11 (S17). Thus, the phone number received data from which the phone call was received, the current time data at the time the phone call was received, the 1st location data at the time the phone call was received, the 2nd location data at the time the phone call was received, and the personal data of the caller are indicated on LCD 201 (FIG. 1) of Device B.

Paragraph [0124]—<<Answering Machine Location Recording Function>>

Paragraph [0125]—Paragraph [0126] through Paragraph [0188] illustrate the answering machine location recording function, wherein when replaying a message left by Device A, the 1st location indicating the location of Device A at the time the message is left and the 2nd location indicating the location of Device B at the time the message is left are indicated on LCD 201 (FIG. 1) of Device B. The 1st location and the 2nd location are indicated by displaying the street address corresponding to each location on LCD 201 (FIG. 1) of Device B. The 1st location and the 2nd location are indicated by indicating each location on the map displayed on LCD 201 (FIG. 1) of Device B.

Paragraph [0126]—This Paragraph [0126] illustrates the major elements utilized to implement the present function. In the present embodiment, Host H (Paragraph [0025]) is connected to Network NT (e.g., the Internet). Device A, a Communication Device 200, is connected to Network NT (e.g., the Internet) in a wireless fashion. Device B, another Communication Device 200, is connected to Network NT (e.g., the Internet) in a wireless fashion. Host H (Paragraph [0025]), Device A, and Device B are capable to communicate with each other via Network NT (e.g., the Internet) to implement the present function. Device A and Device B are also capable to communicate with each other directly in a wireless fashion to implement the present function.

Paragraph [0127]—This Paragraph [0127] illustrates the storage area included in Host H (Paragraph [0025]). In the present embodiment, Host H (Paragraph [0025]) includes Answering Machine Location Recording Information Storage Area H581a of which the data and the software program(s) stored therein are described in Paragraph [0128].

Paragraph [0128]—This Paragraph [0128] illustrates the storage area(s) included in Answering Machine Location Recording Information Storage Area H581a (Paragraph [0127]). In the present embodiment, Answering Machine Location Recording Information Storage Area H581a includes Answering Machine Location Recording Data Storage Area H581b and Answering Machine Location Recording Software Storage Area H581c. Answering Machine Location Recording Data Storage Area H581b stores the data necessary to implement the present function on the side of Host H (Paragraph [0025]), such as the one(s) described in Paragraph [0129]. Answering Machine Location Recording Software Storage Area H581c stores the software program(s) necessary to implement the present function on the side of Host H (Paragraph [0025]), such as the one(s) described in Paragraph [0135].

Paragraph [0129]—This Paragraph [0129] illustrates the storage area(s) included in Answering Machine Location Recording Data Storage Area H581b (Paragraph [0128]). In the present embodiment, Answering Machine Location Recording Data Storage Area H581b includes Preselected Audiovisual Answering Message Data Storage Area H581b1, Callee's Audiovisual Answering Message Data Storage Area H581b2, Callee's Received Audiovisual Answering Message Data Storage Area H581b3, Caller's Audiovisual Message Data Storage Area H581b4, Current Location Data Storage Area H581b5, Party Auto Answering Location Data Storage Area H581b6, Registered Location Data Storage Area H581b7, Registered Street Address Data Storage Area H581b8, Map Data Storage Area H581b9, Party Icon Data Storage Area H581b10, and Work Area H581b11. Preselected Audiovisual Answering Message Data Storage Area H581b1 stores the data described in Paragraph [0130]. Callee's Audiovisual Answering Message Data Storage Area H581b2 stores the callee's audiovisual answering message data which is one of the preselected audiovisual answering message data selected by the callee. Callee's Received Audiovisual Answering Message Data Storage Area H581b3 stores the callee's received audiovisual answering message data which is the callee's audiovisual answering message data received from the callee. Caller's Audiovisual Message Data Storage Area H581b4 stores the caller's audiovisual message data which is the audiovisual data of the caller left for the callee. Current Location Data Storage Area H581b5 stores the current location data which indicates the current geographic location in (x,y,z) format. Party Auto Answering Location Data Storage Area H581b6 stores the data described in Paragraph [0131]. Registered Location Data Storage Area H581b7 stores the data described in Paragraph [0132]. Registered Street Address Data Storage Area H581b8 stores the data described in Paragraph [0133]. Map Data Storage Area H581b9 stores the map data which is the image data indicating a map. Party Icon Data Storage Area H581b10 stores the data described in Paragraph [0134]. Work Area H581b11 is utilized as a work area to perform calculation and temporarily store data.

Paragraph [0130]—This Paragraph [0130] illustrates the data stored in Preselected Audiovisual Answering Message Data Storage Area H581b1 (Paragraph [0129]). In the present embodiment, Preselected Audiovisual Answering Message Data Storage Area H581b1 comprises two columns, i.e., 'Preselected Audiovisual Answering Message ID' and 'Preselected Audiovisual Answering Message Data'. Column 'Preselected Audiovisual Answering Message ID' stores the preselected audiovisual answering message IDs, and each preselected audiovisual answering message ID is an identification of the corresponding preselected audiovisual answering message data stored in column 'Preselected Audiovisual Answering Message Data'. Column 'Preselected Audiovisual Answering Message Data' stores the preselected audiovisual answering message data, and each preselected audiovisual answering message data is the audiovisual data sent to and output from the caller's device. In the present embodiment, Preselected Audiovisual Answering Message Data Storage Area H581*b*1 stores the following data: 'Preselected Audiovisual Answering Message#1' and the corresponding 'Preselected Audiovisual Answering Message Data#1'; 'Preselected Audiovisual Answering Message#2' and the corresponding 'Preselected Audiovisual Answering Message Data#2'; 'Preselected Audiovisual Answering Message#3' and the corresponding 'Preselected Audiovisual Answering Message Data#3'; and 'Preselected Audiovisual Answering Message#4' and the corresponding 'Preselected Audiovisual Answering Message Data#4'.

Paragraph [0131]—This Paragraph [0131] illustrates the storage area(s) included in Party Auto Answering Location Data Storage Area H581*b*6 (Paragraph [0129]). In the present embodiment, Party Auto Answering Location Data Storage Area H581*b*6 includes 1st Auto Answering Location Data Storage Area H581*b*6*a* and 2nd Auto Answering Location Data Storage Area H581*b*6*b*. 1st Auto Answering Location Data Storage Area H581*b*6*a* stores the 1st auto answering location data which indicates the geographic location of Device A in (x,y,z) format at the time the caller's audiovisual message data is recorded. 2nd Auto Answering Location Data Storage Area H581*b*6*b* stores the 2nd auto answering location data which indicates the geographic location of Device B in (x,y,z) format at the time the caller's audiovisual message data is recorded.

Paragraph [0132]—This Paragraph [0132] illustrates the data stored in Registered Location Data Storage Area H581*b*7 (Paragraph [0129]). In the present embodiment, Registered Location Data Storage Area H581*b*7 comprises two columns, i.e., 'Registered Location ID' and 'Registered Location Data'. Column 'Registered Location ID' stores the registered location IDs, and each registered location ID is an identification of the corresponding registered location data stored in column 'Registered Location Data'. Column 'Registered Location Data' stores the registered location data, and each registered location data indicates a specific geographic location in (x,y,z) format. In the present embodiment, Registered Location Data Storage Area H581*b*7 stores the following data: 'Registered Location#1' and the corresponding 'Registered Location Data#1'; 'Registered Location#2' and the corresponding 'Registered Location Data#2'; 'Registered Location#3' and the corresponding 'Registered Location Data#3'; and 'Registered Location#4' and the corresponding 'Registered Location Data#4'.

Paragraph [0133]—This Paragraph [0133] illustrates the data stored in Registered Street Address Data Storage Area H581*b*8 (Paragraph [0129]). In the present embodiment, Registered Street Address Data Storage Area H581*b*8 comprises two columns, i.e., 'Registered Location ID' and 'Registered Street Address Data'. Column 'Registered Location ID' stores the registered location IDs, and each registered location ID is an identification of the corresponding registered street address data stored in column 'Registered Street Address Data'. The registered location IDs stored in the present column are identical to the ones described in the previous paragraph. Column 'Registered Street Address Data' stores the registered street address data, and each registered street address data indicates the street address of the corresponding registered location data. In the present embodiment, Registered Street Address Data Storage Area H581*b*8 stores the following data: 'Registered Location#1' and the corresponding 'Registered Street Address Data#1'; 'Registered Location#2' and the corresponding 'Registered Street Address Data#2'; 'Registered Location#3' and the corresponding 'Registered Street Address Data#3'; and 'Registered Location#4' and the corresponding 'Registered Street Address Data#4'.

Paragraph [0134]—This Paragraph [0134] illustrates the storage area(s) included in Party Icon Data Storage Area H581*b*10 (Paragraph [0129]). In the present embodiment, Party Icon Data Storage Area H581*b*10 includes 1st Icon Data Storage Area H581*b*10*a* and 2nd Icon Data Storage Area H581*b*10*b*. 1st Icon Data Storage Area H581*b*10*a* stores the 1st icon data which is the image of the icon utilized to indicate the 1st auto answering location data on the map data. 2nd Icon Data Storage Area H581*b*10*b* stores the 2nd icon data which is the image of the icon utilized to indicate the 2nd auto answering location data on the map data.

Paragraph [0135]—This Paragraph [0135] illustrates the software program(s) stored in Answering Machine Location Recording Software Storage Area H581*c* (Paragraph [0128]). In the present embodiment, Answering Machine Location Recording Software Storage Area H581*c* stores Callee's Audiovisual Answering Message Data Producing Software H581*c*1, Current Location Data Producing Software H581*c*2, Caller's Audiovisual Message Data Recording Software H581*c*3, Caller's Audiovisual Message Data Replaying Software H581*c*4, Message Data/Street Address Outputting Software H581*c*5, and Message Data/Street Address/Map Outputting Software H581*c*6. Callee's Audiovisual Answering Message Data Producing Software H581*c*1 is the software program described in Paragraph [0178]. Current Location Data Producing Software H581*c*2 is the software program described in Paragraph [0157] and Paragraph [0181]. Caller's Audiovisual Message Data Recording Software H581*c*3 is the software program described in Paragraph [0159], and Paragraph [0182]. Caller's Audiovisual Message Data Replaying Software H581*c*4 is the software program described in Paragraph [0160] and Paragraph [0186]. Message Data/Street Address Outputting Software H581*c*5 is the software program described in Paragraph [0161], and Paragraph [0187]. Message Data/Street Address/Map Outputting Software H581*c*6 is the software program described in Paragraph [0162], and Paragraph [0188].

Paragraph [0136]—This Paragraph [0136] illustrates the storage area included in RAM 206 (FIG. 1) of Device A. In the present embodiment, RAM 206 includes Answering Machine Location Recording Information Storage Area 206A581*a* of which the data and the software program(s) stored therein are described in Paragraph [0138].

Paragraph [0137]—The data and/or the software program (s) necessary to implement the present function may be downloaded from Host H (Paragraph [0025]) to Device A in the manner described in Paragraph [0191] through Paragraph [0197].

Paragraph [0138]—This Paragraph [0138] illustrates the storage area(s) included in Answering Machine Location Recording Information Storage Area 206A581*a* (Paragraph [0136]). In the present embodiment, Answering Machine Location Recording Information Storage Area 206A581*a* includes Answering Machine Location Recording Data Storage Area 206A581*b* and Answering Machine Location Recording Software Storage Area 206A581*c*. Answering Machine Location Recording Data Storage Area 206A581*b* stores the data necessary to implement the present function on the side of Device A, such as the one(s) described in Paragraph [0139]. Answering Machine Location Recording Software Storage Area 206A581*c* stores the software program(s) necessary to implement the present function on the side of Device A, such as the one(s) described in Paragraph [0145].

Paragraph [0139]—This Paragraph [0139] illustrates the storage area(s) included in Answering Machine Location Recording Data Storage Area 206A581*b* (Paragraph [0138]). In the present embodiment, Answering Machine Location Recording Data Storage Area 206A581*b* includes Preselected Audiovisual Answering Message Data Storage Area 206A581*b*1, Callee's Audiovisual Answering Message Data Storage Area 206A581*b*2, Callee's Received Audiovisual Answering Message Data Storage Area 206A581*b*3, Caller's Audiovisual Message Data Storage Area 206A581*b*4, Current Location Data Storage Area 206A581*b*5, Party Auto Answering Location Data Storage Area 206A581*b*6, Registered Location Data Storage Area 206A581*b*7, Registered Street Address Data Storage Area 206A581*b*8, Map Data Storage Area 206A581*b*9, Party Icon Data Storage Area 206A581*b*10, and Work Area 206A581*b*11. Preselected Audiovisual Answering Message Data Storage Area 206A581*b*1 stores the data described in Paragraph [0140]. Callee's Audiovisual Answering Message Data Storage Area 206A581*b*2 stores the callee's audiovisual answering message data which is one of the preselected audiovisual answering message data selected by the callee. Callee's Received Audiovisual Answering Message Data Storage Area 206A581*b*3 stores the callee's received audiovisual answering message data which is the callee's audiovisual answering message data received from the callee. Caller's Audiovisual Message Data Storage Area 206A581*b*4 stores the caller's audiovisual message data which is the audiovisual data of the caller left for the callee. Current Location Data Storage Area 206A581*b*5 stores the current location data which indicates the current geographic location of Device A in (x,y,z) format. Party Auto Answering Location Data Storage Area 206A581*b*6 stores the data described in Paragraph [0141]. Registered Location Data Storage Area 206A581*b*7 stores the data described in Paragraph [0142]. Registered Street Address Data Storage Area 206A581*b*8 stores the data described in Paragraph [0143]. Map Data Storage Area 206A581*b*9 stores the map data which is the image data indicating a map. Party Icon Data Storage Area 206A581*b*10 stores the data described in Paragraph [0144]. Work Area 206A581*b*11 is utilized as a work area to perform calculation and temporarily store data.

Paragraph [0140]—This Paragraph [0140] illustrates the data stored in Preselected Audiovisual Answering Message Data Storage Area 206A581*b*1 (Paragraph [0139]). In the present embodiment, Preselected Audiovisual Answering Message Data Storage Area 206A581*b*1 comprises two columns, i.e., 'Preselected Audiovisual Answering Message ID' and 'Preselected Audiovisual Answering Message Data'. Column 'Preselected Audiovisual Answering Message ID' stores the preselected audiovisual answering message IDs, and each preselected audiovisual answering message ID is an identification of the corresponding preselected audiovisual answering message data stored in column 'Preselected Audiovisual Answering Message Data'. Column 'Preselected Audiovisual Answering Message Data' stores the preselected audiovisual answering message data, and each preselected audiovisual answering message data is the audiovisual data sent to and output from the caller's device. In the present embodiment, Preselected Audiovisual Answering Message Data Storage Area 206A581*b*1 stores the following data: 'Preselected Audiovisual Answering Message#1' and the corresponding 'Preselected Audiovisual Answering Message Data#1'; 'Preselected Audiovisual Answering Message#2' and the corresponding 'Preselected Audiovisual Answering Message Data#2'; 'Preselected Audiovisual Answering Message#3' and the corresponding 'Preselected Audiovisual Answering Message Data#3'; and 'Preselected Audiovisual Answering Message#4' and the corresponding 'Preselected Audiovisual Answering Message Data#4'.

Paragraph [0141]—This Paragraph [0141] illustrates the storage area(s) included in Party Auto Answering Location Data Storage Area 206A581*b*6 (Paragraph [0139]). In the present embodiment, Party Auto Answering Location Data Storage Area 206A581*b*6 includes 1st Auto Answering Location Data Storage Area 206A581*b*6*a* and 2nd Auto Answering Location Data Storage Area 206A581*b*6*b*. 1st Auto Answering Location Data Storage Area 206A581*b*6*a* stores the 1st auto answering location data which indicates the geographic location of Device A in (x,y,z) format at the time the caller's audiovisual message data is recorded. 2nd Auto Answering Location Data Storage Area 206A581*b*6*b* stores the 2nd auto answering location data which indicates the geographic location of Device B in (x,y,z) format at the time the caller's audiovisual message data is recorded.

Paragraph [0142]—This Paragraph [0142] illustrates the data stored in Registered Location Data Storage Area 206A581*b*7 (Paragraph [0139]). In the present embodiment, Registered Location Data Storage Area 206A581*b*7 comprises two columns, i.e., 'Registered Location ID' and 'Registered Location Data'. Column 'Registered Location ID' stores the registered location IDs, and each registered location ID is an identification of the corresponding registered location data stored in column 'Registered Location Data'. Column 'Registered Location Data' stores the registered location data, and each registered location data indicates a specific geographic location in (x,y,z) format. In the present embodiment, Registered Location Data Storage Area 206A581*b*7 stores the following data: 'Registered Location#1' and the corresponding 'Registered Location Data#1'; 'Registered Location#2' and the corresponding 'Registered Location Data#2'; 'Registered Location#3' and the corresponding 'Registered Location Data#3'; and 'Registered Location#4' and the corresponding 'Registered Location Data#4'.

Paragraph [0143]—This Paragraph [0143] illustrates the data stored in Registered Street Address Data Storage Area 206A581*b*8 (Paragraph [0139]). In the present embodiment, Registered Street Address Data Storage Area 206A581*b*8 comprises two columns, i.e., 'Registered Location ID' and 'Registered Street Address Data'. Column 'Registered Location ID' stores the registered location IDs, and each registered location ID is an identification of the corresponding registered street address data stored in column 'Registered Street Address Data'. The registered location IDs stored in the present column are identical to the ones described in the previous paragraph. Column 'Registered Street Address Data' stores the registered street address data, and each registered street address data indicates the street address of the corresponding registered location data. In the present embodiment, Registered Street Address Data Storage Area 206A581*b*8 stores the following data: 'Registered Location#1' and the corresponding 'Registered Street Address Data#1'; 'Registered Location#2' and the corresponding 'Registered Street Address Data#2'; 'Registered Location#3' and the corresponding 'Registered Street Address Data#3'; and 'Registered Location#4' and the corresponding 'Registered Street Address Data#4'.

Paragraph [0144]—This Paragraph [0144] illustrates the storage area(s) included in Party Icon Data Storage Area 206A581b10 (Paragraph [0139]). In the present embodiment, Party Icon Data Storage Area 206A581b10 includes 1st Icon Data Storage Area 206A581b10a and 2nd Icon Data Storage Area 206A581b10b. 1st Icon Data Storage Area 206A581b10a stores the 1st icon data which is the image of the icon utilized to indicate the 1st auto answering location data on the map data. 2nd Icon Data Storage Area 206A581b10b stores the 2nd icon data which is the image of the icon utilized to indicate the 2nd auto answering location data on the map data.

Paragraph [0145]—This Paragraph [0145] illustrates the software program(s) stored in Answering Machine Location Recording Software Storage Area 206A581c (Paragraph [0138]). In the present embodiment, Answering Machine Location Recording Software Storage Area 206A581c stores Current Location Data Producing Software 206A581c2, Caller's Audiovisual Message Data Recording Software 206A581c3, Caller's Audiovisual Message Data Replaying Software 206A581c4, Message Data/Street Address Outputting Software 206A581c5, and Message Data/Street Address/Map Outputting Software 206A581c6. Current Location Data Producing Software 206A581c2 is the software program described in Paragraph [0157], Paragraph [0168], and Paragraph [0180]. Caller's Audiovisual Message Data Recording Software 206A581c3 is the software program described in Paragraph [0159], Paragraph [0170], and Paragraph [0182]. Caller's Audiovisual Message Data Replaying Software 206A581c4 is the software program described in Paragraph [0160], Paragraph [0171], and Paragraph [0183]. Message Data/Street Address Outputting Software 206A581c5 is the software program described in Paragraph [0161], Paragraph [0172], and Paragraph [0184]. Message Data/Street Address/Map Outputting Software 206A581c6 is the software program described in Paragraph [0162], Paragraph [0173], and Paragraph [0185].

Paragraph [0146]—This Paragraph [0146] illustrates the storage area included in RAM 206 (FIG. 1) of Device B. In the present embodiment, RAM 206 includes Answering Machine Location Recording Information Storage Area 206B581a of which the data and the software program(s) stored therein are described in Paragraph [0148].

Paragraph [0147]—The data and/or the software program(s) necessary to implement the present function may be downloaded from Host H (Paragraph [0025]) to Device B in the manner described in Paragraph [0191] through Paragraph [0197].

Paragraph [0148]—This Paragraph [0148] illustrates the storage area(s) included in Answering Machine Location Recording Information Storage Area 206B581a (Paragraph [0146]). In the present embodiment, Answering Machine Location Recording Information Storage Area 206B581a includes Answering Machine Location Recording Data Storage Area 206B581b and Answering Machine Location Recording Software Storage Area 206B581c. Answering Machine Location Recording Data Storage Area 206B581b stores the data necessary to implement the present function on the side of Device B, such as the one(s) described in Paragraph [0149]. Answering Machine Location Recording Software Storage Area 206B581c stores the software program(s) necessary to implement the present function on the side of Device B, such as the one(s) described in Paragraph [0155].

Paragraph [0149]—This Paragraph [0149] illustrates the storage area(s) included in Answering Machine Location Recording Data Storage Area 206B581b (Paragraph [0148]). In the present embodiment, Answering Machine Location Recording Data Storage Area 206B581b includes Preselected Audiovisual Answering Message Data Storage Area 206B581b1, Callee's Audiovisual Answering Message Data Storage Area 206B581b2, Callee's Received Audiovisual Answering Message Data Storage Area 206B581b3, Caller's Audiovisual Message Data Storage Area 206B581b4, Current Location Data Storage Area 206B581b5, Party Auto Answering Location Data Storage Area 206B581b6, Registered Location Data Storage Area 206B581b7, Registered Street Address Data Storage Area 206B581b8, Map Data Storage Area 206B581b9, Party Icon Data Storage Area 206B581b10, and Work Area 206B581b11. Preselected Audiovisual Answering Message Data Storage Area 206B581b1 stores the data described in Paragraph [0150]. Callee's Audiovisual Answering Message Data Storage Area 206B581b2 stores the callee's audiovisual answering message data which is one of the preselected audiovisual answering message data selected by the callee. Callee's Received Audiovisual Answering Message Data Storage Area 206B581b3 stores the callee's received audiovisual answering message data which is the callee's audiovisual answering message data received from the callee. Caller's Audiovisual Message Data Storage Area 206B581b4 stores the caller's audiovisual message data which is the audiovisual data of the caller left for the callee. Current Location Data Storage Area 206B581b5 stores the current location data which indicates the current geographic location of Device B in (x,y,z) format. Party Auto Answering Location Data Storage Area 206B581b6 stores the data described in Paragraph [0151]. Registered Location Data Storage Area 206B581b7 stores the data described in Paragraph [0152]. Registered Street Address Data Storage Area 206B581b8 stores the data described in Paragraph [0153]. Map Data Storage Area 206B581b9 stores the map data which is the image data indicating a map. Party Icon Data Storage Area 206B581b10 stores the data described in Paragraph [0154]. Work Area 206B581b11 is utilized as a work area to perform calculation and temporarily store data.

Paragraph [0150]—This Paragraph [0150] illustrates the data stored in Preselected Audiovisual Answering Message Data Storage Area 206B581b1 (Paragraph [0149]). In the present embodiment, Preselected Audiovisual Answering Message Data Storage Area 206B581b1 comprises two columns, i.e., 'Preselected Audiovisual Answering Message ID' and 'Preselected Audiovisual Answering Message Data'. Column 'Preselected Audiovisual Answering Message ID' stores the preselected audiovisual answering message IDs, and each preselected audiovisual answering message ID is an identification of the corresponding preselected audiovisual answering message data stored in column 'Preselected Audiovisual Answering Message Data'. Column 'Preselected Audiovisual Answering Message Data' stores the preselected audiovisual answering message data, and each preselected audiovisual answering message data is the audiovisual data sent to and output from the caller's device. In the present embodiment, Preselected Audiovisual Answering Message Data Storage Area 206B581b1 stores the following data: 'Preselected Audiovisual Answering Message#1' and the corresponding 'Preselected Audiovisual Answering Message Data#1'; 'Preselected Audiovisual Answering Message#2' and the corresponding 'Preselected Audiovisual Answering Message Data#2'; 'Preselected Audiovisual Answering Message#3' and the corresponding 'Preselected Audiovisual Answering Message Data#3'; and 'Preselected Audiovisual Answering Message#4' and the corresponding 'Preselected Audiovisual Answering Message Data#4'.

Paragraph [0151]—This Paragraph [0151] illustrates the storage area(s) included in Party Auto Answering Location Data Storage Area 206B581b6 (Paragraph [0149]). In the present embodiment, Party Auto Answering Location Data Storage Area 206B581b6 includes 1st Auto Answering Location Data Storage Area 206B581b6a and 2nd Auto Answering Location Data Storage Area 206B581b6b. 1st Auto Answering Location Data Storage Area 206B581b6a stores the 1st auto answering location data which indicates the geographic location of Device A in (x,y,z) format at the time the caller's audiovisual message data is recorded. 2nd Auto Answering Location Data Storage Area 206B581b6b stores the 2nd auto answering location data which indicates the geographic location of Device B in (x,y,z) format at the time the caller's audiovisual message data is recorded.

Paragraph [0152]—This Paragraph [0152] illustrates the data stored in Registered Location Data Storage Area 206B581b7 (Paragraph [0149]). In the present embodiment, Registered Location Data Storage Area 206B581b7 comprises two columns, i.e., 'Registered Location ID' and 'Registered Location Data'. Column 'Registered Location ID' stores the registered location IDs, and each registered location ID is an identification of the corresponding registered location data stored in column 'Registered Location Data'. Column 'Registered Location Data' stores the registered location data, and each registered location data indicates a specific geographic location in (x,y,z) format. In the present embodiment, Registered Location Data Storage Area 206B581b7 stores the following data: 'Registered Location#1' and the corresponding 'Registered Location Data#1'; 'Registered Location#2' and the corresponding 'Registered Location Data#2'; 'Registered Location#3' and the corresponding 'Registered Location Data#3'; and 'Registered Location#4' and the corresponding 'Registered Location Data#4'.

Paragraph [0153]—This Paragraph [0153] illustrates the data stored in Registered Street Address Data Storage Area 206B581b8 (Paragraph [0149]). In the present embodiment, Registered Street Address Data Storage Area 206B581b8 comprises two columns, i.e., 'Registered Location ID' and 'Registered Street Address Data'. Column 'Registered Location ID' stores the registered location IDs, and each registered location ID is an identification of the corresponding registered street address data stored in column 'Registered Street Address Data'. The registered location IDs stored in the present column are identical to the ones described in the previous paragraph. Column 'Registered Street Address Data' stores the registered street address data, and each registered street address data indicates the street address of the corresponding registered location data. In the present embodiment, Registered Street Address Data Storage Area 206B581b8 stores the following data: 'Registered Location#1' and the corresponding 'Registered Street Address Data#1'; 'Registered Location#2' and the corresponding 'Registered Street Address Data#2'; 'Registered Location#3' and the corresponding 'Registered Street Address Data#3'; and 'Registered Location#4' and the corresponding 'Registered Street Address Data#4'.

Paragraph [0154]—This Paragraph [0154] illustrates the storage area(s) included in Party Icon Data Storage Area 206B581b10 (Paragraph [0149]). In the present embodiment, Party Icon Data Storage Area 206B581b10 includes 1st Icon Data Storage Area 206B581b10a and 2nd Icon Data Storage Area 206B581b10b. 1st Icon Data Storage Area 206B581b10a stores the 1st icon data which is the image of the icon utilized to indicate the 1st auto answering location data on the map data. 2nd Icon Data Storage Area 206B581b10b stores the 2nd icon data which is the image of the icon utilized to indicate the 2nd auto answering location data on the map data.

Paragraph [0155]—This Paragraph [0155] illustrates the software program(s) stored in Answering Machine Location Recording Software Storage Area 206B581c (Paragraph [0148]). In the present embodiment, Answering Machine Location Recording Software Storage Area 206B581c stores Callee's Audiovisual Answering Message Data Producing Software 206B581c1, Current Location Data Producing Software 206B581c2, Caller's Audiovisual Message Data Recording Software 206B581c3, Caller's Audiovisual Message Data Replaying Software 206B581c4, Message Data/Street Address Outputting Software 206B581c5, and Message Data/Street Address/Map Outputting Software 206B581c6. Callee's Audiovisual Answering Message Data Producing Software 206B581c1 is the software program described in Paragraph [0156], Paragraph [0167], and Paragraph [0178]. Current Location Data Producing Software 206B581c2 is the software program described in Paragraph [0158], Paragraph [0169], and Paragraph [0181]. Caller's Audiovisual Message Data Recording Software 206B581c3 is the software program described in Paragraph [0159], Paragraph [0170], and Paragraph [0182]. Caller's Audiovisual Message Data Replaying Software 206B581c4 is the software program described in Paragraph [0163], Paragraph [0174], and Paragraph [0186]. Message Data/Street Address Outputting Software 206B581c5 is the software program described in Paragraph [0164], Paragraph [0175], and Paragraph [0187]. Message Data/Street Address/Map Outputting Software 206B581c6 is the software program described in Paragraph [0165], Paragraph [0176], and Paragraph [0188].

Paragraph [0156]—This Paragraph [0156] illustrate(s) Callee's Audiovisual Answering Message Data Producing Software 206B581c1 (Paragraph [0155]) of Device B, which produce(s) the callee's audiovisual answering message data. In the present embodiment, CPU 211 (FIG. 1) of Device B retrieves all preselected audiovisual answering message IDs (e.g., Preselected Audiovisual Answering Message#1 through #4) from Preselected Audiovisual Answering Message Data Storage Area 206B581b1 (Paragraph [0150]) (S1). CPU 211 (FIG. 1) of Device B displays the preselected audiovisual answering message IDs (e.g., Preselected Audiovisual Answering Message#1 through #4) retrieved in previous step on LCD 201 (FIG. 1) of Device B (S2). The user of Device B selects, by utilizing Input Device 210 (FIG. 1) or via voice recognition system, a preselected audiovisual answering message ID (e.g., Preselected Audiovisual Answering Message#1) (S3). CPU 211 (FIG. 1) of Device B retrieves the preselected audiovisual answering message data (e.g., Preselected Audiovisual Answering Message Data#1) corresponding to the preselected audiovisual answering message ID (e.g., Preselected Audiovisual Answering Message#1) selected in the previous step from Preselected Audiovisual Answering Message Data Storage Area 206B581b1 (Paragraph [0150]) (S4). CPU 211 (FIG. 1) of Device B stores the preselected audiovisual answering message data (e.g., Preselected Audiovisual Answering Message Data#1) retrieved in the previous step as the callee's audiovisual answering message data in Callee's Audiovisual Answering Message Data Storage Area 206B581b2 (Paragraph [0149]) (S5).

Paragraph [0157]—This Paragraph [0157] illustrate(s) Current Location Data Producing Software H581c2 (Paragraph [0135]) of Host H (Paragraph [0025]) and Current Location Data Producing Software 206A581c2 (Paragraph

[0145]) of Device A, which produce(s) the current location data of Device A. In the present embodiment, CPU 211 (FIG. 1) of Device A identifies the current location (S1). CPU 211 (FIG. 1) of Device A produces the current location data by referring to the current location identified in the previous step and sends the data to Host H (Paragraph [0025]) in a wireless fashion (S2). Host H (Paragraph [0025]) receives the current location data from Device A and stores the data in Current Location Data Storage Area H581b5 (Paragraph [0129]) (S3). The foregoing sequence is repeated periodically.

Paragraph [0158]—This Paragraph [0158] illustrate(s) Current Location Data Producing Software 206B581c2 (Paragraph [0155]) of Device B, which produce(s) the current location data of Device B. In the present embodiment, CPU 211 (FIG. 1) of Device B identifies the current location (S1). CPU 211 (FIG. 1) of Device B produces the current location data by referring to the current location identified in the previous step (S2). CPU 211 (FIG. 1) of Device B stores the current location data produced in the previous step in Current Location Data Storage Area 206B581b5 (Paragraph [0149]) (S3). The foregoing sequence is repeated periodically.

Paragraph [0159]—This Paragraph [0159] illustrate(s) Caller's Audiovisual Message Data Recording Software H581c3 (Paragraph [0135]) of Host H (Paragraph [0025]), Caller's Audiovisual Message Data Recording Software 206A581c3 (Paragraph [0145]) of Device A, and Caller's Audiovisual Message Data Recording Software 206B581c3 (Paragraph [0155]) of Device B, which record(s) the caller's audiovisual message data. Assuming that the user of Device A is calling the user of Device B. In the present embodiment, CPU 211 (FIG. 1) of Device B periodically checks the incoming signal (S1). If the incoming signal indicates a phone call, CPU 211 (FIG. 1) of Device B proceeds to the next step (S2). If the phone call is not answered for a certain period of time, CPU 211 (FIG. 1) of Device B proceeds to the next step (S3). CPU 211 (FIG. 1) of Device B retrieves the callee's audiovisual answering message data from Callee's Audiovisual Answering Message Data Storage Area 206B581b2 (Paragraph [0149]) (S4). CPU 211 (FIG. 1) of Device B outputs the callee's audiovisual answering message data retrieved in the previous step from Speaker 216 (FIG. 1) and LCD 201 (FIG. 1) of Device B (S5). CPU 211 (FIG. 1) of Device B retrieves the callee's audiovisual answering message data from Callee's Audiovisual Answering Message Data Storage Area 206B581b2 (Paragraph [0149]) and sends the data to Host H (Paragraph [0025]) in a wireless fashion (S6). Host H (Paragraph [0025]) receives the callee's audiovisual answering message data from Device B and stores the data as the callee's received audiovisual answering message data in Callee's Received Audiovisual Answering Message Data Storage Area H581b3 (Paragraph [0129]) (S7). Host H (Paragraph [0025]) retrieves the callee's received audiovisual answering message data from Callee's Received Audiovisual Answering Message Data Storage Area H581b3 (Paragraph [0129]) and sends the data to Device A (S8). CPU 211 (FIG. 1) of Device A receives the callee's received audiovisual answering message data from Host H (Paragraph [0025]) in a wireless fashion and outputs the data from Speaker 216 (FIG. 1) and LCD 201 (FIG. 1) of Device A (S9). CPU 211 (FIG. 1) of Device A retrieves audio data from Microphone 215 (FIG. 1) and visual data from CCD Unit 214 (FIG. 1) of Device A (S10). CPU 211 (FIG. 1) of Device A produces the caller's audiovisual message data by utilizing the audio data and the visual data retrieved in the previous step and sends the data to Host H (Paragraph [0025]) in a wireless fashion (S11). Host H (Paragraph [0025]) receives the caller's audiovisual message data from Device A and stores the data in Caller's Audiovisual Message Data Storage Area H581b4 (Paragraph [0129]) (S12). Host H (Paragraph [0025]) retrieves the caller's audiovisual message data from Caller's Audiovisual Message Data Storage Area H581b4 (Paragraph [0129]) and sends the data to Device B (S13). CPU 211 (FIG. 1) of Device B receives the caller's audiovisual message data from Host H (Paragraph [0025]) in a wireless fashion and stores the data in Caller's Audiovisual Message Data Storage Area 206B581b4 (Paragraph [0149]) (S14). Host H (Paragraph [0025]) retrieves the current location data from Current Location Data Storage Area H581b5 (Paragraph [0129]) (S15). Host H (Paragraph [0025]) stores the current location data retrieved in the previous step as the 1st auto answering location data in 1st Auto Answering Location Data Storage Area H581b6a (Paragraph [0131]) (S16). CPU 211 (FIG. 1) of Device B retrieves the current location data from Current Location Data Storage Area 206B581b5 (Paragraph [0149]) (S17). CPU 211 (FIG. 1) of Device B stores the current location data retrieved in the previous step as the 2nd auto answering location data in 2nd Auto Answering Location Data Storage Area 206B581b6b (Paragraph [0151]) (S18). Host H (Paragraph [0025]) retrieves the 1st auto answering location data from 1st Auto Answering Location Data Storage Area H581b6a (Paragraph [0131]) and sends the data to Device B (S19). CPU 211 (FIG. 1) of Device B receives the 1st auto answering location data from Host H (Paragraph [0025]) in a wireless fashion and stores the data in 1st Auto Answering Location Data Storage Area 206B581b6a (Paragraph [0151]) (S20). CPU 211 (FIG. 1) of Device B retrieves the 2nd auto answering location data from 2nd Auto Answering Location Data Storage Area 206B581b6b (Paragraph [0151]) and sends the data to Host H (Paragraph [0025]) in a wireless fashion (S21). Host H (Paragraph [0025]) receives the 2nd auto answering location data from Device B and stores the data in 2nd Auto Answering Location Data Storage Area H581b6b (Paragraph [0131]) (S22). The foregoing sequence is repeated periodically.

Paragraph [0160]—This Paragraph [0160] illustrate(s) Caller's Audiovisual Message Data Replaying Software H581c4 (Paragraph [0135]) of Host H (Paragraph [0025]) and Caller's Audiovisual Message Data Replaying Software 206A581c4 (Paragraph [0145]) of Device A, which replay(s) the caller's audiovisual message data. In the present embodiment, the user of Device A inputs, by utilizing Input Device 210 (FIG. 1) or via voice recognition system, the caller's audiovisual message data replaying command (S1). Here, the caller's audiovisual message data replaying command is the command to replay the caller's audiovisual message data. CPU 211 (FIG. 1) of Device A sends the caller's audiovisual message data replaying command input in the previous step to Host H (Paragraph [0025]) in a wireless fashion (S2). Host H (Paragraph [0025]) receives the caller's audiovisual message data replaying command from Device A (S3). Host H (Paragraph [0025]) retrieves the caller's audiovisual message data from Caller's Audiovisual Message Data Storage Area H581b4 (Paragraph [0129]) and sends the data to Device A (S4). CPU 211 (FIG. 1) of Device A receives the caller's audiovisual message data from Host H (Paragraph [0025]) in a wireless fashion and outputs the data from Speaker 216 (FIG. 1) and LCD 201 (FIG. 1) of Device A (S5).

Paragraph [0161]—This Paragraph [0161] illustrate(s) Message Data/Street Address Outputting Software H581c5 (Paragraph [0135]) of Host H (Paragraph [0025]) and Message Data/Street Address Outputting Software 206A581c5 (Paragraph [0145]) of Device A, which replay(s) the caller's audiovisual message data and display(s) the street addresses of both parties at the time the caller's audiovisual message data is recorded. In the present embodiment, the user of Device A inputs, by utilizing Input Device 210 (FIG. 1) or via voice recognition system, the message data/street address outputting command (S1). Here, the message data/street address outputting command is the command to replay the caller's audiovisual message data and display the street addresses of both parties at the time the caller's audiovisual message data is recorded. CPU 211 (FIG. 1) of Device A sends the message data/street address outputting command to Host H (Paragraph [0025]) in a wireless fashion (S2). Host H (Paragraph [0025]) receives the message data/street address outputting command from Device A (S3). Host H (Paragraph [0025]) retrieves the caller's audiovisual message data from Caller's Audiovisual Message Data Storage Area H581*b*4 (Paragraph [0129]) and sends the data to Device A (S4). CPU 211 (FIG. 1) of Device A receives the caller's audiovisual message data from Host H (Paragraph [0025]) in a wireless fashion and outputs the data from Speaker 216 (FIG. 1) and LCD 201 (FIG. 1) of Device A (S5). Host H (Paragraph [0025]) retrieves the 1st auto answering location data from 1st Auto Answering Location Data Storage Area H581*b*6*a* (Paragraph [0131]) (S6). Host H (Paragraph [0025]) identifies the registered location data (e.g., Registered Location Data#1) matching with the 1st auto answering location data retrieved in the previous step in Registered Location Data Storage Area H581*b*7 (Paragraph [0132]) (S7). Host H (Paragraph [0025]) retrieves the registered street address data (e.g., Registered Street Address Data#1) corresponding to the registered location data (e.g., Registered Location Data#1) identified in the previous step from Registered Street Address Data Storage Area H581*b*8 (Paragraph [0133]) and sends the data to Device A (S8). CPU 211 (FIG. 1) of Device A receives the registered street address data (e.g., Registered Street Address Data#1) from Host H (Paragraph [0025]) in a wireless fashion and displays the data on LCD 201 (FIG. 1) of Device A (S9). Host H (Paragraph [0025]) retrieves the 2nd auto answering location data from 2nd Auto Answering Location Data Storage Area H581*b*6*b* (Paragraph [0131]) (S10). Host H (Paragraph [0025]) identifies the registered location data (e.g., Registered Location Data#2) matching with the 2nd auto answering location data retrieved in the previous step in Registered Location Data Storage Area H581*b*7 (Paragraph [0132]) (S11). Host H (Paragraph [0025]) retrieves the registered street address data (e.g., Registered Street Address Data#2) corresponding to the registered location data (e.g., Registered Location Data#2) identified in the previous step from Registered Street Address Data Storage Area H581*b*8 (Paragraph [0133]) and sends the data to Device A (S12). CPU 211 (FIG. 1) of Device A receives the registered street address data (e.g., Registered Street Address Data#2) from Host H (Paragraph [0025]) in a wireless fashion and displays the data on LCD 201 (FIG. 1) of Device A (S13).

Paragraph [0162]—This Paragraph [0162] illustrate(s) Message Data/Street Address/Map Outputting Software H581*c*6 (Paragraph [0135]) of Host H (Paragraph [0025]) and Message Data/Street Address/Map Outputting Software 206A581*c*6 (Paragraph [0145]) of Device A, which replay(s) the caller's audiovisual message data, display(s) the street addresses of both parties at the time the caller's audiovisual message data is recorded, and indicate(s) the locations of both parties on the map data at the time the caller's audiovisual message data is recorded. In the present embodiment, the user of Device A inputs, by utilizing Input Device 210 (FIG. 1) or via voice recognition system, the message data/street address outputting command (S1). Here, the message data/street address outputting command is the command to replay the caller's audiovisual message data and display the street addresses of both parties at the time the caller's audiovisual message data is recorded. CPU 211 (FIG. 1) of Device A sends the message data/street address outputting command to Host H (Paragraph [0025]) in a wireless fashion (S2). Host H (Paragraph [0025]) receives the message data/street address outputting command from Device A (S3). Host H (Paragraph [0025]) retrieves the caller's audiovisual message data from Caller's Audiovisual Message Data Storage Area H581*b*4 (Paragraph [0129]) and sends the data to Device A (S4). CPU 211 (FIG. 1) of Device A receives the caller's audiovisual message data from Host H (Paragraph [0025]) in a wireless fashion and outputs the data from Speaker 216 (FIG. 1) and LCD 201 (FIG. 1) of Device A (S5). Host H (Paragraph [0025]) retrieves the 1st auto answering location data from 1st Auto Answering Location Data Storage Area H581*b*6*a* (Paragraph [0131]) (S6). Host H (Paragraph [0025]) identifies the registered location data (e.g., Registered Location Data#1) matching with the 1st auto answering location data retrieved in the previous step in Registered Location Data Storage Area H581*b*7 (Paragraph [0132]) (S7). Host H (Paragraph [0025]) retrieves the registered street address data (e.g., Registered Street Address Data#1) corresponding to the registered location data (e.g., Registered Location Data#1) identified in the previous step from Registered Street Address Data Storage Area H581*b*8 (Paragraph [0133]) and sends the data to Device A (S8). CPU 211 (FIG. 1) of Device A receives the registered street address data (e.g., Registered Street Address Data#1) from Host H (Paragraph [0025]) in a wireless fashion and displays the data on LCD 201 (FIG. 1) of Device A (S9). Host H (Paragraph [0025]) retrieves the map data from Map Data Storage Area H581*b*9 (Paragraph [0129]) and sends the data to Device A (S14). CPU 211 (FIG. 1) of Device A receives the map data from Host H (Paragraph [0025]) in a wireless fashion and displays the data on LCD 201 (FIG. 1) of Device A (S15). Host H (Paragraph [0025]) retrieves the 1st auto answering location data from 1st Auto Answering Location Data Storage Area H581*b*6*a* (Paragraph [0131]) and sends the data to Device A (S16). CPU 211 (FIG. 1) of Device A receives the 1st auto answering location data from Host H (Paragraph [0025]) in a wireless fashion (S17). Host H (Paragraph [0025]) retrieves the 1st icon data from 1st Icon Data Storage Area H581*b*10*a* (Paragraph [0134]) and sends the data to Device A (S18). CPU 211 (FIG. 1) of Device A receives the 1st icon data from Host H (Paragraph [0025]) in a wireless fashion (S19). CPU 211 (FIG. 1) of Device A displays the 1st icon data received in the previous step at the location corresponding to the 1st auto answering location data received in S17 on the map data displayed in S15 (S20). Host H (Paragraph [0025]) retrieves the 1st auto answering location data from 1st Auto Answering Location Data Storage Area H581*b*6*a* (Paragraph [0131]) and sends the data to Device A (S21). CPU 211 (FIG. 1) of Device A receives the 1st auto answering location data from Host H (Paragraph [0025]) in a wireless fashion (S22). Host H (Paragraph [0025]) retrieves the 1st icon data from 1st Icon Data Storage Area H581b10a (Paragraph [0134]) and sends the data to Device A (S23). CPU 211 (FIG. 1) of Device A receives the 1st icon data from Host H (Paragraph [0025]) in a wireless fashion (S24). CPU 211 (FIG. 1) of Device A displays the 1st icon data received in the previous step at the location corresponding to the 1st auto answering location data received in S22 on the map data displayed in S15 (S25).

Paragraph [0163]—This Paragraph [0163] illustrate(s) Caller's Audiovisual Message Data Replaying Software 206B581c4 (Paragraph [0155]) of Device B, which replay(s) the caller's audiovisual message data. In the present embodiment, the user of Device B inputs, by utilizing Input Device 210 (FIG. 1) or via voice recognition system, the caller's audiovisual message data replaying command (S1). Here, the caller's audiovisual message data replaying command is the command to replay the caller's audiovisual message data. CPU 211 (FIG. 1) of Device B retrieves the caller's audiovisual message data from Caller's Audiovisual Message Data Storage Area 206B581b4 (Paragraph [0149]) (S2). CPU 211 (FIG. 1) of Device B outputs the caller's audiovisual message data retrieved in the previous step from Speaker 216 (FIG. 1) and LCD 201 (FIG. 1) of Device B (S3).

Paragraph [0164]—This Paragraph [0164] illustrate(s) Message Data/Street Address Outputting Software 206B581c5 (Paragraph [0155]) of Device B, which replay(s) the caller's audiovisual message data and display(s) the street addresses of both parties at the time the caller's audiovisual message data is recorded. In the present embodiment, the user of Device B inputs, by utilizing Input Device 210 (FIG. 1) or via voice recognition system, the message data/street address outputting command (S1). Here, the message data/street address outputting command is the command to replay the caller's audiovisual message data and display the street addresses of both parties at the time the caller's audiovisual message data is recorded. CPU 211 (FIG. 1) of Device B retrieves the caller's audiovisual message data from Caller's Audiovisual Message Data Storage Area 206B581b4 (Paragraph [0149]) (S2). CPU 211 (FIG. 1) of Device B outputs the caller's audiovisual message data retrieved in the previous step from Speaker 216 (FIG. 1) and LCD 201 (FIG. 1) of Device B (S3). CPU 211 (FIG. 1) of Device B retrieves the 1st auto answering location data from 1st Auto Answering Location Data Storage Area 206B581b6a (Paragraph [0151]) (S4). CPU 211 (FIG. 1) of Device B identifies the registered location data (e.g., Registered Location Data#1) matching with the 1st auto answering location data retrieved in the previous step in Registered Location Data Storage Area 206B581b7 (Paragraph [0152]) (S5). CPU 211 (FIG. 1) of Device B retrieves the registered street address data (e.g., Registered Street Address Data#1) corresponding to the registered location data (e.g., Registered Location Data#1) identified in the previous step from Registered Street Address Data Storage Area 206B581b8 (Paragraph [0153]) (S6). CPU 211 (FIG. 1) of Device B displays the registered street address data (e.g., Registered Street Address Data#1) retrieved in the previous step on LCD 201 (FIG. 1) of Device B (S7). CPU 211 (FIG. 1) of Device B retrieves the 2nd auto answering location data from 2nd Auto Answering Location Data Storage Area 206B581b6b (Paragraph [0151]) (S8). CPU 211 (FIG. 1) of Device B identifies the registered location data (e.g., Registered Location Data#2) matching with the 2nd auto answering location data retrieved in the previous step in Registered Location Data Storage Area 206B581b7 (Paragraph [0152]) (S9). CPU 211 (FIG. 1) of Device B retrieves the registered street address data (e.g., Registered Street Address Data#2) corresponding to the registered location data (e.g., Registered Location Data#2) identified in the previous step from Registered Street Address Data Storage Area 206B581b8 (Paragraph [0153]) (S10). CPU 211 (FIG. 1) of Device B displays the registered street address data (e.g., Registered Street Address Data#2) retrieved in the previous step on LCD 201 (FIG. 1) of Device B (S11).

Paragraph [0165]—This Paragraph [0165] illustrate(s) Message Data/Street Address/Map Outputting Software 206B581c6 (Paragraph [0155]) of Device B, which replay(s) the caller's audiovisual message data, display(s) the street addresses of both parties at the time the caller's audiovisual message data is recorded, and indicate(s) the locations of both parties on the map data at the time the caller's audiovisual message data is recorded. In the present embodiment, the user of Device B inputs, by utilizing Input Device 210 (FIG. 1) or via voice recognition system, the message data/street address/map outputting command (S1). Here, the message data/street address/map outputting command is the command to replay the caller's audiovisual message data, display the street addresses of both parties at the time the caller's audiovisual message data is recorded, and indicate the locations of both parties on the map data at the time the caller's audiovisual message data is recorded. CPU 211 (FIG. 1) of Device B retrieves the caller's audiovisual message data from Caller's Audiovisual Message Data Storage Area 206B581b4 (Paragraph [0149]) (S2). CPU 211 (FIG. 1) of Device B outputs the caller's audiovisual message data retrieved in the previous step from Speaker 216 (FIG. 1) and LCD 201 (FIG. 1) of Device B (S3). CPU 211 (FIG. 1) of Device B retrieves the 1st auto answering location data from 1st Auto Answering Location Data Storage Area 206B581b6a (Paragraph [0151]) (S4). CPU 211 (FIG. 1) of Device B identifies the registered location data (e.g., Registered Location Data#1) matching with the 1st auto answering location data retrieved in the previous step in Registered Location Data Storage Area 206B581b7 (Paragraph [0152]) (S5). CPU 211 (FIG. 1) of Device B retrieves the registered street address data (e.g., Registered Street Address Data#1) corresponding to the registered location data (e.g., Registered Location Data#1) identified in the previous step from Registered Street Address Data Storage Area 206B581b8 (Paragraph [0153]) (S6). CPU 211 (FIG. 1) of Device B displays the registered street address data (e.g., Registered Street Address Data#1) retrieved in the previous step on LCD 201 (FIG. 1) of Device B (S7). CPU 211 (FIG. 1) of Device B retrieves the 2nd auto answering location data from 2nd Auto Answering Location Data Storage Area 206B581b6b (Paragraph [0151]) (S8). CPU 211 (FIG. 1) of Device B identifies the registered location data (e.g., Registered Location Data#2) matching with the 2nd auto answering location data retrieved in the previous step in Registered Location Data Storage Area 206B581b7 (Paragraph [0152]) (S9). CPU 211 (FIG. 1) of Device B retrieves the registered street address data (e.g., Registered Street Address Data#2) corresponding to the registered location data (e.g., Registered Location Data#2) identified in the previous step from Registered Street Address Data Storage Area 206B581b8 (Paragraph [0153]) (S10). CPU 211 (FIG. 1) of Device B displays the registered street address data (e.g., Registered Street Address Data#2) retrieved in the previous step on LCD 201 (FIG. 1) of Device B (S11). CPU 211 (FIG. 1) of Device B retrieves the map data from Map Data Storage Area 206B581b9 (Paragraph [0149]) (S12). CPU 211 (FIG. 1) of Device B displays the map data retrieved in the previous step on LCD 201 (FIG. 1) of Device B (S13). CPU 211 (FIG. 1) of Device B retrieves the 1st auto answering location data from 1st Auto Answering Location Data Storage Area 206B581b6a (Paragraph [0151]) (S14). CPU 211 (FIG. 1) of Device B retrieves the 1st icon data from 1st Icon Data Storage Area 206B581b10a (Paragraph [0154]) (S15). CPU 211 (FIG. 1) of Device B displays the 1st icon data retrieved in the previous step at the location corresponding to the 1st auto answering location data retrieved in S14 on the map data displayed in S13 (S16). CPU 211 (FIG. 1) of Device B retrieves the 2nd auto answering location data from 2nd Auto Answering Location Data Storage Area 206B581b6b (Paragraph [0151]) (S17). CPU 211 (FIG. 1) of Device B retrieves the 2nd icon data from 2nd Icon Data Storage Area 206B581b10b (Paragraph [0154]) (S18). CPU 211 (FIG. 1) of Device B displays the 2nd icon data retrieved in the previous step at the location corresponding to the 2nd auto answering location data retrieved in S17 on the map data displayed in S13 (S19).

Paragraph [0166]—Paragraph [0167] through Paragraph [0188] illustrate another embodiment wherein Device A plays the major role in implementing the present function.

Paragraph [0167]—This Paragraph [0167] illustrate(s) Callee's Audiovisual Answering Message Data Producing Software 206B581c1 (Paragraph [0155]) of Device B, which produce(s) the callee's audiovisual answering message data. In the present embodiment, CPU 211 (FIG. 1) of Device B retrieves all preselected audiovisual answering message IDs (e.g., Preselected Audiovisual Answering Message#1 through #4) from Preselected Audiovisual Answering Message Data Storage Area 206B581b1 (Paragraph [0150]) (S1). CPU 211 (FIG. 1) of Device B displays the preselected audiovisual answering message IDs (e.g., Preselected Audiovisual Answering Message#1 through #4) retrieved in previous step on LCD 201 (FIG. 1) of Device B (S2). The user of Device B selects, by utilizing Input Device 210 (FIG. 1) or via voice recognition system, a preselected audiovisual answering message ID (e.g., Preselected Audiovisual Answering Message#1) (S3). CPU 211 (FIG. 1) of Device B retrieves the preselected audiovisual answering message data (e.g., Preselected Audiovisual Answering Message Data#1) corresponding to the preselected audiovisual answering message ID (e.g., Preselected Audiovisual Answering Message#1) selected in the previous step from Preselected Audiovisual Answering Message Data Storage Area 206B581b1 (Paragraph [0150]) (S4). CPU 211 (FIG. 1) of Device B stores the preselected audiovisual answering message data (e.g., Preselected Audiovisual Answering Message Data#1) retrieved in the previous step as the callee's audiovisual answering message data in Callee's Audiovisual Answering Message Data Storage Area 206B581b2 (Paragraph [0149]) (S5).

Paragraph [0168]—This Paragraph [0168] illustrate(s) Current Location Data Producing Software 206A581c2 (Paragraph [0145]) of Device A, which produce(s) the current location data of Device A. In the present embodiment, CPU 211 (FIG. 1) of Device A identifies the current location (S1). CPU 211 (FIG. 1) of Device A produces the current location data by referring to the current location identified in the previous step (S2). CPU 211 (FIG. 1) of Device A stores the current location data produced in the previous step in Current Location Data Storage Area 206A581b5 (Paragraph [0139]) (S3). The foregoing sequence is repeated periodically.

Paragraph [0169]—This Paragraph [0169] illustrate(s) Current Location Data Producing Software 206B581c2 (Paragraph [0155]) of Device B, which produce(s) the current location data of Device B. In the present embodiment, CPU 211 (FIG. 1) of Device B identifies the current location (S1). CPU 211 (FIG. 1) of Device B produces the current location data by referring to the current location identified in the previous step (S2). CPU 211 (FIG. 1) of Device B stores the current location data produced in the previous step in Current Location Data Storage Area 206B581b5 (Paragraph [0149]) (S3). The foregoing sequence is repeated periodically.

Paragraph [0170]—This Paragraph [0170] illustrate(s) Caller's Audiovisual Message Data Recording Software 206A581c3 (Paragraph [0145]) of Device A and Caller's Audiovisual Message Data Recording Software 206B581c3 (Paragraph [0155]) of Device B, which record(s) the caller's audiovisual message data. Assuming that the user of Device A is calling the user of Device B. In the present embodiment, CPU 211 (FIG. 1) of Device B periodically checks the incoming signal (S1). If the incoming signal indicates a phone call, CPU 211 (FIG. 1) of Device B proceeds to the next step (S2). If the phone call is not answered for a certain period of time, CPU 211 (FIG. 1) of Device B proceeds to the next step (S3). CPU 211 (FIG. 1) of Device B retrieves the callee's audiovisual answering message data from Callee's Audiovisual Answering Message Data Storage Area 206B581b2 (Paragraph [0149]) (S4). CPU 211 (FIG. 1) of Device B outputs the callee's audiovisual answering message data retrieved in the previous step from Speaker 216 (FIG. 1) and LCD 201 (FIG. 1) of Device B (S5). CPU 211 (FIG. 1) of Device B retrieves the callee's audiovisual answering message data from Callee's Audiovisual Answering Message Data Storage Area 206B581b2 (Paragraph [0149]) and sends the data to Device A in a wireless fashion (S6). CPU 211 (FIG. 1) of Device A receives the callee's audiovisual answering message data from Device B in a wireless fashion and stores the data as the callee's received audiovisual answering message data in Callee's Received Audiovisual Answering Message Data Storage Area 206A581b3 (Paragraph [0139]) (S7). CPU 211 (FIG. 1) of Device A retrieves the callee's received audiovisual answering message data from Callee's Received Audiovisual Answering Message Data Storage Area 206A581b3 (Paragraph [0139]) and outputs the data from Speaker 216 (FIG. 1) and LCD 201 (FIG. 1) of Device A (S8). CPU 211 (FIG. 1) of Device A retrieves audio data from Microphone 215 (FIG. 1) and visual data from CCD Unit 214 (FIG. 1) of Device A (S9). CPU 211 (FIG. 1) of Device A produces the caller's audiovisual message data by utilizing the audio data and the visual data retrieved in the previous step and stores the data in Caller's Audiovisual Message Data Storage Area 206A581b4 (Paragraph [0139]) (S10). CPU 211 (FIG. 1) of Device A retrieves the caller's audiovisual message data from Caller's Audiovisual Message Data Storage Area 206A581b4 (Paragraph [0139]) and sends the data to Device B in a wireless fashion (S11). CPU 211 (FIG. 1) of Device B receives the caller's audiovisual message data from Device A in a wireless fashion and stores the data in Caller's Audiovisual Message Data Storage Area 206B581b4 (Paragraph [0149]) (S12). CPU 211 (FIG. 1) of Device A retrieves the current location data from Current Location Data Storage Area 206A581b5 (Paragraph [0139]) (S13). CPU 211 (FIG. 1) of Device A stores the current location data retrieved in the previous step as the 1st auto answering location data in 1st Auto Answering Location Data Storage Area 206A581b6a (Paragraph [0141]) (S14). CPU 211 (FIG. 1) of Device B retrieves the current location data from Current Location Data Storage Area 206B581b5 (Paragraph [0149]) (S15). CPU 211 (FIG. 1) of Device B stores the current location data retrieved in the previous step as the 2nd auto answering location data in 2nd Auto Answering Location Data Storage Area 206B581b6b (Paragraph [0151]) (S16). CPU 211 (FIG. 1) of Device A retrieves the 1st auto answering location data from 1st Auto Answering Location Data Storage Area 206A581b6a (Paragraph [0141]) and sends the data to Device B in a wireless fashion (S17). CPU 211 (FIG. 1) of Device B receives the 1st auto answering location data from Device A in a wireless fashion and stores the data in 1st Auto Answering Location Data Storage Area 206B581b6a (Paragraph [0151]) (S18). CPU 211 (FIG. 1) of Device B retrieves the 2nd auto answering location data from 2nd Auto Answering Location Data Storage Area 206B581b6b (Paragraph [0151]) and sends the data to Device A in a wireless fashion (S19). CPU 211 (FIG. 1) of Device A receives the 2nd auto answering location data from Device B in a wireless fashion and stores the data in 2nd Auto Answering Location Data Storage Area 206A581b6b (Paragraph [0141]) (S20). The foregoing sequence is repeated periodically.

Paragraph [0171]—This Paragraph [0171] illustrate(s) Caller's Audiovisual Message Data Replaying Software 206A581c4 (Paragraph [0145]) of Device A, which replay(s) the caller's audiovisual message data. In the present embodiment, the user of Device A inputs, by utilizing Input Device 210 (FIG. 1) or via voice recognition system, the caller's audiovisual message data replaying command (S1). Here, the caller's audiovisual message data replaying command is the command to replay the caller's audiovisual message data. CPU 211 (FIG. 1) of Device A retrieves the caller's audiovisual message data from Caller's Audiovisual Message Data Storage Area 206A581b4 (Paragraph [0139]) (S2). CPU 211 (FIG. 1) of Device A outputs the caller's audiovisual message data retrieved in the previous step from Speaker 216 (FIG. 1) and LCD 201 (FIG. 1) of Device A (S3).

Paragraph [0172]—This Paragraph [0172] illustrate(s) Message Data/Street Address Outputting Software 206A581c5 (Paragraph [0145]) of Device A, which replay(s) the caller's audiovisual message data and display(s) the street addresses of both parties at the time the caller's audiovisual message data is recorded. In the present embodiment, the user of Device A inputs, by utilizing Input Device 210 (FIG. 1) or via voice recognition system, the message data/street address outputting command (S1). Here, the message data/street address outputting command is the command to replay the caller's audiovisual message data and display the street addresses of both parties at the time the caller's audiovisual message data is recorded. CPU 211 (FIG. 1) of Device A retrieves the caller's audiovisual message data from Caller's Audiovisual Message Data Storage Area 206A581b4 (Paragraph [0139]) (S2). CPU 211 (FIG. 1) of Device A outputs the caller's audiovisual message data retrieved in the previous step from Speaker 216 (FIG. 1) and LCD 201 (FIG. 1) of Device A (S3). CPU 211 (FIG. 1) of Device A retrieves the 1st auto answering location data from 1st Auto Answering Location Data Storage Area 206A581b6a (Paragraph [0141]) (S4). CPU 211 (FIG. 1) of Device A identifies the registered location data (e.g., Registered Location Data#1) matching with the 1st auto answering location data retrieved in the previous step in Registered Location Data Storage Area 206A581b7 (Paragraph [0142]) (S5). CPU 211 (FIG. 1) of Device A retrieves the registered street address data (e.g., Registered Street Address Data#1) corresponding to the registered location data (e.g., Registered Location Data#1) identified in the previous step from Registered Street Address Data Storage Area 206A581b8 (Paragraph [0143]) (S6). CPU 211 (FIG. 1) of Device A displays the registered street address data (e.g., Registered Street Address Data#1) retrieved in the previous step on LCD 201 (FIG. 1) of Device A (S7). CPU 211 (FIG. 1) of Device A retrieves the 2nd auto answering location data from 2nd Auto Answering Location Data Storage Area 206A581b6b (Paragraph [0141]) (S8). CPU 211 (FIG. 1) of Device A identifies the registered location data (e.g., Registered Location Data#2) matching with the 2nd auto answering location data retrieved in the previous step in Registered Location Data Storage Area 206A581b7 (Paragraph [0142]) (S9). CPU 211 (FIG. 1) of Device A retrieves the registered street address data (e.g., Registered Street Address Data#2) corresponding to the registered location data (e.g., Registered Location Data#2) identified in the previous step from Registered Street Address Data Storage Area 206A581b8 (Paragraph [0143]) (S10). CPU 211 (FIG. 1) of Device A displays the registered street address data (e.g., Registered Street Address Data#2) retrieved in the previous step on LCD 201 (FIG. 1) of Device A (S11).

Paragraph [0173]—This Paragraph [0173] illustrate(s) Message Data/Street Address/Map Outputting Software 206A581c6 (Paragraph [0145]) of Device A, which replay(s) the caller's audiovisual message data, display(s) the street addresses of both parties at the time the caller's audiovisual message data is recorded, and indicate(s) the locations of both parties on the map data at the time the caller's audiovisual message data is recorded. In the present embodiment, the user of Device A inputs, by utilizing Input Device 210 (FIG. 1) or via voice recognition system, the message data/street address/map outputting command (S1). Here, the message data/street address/map outputting command is the command to replay the caller's audiovisual message data, display the street addresses of both parties at the time the caller's audiovisual message data is recorded, and indicate the locations of both parties on the map data at the time the caller's audiovisual message data is recorded. CPU 211 (FIG. 1) of Device A retrieves the caller's audiovisual message data from Caller's Audiovisual Message Data Storage Area 206A581b4 (Paragraph [0139]) (S2). CPU 211 (FIG. 1) of Device A outputs the caller's audiovisual message data retrieved in the previous step from Speaker 216 (FIG. 1) and LCD 201 (FIG. 1) of Device A (S3). CPU 211 (FIG. 1) of Device A retrieves the 1st auto answering location data from 1st Auto Answering Location Data Storage Area 206A581b6a (Paragraph [0141]) (S4). CPU 211 (FIG. 1) of Device A identifies the registered location data (e.g., Registered Location Data#1) matching with the 1st auto answering location data retrieved in the previous step in Registered Location Data Storage Area 206A581b7 (Paragraph [0142]) (S5). CPU 211 (FIG. 1) of Device A retrieves the registered street address data (e.g., Registered Street Address Data#1) corresponding to the registered location data (e.g., Registered Location Data#1) identified in the previous step from Registered Street Address Data Storage Area 206A581b8 (Paragraph [0143]) (S6). CPU 211 (FIG. 1) of Device A displays the registered street address data (e.g., Registered Street Address Data#1) retrieved in the previous step on LCD 201 (FIG. 1) of Device A (S7). CPU 211 (FIG. 1) of Device A retrieves the 2nd auto answering location data from 2nd Auto Answering Location Data Storage Area 206A581b6b (Paragraph [0141]) (S8). CPU 211 (FIG. 1) of Device A identifies the registered location data (e.g., Registered Location Data#2) matching with the 2nd auto answering location data retrieved in the previous step in Registered Location Data Storage Area 206A581b7 (Paragraph [0142]) (S9). CPU 211 (FIG. 1) of Device A retrieves the registered street address data (e.g., Registered Street Address Data#2) corresponding to the registered location data (e.g., Registered Location Data#2) identified in the previous step from Registered Street Address Data Storage Area 206A581b8 (Paragraph [0143]) (S10). CPU 211 (FIG. 1) of Device A displays the registered street address data (e.g., Registered Street Address Data#2) retrieved in the previous step on LCD 201 (FIG. 1) of Device A (S11). CPU 211 (FIG. 1) of Device A retrieves the map data from Map Data Storage Area 206A581*b*9 (Paragraph [0139]) (S12). CPU 211 (FIG. 1) of Device A displays the map data retrieved in the previous step on LCD 201 (FIG. 1) of Device A (S13). CPU 211 (FIG. 1) of Device A retrieves the 1st auto answering location data from 1st Auto Answering Location Data Storage Area 206A581*b*6*a* (Paragraph [0141]) (S14). CPU 211 (FIG. 1) of Device A retrieves the 1st icon data from 1st Icon Data Storage Area 206A581*b*10*a* (Paragraph [0144]) (S15). CPU 211 (FIG. 1) of Device A displays the 1st icon data retrieved in the previous step at the location corresponding to the 1st auto answering location data retrieved in S14 on the map data displayed in S13 (S16). CPU 211 (FIG. 1) of Device A retrieves the 2nd auto answering location data from 2nd Auto Answering Location Data Storage Area 206A581*b*6*b* (Paragraph [0141]) (S17). CPU 211 (FIG. 1) of Device A retrieves the 2nd icon data from 2nd Icon Data Storage Area 206A581*b*10*b* (Paragraph [0144]) (S18). CPU 211 (FIG. 1) of Device A displays the 2nd icon data retrieved in the previous step at the location corresponding to the 2nd auto answering location data retrieved in S17 on the map data displayed in S13 (S19).

Paragraph [0174]—This Paragraph [0174] illustrate(s) Caller's Audiovisual Message Data Replaying Software 206B581*c*4 (Paragraph [0155]) of Device B, which replay(s) the caller's audiovisual message data. In the present embodiment, the user of Device B inputs, by utilizing Input Device 210 (FIG. 1) or via voice recognition system, the caller's audiovisual message data replaying command (S1). Here, the caller's audiovisual message data replaying command is the command to replay the caller's audiovisual message data. CPU 211 (FIG. 1) of Device B retrieves the caller's audiovisual message data from Caller's Audiovisual Message Data Storage Area 206B581*b*4 (Paragraph [0149]) (S2). CPU 211 (FIG. 1) of Device B outputs the caller's audiovisual message data retrieved in the previous step from Speaker 216 (FIG. 1) and LCD 201 (FIG. 1) of Device B (S3).

Paragraph [0175]—This Paragraph [0175] illustrate(s) Message Data/Street Address Outputting Software 206B581*c*5 (Paragraph [0155]) of Device B, which replay(s) the caller's audiovisual message data and display(s) the street addresses of both parties at the time the caller's audiovisual message data is recorded. In the present embodiment, the user of Device B inputs, by utilizing Input Device 210 (FIG. 1) or via voice recognition system, the message data/street address outputting command (S1). Here, the message data/street address outputting command is the command to replay the caller's audiovisual message data and display the street addresses of both parties at the time the caller's audiovisual message data is recorded. CPU 211 (FIG. 1) of Device B retrieves the caller's audiovisual message data from Caller's Audiovisual Message Data Storage Area 206B581*b*4 (Paragraph [0149]) (S2). CPU 211 (FIG. 1) of Device B outputs the caller's audiovisual message data retrieved in the previous step from Speaker 216 (FIG. 1) and LCD 201 (FIG. 1) of Device B (S3). CPU 211 (FIG. 1) of Device B retrieves the 1st auto answering location data from 1st Auto Answering Location Data Storage Area 206B581*b*6*a* (Paragraph [0151]) (S4). CPU 211 (FIG. 1) of Device B identifies the registered location data (e.g., Registered Location Data#1) matching with the 1st auto answering location data retrieved in the previous step in Registered Location Data Storage Area 206B581*b*7 (Paragraph [0152]) (S5). CPU 211 (FIG. 1) of Device B retrieves the registered street address data (e.g., Registered Street Address Data#1) corresponding to the registered location data (e.g., Registered Location Data#1) identified in the previous step from Registered Street Address Data Storage Area 206B581*b*8 (Paragraph [0153]) (S6). CPU 211 (FIG. 1) of Device B displays the registered street address data (e.g., Registered Street Address Data#1) retrieved in the previous step on LCD 201 (FIG. 1) of Device B (S7). CPU 211 (FIG. 1) of Device B retrieves the 2nd auto answering location data from 2nd Auto Answering Location Data Storage Area 206B581*b*6*b* (Paragraph [0151]) (S8). CPU 211 (FIG. 1) of Device B identifies the registered location data (e.g., Registered Location Data#2) matching with the 2nd auto answering location data retrieved in the previous step in Registered Location Data Storage Area 206B581*b*7 (Paragraph [0152]) (S9). CPU 211 (FIG. 1) of Device B retrieves the registered street address data (e.g., Registered Street Address Data#2) corresponding to the registered location data (e.g., Registered Location Data#2) identified in the previous step from Registered Street Address Data Storage Area 206B581*b*8 (Paragraph [0153]) (S10). CPU 211 (FIG. 1) of Device B displays the registered street address data (e.g., Registered Street Address Data#2) retrieved in the previous step on LCD 201 (FIG. 1) of Device B (S11).

Paragraph [0176]—This Paragraph [0176] illustrate(s) Message Data/Street Address/Map Outputting Software 206B581*c*6 (Paragraph [0155]) of Device B, which replay(s) the caller's audiovisual message data, display(s) the street addresses of both parties at the time the caller's audiovisual message data is recorded, and indicate(s) the locations of both parties on the map data at the time the caller's audiovisual message data is recorded. In the present embodiment, the user of Device B inputs, by utilizing Input Device 210 (FIG. 1) or via voice recognition system, the message data/street address/map outputting command (S1). Here, the message data/street address/map outputting command is the command to replay the caller's audiovisual message data, display the street addresses of both parties at the time the caller's audiovisual message data is recorded, and indicate the locations of both parties on the map data at the time the caller's audiovisual message data is recorded. CPU 211 (FIG. 1) of Device B retrieves the caller's audiovisual message data from Caller's Audiovisual Message Data Storage Area 206B581*b*4 (Paragraph [0149]) (S2). CPU 211 (FIG. 1) of Device B outputs the caller's audiovisual message data retrieved in the previous step from Speaker 216 (FIG. 1) and LCD 201 (FIG. 1) of Device B (S3). CPU 211 (FIG. 1) of Device B retrieves the 1st auto answering location data from 1st Auto Answering Location Data Storage Area 206B581*b*6*a* (Paragraph [0151]) (S4). CPU 211 (FIG. 1) of Device B identifies the registered location data (e.g., Registered Location Data#1) matching with the 1st auto answering location data retrieved in the previous step in Registered Location Data Storage Area 206B581*b*7 (Paragraph [0152]) (S5). CPU 211 (FIG. 1) of Device B retrieves the registered street address data (e.g., Registered Street Address Data#1) corresponding to the registered location data (e.g., Registered Location Data#1) identified in the previous step from Registered Street Address Data Storage Area 206B581*b*8 (Paragraph [0153]) (S6). CPU 211 (FIG. 1) of Device B displays the registered street address data (e.g., Registered Street Address Data#1) retrieved in the previous step on LCD 201 (FIG. 1) of Device B (S7). CPU 211 (FIG. 1) of Device B retrieves the 2nd auto answering location data from 2nd Auto Answering Location Data Storage Area 206B581*b*6*b* (Paragraph [0151]) (S8). CPU 211 (FIG. 1) of Device B identifies the registered location data (e.g., Registered Location Data#2) matching with the 2nd auto answering location data retrieved in the previous step in Registered Location Data Storage Area 206B581*b*7 (Paragraph [0152]) (S9). CPU 211 (FIG. 1) of Device B retrieves the registered street address data (e.g., Registered Street Address Data#2) corresponding to the registered location data (e.g., Registered Location Data#2) identified in the previous step from Registered Street Address Data Storage Area 206B581*b*8 (Paragraph [0153]) (S10). CPU 211 (FIG. 1) of Device B displays the registered street address data (e.g., Registered Street Address Data#2) retrieved in the previous step on LCD 201 (FIG. 1) of Device B (S11). CPU 211 (FIG. 1) of Device B retrieves the map data from Map Data Storage Area 206B581*b*9 (Paragraph [0149]) (S12). CPU 211 (FIG. 1) of Device B displays the map data retrieved in the previous step on LCD 201 (FIG. 1) of Device B (S13). CPU 211 (FIG. 1) of Device B retrieves the 1st auto answering location data from 1st Auto Answering Location Data Storage Area 206B581*b*6*a* (Paragraph [0151]) (S14). CPU 211 (FIG. 1) of Device B retrieves the 1st icon data from 1st Icon Data Storage Area 206B581*b*10*a* (Paragraph [0154]) (S15). CPU 211 (FIG. 1) of Device B displays the 1st icon data retrieved in the previous step at the location corresponding to the 1st auto answering location data retrieved in S14 on the map data displayed in S13 (S16). CPU 211 (FIG. 1) of Device B retrieves the 2nd auto answering location data from 2nd Auto Answering Location Data Storage Area 206B581*b*6*b* (Paragraph [0151]) (S17). CPU 211 (FIG. 1) of Device B retrieves the 2nd icon data from 2nd Icon Data Storage Area 206B581*b*10*b* (Paragraph [0154]) (S18). CPU 211 (FIG. 1) of Device B displays the 2nd icon data retrieved in the previous step at the location corresponding to the 2nd auto answering location data retrieved in S17 on the map data displayed in S13 (S19).

Paragraph [0177]—Paragraph [0178] through Paragraph [0188] illustrate another embodiment wherein Host H (Paragraph [0025]) and Device B play the major role in implementing the present function.

Paragraph [0178]—This Paragraph [0178] illustrate(s) Callee's Audiovisual Answering Message Data Producing Software H581*c*1 (Paragraph [0135]) of Host H (Paragraph [0025]) and Callee's Audiovisual Answering Message Data Producing Software 206B581*c*1 (Paragraph [0155]) of Device B, which produce(s) the callee's audiovisual answering message data. In the present embodiment, Host H (Paragraph [0025]) retrieves all preselected audiovisual answering message IDs (e.g., Preselected Audiovisual Answering Message#1 through #4) from Preselected Audiovisual Answering Message Data Storage Area H581*b*1 (Paragraph [0130]) and sends the data to Device B (S1). CPU 211 (FIG. 1) of Device B receives the preselected audiovisual answering message IDs (e.g., Preselected Audiovisual Answering Message#1 through #4) from Host H (Paragraph [0025]) in a wireless fashion and displays the data on LCD 201 (FIG. 1) of Device B (S2).

Paragraph [0179]—The user of Device B selects, by utilizing Input Device 210 (FIG. 1) or via voice recognition system, a preselected audiovisual answering message ID (e.g., Preselected Audiovisual Answering Message#1) (S3). CPU 211 (FIG. 1) of Device B sends the preselected audiovisual answering message ID (e.g., Preselected Audiovisual Answering Message#1) selected in the previous step to Host H (Paragraph [0025]) in a wireless fashion (S4). Host H (Paragraph [0025]) receives the preselected audiovisual answering message ID (e.g., Preselected Audiovisual Answering Message#1) from Device B (S5). Host H (Paragraph [0025]) retrieves the preselected audiovisual answering message data (e.g., Preselected Audiovisual Answering Message Data#1) corresponding to the preselected audiovisual answering message ID (e.g., Preselected Audiovisual Answering Message#1) received in the previous step from Preselected Audiovisual Answering Message Data Storage Area H581*b*1 (Paragraph [0130]) (S6). Host H (Paragraph [0025]) stores the preselected audiovisual answering message data (e.g., Preselected Audiovisual Answering Message Data#1) retrieved in the previous step as the callee's audiovisual answering message data in Callee's Audiovisual Answering Message Data Storage Area H581*b*2 (Paragraph [0129]) (S7).

Paragraph [0180]—This Paragraph [0180] illustrate(s) Current Location Data Producing Software 206A581*c*2 (Paragraph [0145]) of Device A, which produce(s) the current location data of Device A. In the present embodiment, CPU 211 (FIG. 1) of Device A identifies the current location (S1). CPU 211 (FIG. 1) of Device A produces the current location data by referring to the current location identified in the previous step (S2). CPU 211 (FIG. 1) of Device A stores the current location data produced in the previous step in Current Location Data Storage Area 206A581*b*5 (Paragraph [0139]) (S3). The foregoing sequence is repeated periodically.

Paragraph [0181]—This Paragraph [0181] illustrate(s) Current Location Data Producing Software H581*c*2 (Paragraph [0135]) of Host H (Paragraph [0025]) and Current Location Data Producing Software 206B581*c*2 (Paragraph [0155]) of Device B, which produce(s) the current location data of Device B. In the present embodiment, CPU 211 (FIG. 1) of Device B identifies the current location (S1). CPU 211 (FIG. 1) of Device B produces the current location data by referring to the current location identified in the previous step and sends the data to Host H (Paragraph [0025]) in a wireless fashion (S2). Host H (Paragraph [0025]) receives the current location data from Device B and stores the data in Current Location Data Storage Area H581*b*5 (Paragraph [0129]) (S3). The foregoing sequence is repeated periodically.

Paragraph [0182]—This Paragraph [0182] illustrate(s) Caller's Audiovisual Message Data Recording Software H581*c*3 (Paragraph [0135]) of Host H (Paragraph [0025]), Caller's Audiovisual Message Data Recording Software 206A581*c*3 (Paragraph [0145]) of Device A, and Caller's Audiovisual Message Data Recording Software 206B581*c*3 (Paragraph [0155]) of Device B, which record(s) the caller's audiovisual message data. Assuming that the user of Device A is calling the user of Device B. In the present embodiment, CPU 211 (FIG. 1) of Device B periodically checks the incoming signal (S1). If the incoming signal indicates a phone call, CPU 211 (FIG. 1) of Device B proceeds to the next step (S2). If the phone call is not answered for a certain period of time, CPU 211 (FIG. 1) of Device B proceeds to the next step (S3). CPU 211 (FIG. 1) of Device B sends the phone call non-responding notice to Host H (Paragraph [0025]) in a wireless fashion (S4). Here, the phone call non-responding notice indicates that the phone call is not answered. Host H (Paragraph [0025]) receives the phone call non-responding notice from Device B (S5). Host H (Paragraph [0025]) retrieves the callee's audiovisual answering message data from Callee's Audiovisual Answering Message Data Storage Area H581*b*2 (Paragraph [0129]) and sends the data to Device B (S6). CPU 211 (FIG. 1) of Device B receives the callee's audiovisual answering message data from Host H (Paragraph [0025]) in a wireless fashion and outputs the data from Speaker 216 (FIG. 1) and LCD 201 (FIG. 1) of Device B (S7). Host H (Paragraph [0025]) retrieves the callee's audiovisual answering message data from Callee's Audiovisual Answering Message Data Storage Area H581*b*2 (Paragraph [0129]) and sends the data to Device A (S8). CPU 211 (FIG. 1) of Device A receives the callee's audiovisual answering message data from Host H (Paragraph [0025]) in a wireless fashion and stores the data as the callee's received audiovisual answering message data in Callee's Received Audiovisual Answering Message Data Storage Area 206A581*b*3 (Paragraph [0139]) (S9). CPU 211

(FIG. 1) of Device A retrieves the callee's received audiovisual answering message data from Callee's Received Audiovisual Answering Message Data Storage Area 206A581*b*3 (Paragraph [0139]) and outputs the data from Speaker 216 (FIG. 1) and LCD 201 (FIG. 1) of Device A (S10). CPU 211 (FIG. 1) of Device A retrieves audio data from Microphone 215 (FIG. 1) and visual data from CCD Unit 214 (FIG. 1) of Device A (S11). CPU 211 (FIG. 1) of Device A produces the caller's audiovisual message data by utilizing the audio data and the visual data retrieved in the previous step and stores the data in Caller's Audiovisual Message Data Storage Area 206A581*b*4 (Paragraph [0139]) (S12). CPU 211 (FIG. 1) of Device A retrieves the caller's audiovisual message data from Caller's Audiovisual Message Data Storage Area 206A581*b*4 (Paragraph [0139]) and sends the data to Host H (Paragraph [0025]) in a wireless fashion (S13). Host H (Paragraph [0025]) receives the caller's audiovisual message data from Device A and stores the data in Caller's Audiovisual Message Data Storage Area H581*b*4 (Paragraph [0129]) (S14). CPU 211 (FIG. 1) of Device A retrieves the current location data from Current Location Data Storage Area 206A581*b*5 (Paragraph [0139]) (S15). CPU 211 (FIG. 1) of Device A stores the current location data retrieved in the previous step as the 1st auto answering location data in 1st Auto Answering Location Data Storage Area 206A581*b*6*a* (Paragraph [0141]) (S16). Host H (Paragraph [0025]) retrieves the current location data from Current Location Data Storage Area H581*b*5 (Paragraph [0129]) (S17). Host H (Paragraph [0025]) stores the current location data retrieved in the previous step as the 2nd auto answering location data in 2nd Auto Answering Location Data Storage Area H581*b*6*b* (Paragraph [0131]) (S18). CPU 211 (FIG. 1) of Device A retrieves the 1st auto answering location data from 1st Auto Answering Location Data Storage Area 206A581*b*6*a* (Paragraph [0141]) and sends the data to Host H (Paragraph [0025]) in a wireless fashion (S19). Host H (Paragraph [0025]) receives the 1st auto answering location data from Device A and stores the data in 1st Auto Answering Location Data Storage Area H581*b*6*a* (Paragraph [0131]) (S20). Host H (Paragraph [0025]) retrieves the 2nd auto answering location data from 2nd Auto Answering Location Data Storage Area H581*b*6*b* (Paragraph [0131]) and sends the data to Device A (S21). CPU 211 (FIG. 1) of Device A receives the 2nd auto answering location data from Host H (Paragraph [0025]) in a wireless fashion and stores the data in 2nd Auto Answering Location Data Storage Area 206A581*b*6*b* (Paragraph [0141]) (S22). The foregoing sequence is repeated periodically.

Paragraph [0183]—This Paragraph [0183] illustrate(s) Caller's Audiovisual Message Data Replaying Software 206A581*c*4 (Paragraph [0145]) of Device A, which replay(s) the caller's audiovisual message data. In the present embodiment, the user of Device A inputs, by utilizing Input Device 210 (FIG. 1) or via voice recognition system, the caller's audiovisual message data replaying command (S1). Here, the caller's audiovisual message data replaying command is the command to replay the caller's audiovisual message data. CPU 211 (FIG. 1) of Device A retrieves the caller's audiovisual message data from Caller's Audiovisual Message Data Storage Area 206A581*b*4 (Paragraph [0139]) (S2). CPU 211 (FIG. 1) of Device A outputs the caller's audiovisual message data retrieved in the previous step from Speaker 216 (FIG. 1) and LCD 201 (FIG. 1) of Device A (S3).

Paragraph [0184]—This Paragraph [0184] illustrate(s) Message Data/Street Address Outputting Software 206A581*c*5 (Paragraph [0145]) of Device A, which replay(s) the caller's audiovisual message data and display(s) the street addresses of both parties at the time the caller's audiovisual message data is recorded. In the present embodiment, the user of Device A inputs, by utilizing Input Device 210 (FIG. 1) or via voice recognition system, the message data/street address outputting command (S1). Here, the message data/street address outputting command is the command to replay the caller's audiovisual message data and display the street addresses of both parties at the time the caller's audiovisual message data is recorded. CPU 211 (FIG. 1) of Device A retrieves the caller's audiovisual message data from Caller's Audiovisual Message Data Storage Area 206A581*b*4 (Paragraph [0139]) (S2). CPU 211 (FIG. 1) of Device A outputs the caller's audiovisual message data retrieved in the previous step from Speaker 216 (FIG. 1) and LCD 201 (FIG. 1) of Device A (S3). CPU 211 (FIG. 1) of Device A retrieves the 1st auto answering location data from 1st Auto Answering Location Data Storage Area 206A581*b*6*a* (Paragraph [0141]) (S4). CPU 211 (FIG. 1) of Device A identifies the registered location data (e.g., Registered Location Data#1) matching with the 1st auto answering location data retrieved in the previous step in Registered Location Data Storage Area 206A581*b*7 (Paragraph [0142]) (S5). CPU 211 (FIG. 1) of Device A retrieves the registered street address data (e.g., Registered Street Address Data#1) corresponding to the registered location data (e.g., Registered Location Data#1) identified in the previous step from Registered Street Address Data Storage Area 206A581*b*8 (Paragraph [0143]) (S6). CPU 211 (FIG. 1) of Device A displays the registered street address data (e.g., Registered Street Address Data#1) retrieved in the previous step on LCD 201 (FIG. 1) of Device A (S7). CPU 211 (FIG. 1) of Device A retrieves the 2nd auto answering location data from 2nd Auto Answering Location Data Storage Area 206A581*b*6*b* (Paragraph [0141]) (S8). CPU 211 (FIG. 1) of Device A identifies the registered location data (e.g., Registered Location Data#2) matching with the 2nd auto answering location data retrieved in the previous step in Registered Location Data Storage Area 206A581*b*7 (Paragraph [0142]) (S9). CPU 211 (FIG. 1) of Device A retrieves the registered street address data (e.g., Registered Street Address Data#2) corresponding to the registered location data (e.g., Registered Location Data#2) identified in the previous step from Registered Street Address Data Storage Area 206A581*b*8 (Paragraph [0143]) (S10). CPU 211 (FIG. 1) of Device A displays the registered street address data (e.g., Registered Street Address Data#2) retrieved in the previous step on LCD 201 (FIG. 1) of Device A (S11).

Paragraph [0185]—This Paragraph [0185] illustrate(s) Message Data/Street Address/Map Outputting Software 206A581*c*6 (Paragraph [0145]) of Device A, which replay(s) the caller's audiovisual message data, display(s) the street addresses of both parties at the time the caller's audiovisual message data is recorded, and indicate(s) the locations of both parties on the map data at the time the caller's audiovisual message data is recorded. In the present embodiment, the user of Device A inputs, by utilizing Input Device 210 (FIG. 1) or via voice recognition system, the message data/street address/map outputting command (S1). Here, the message data/street address/map outputting command is the command to replay the caller's audiovisual message data, display the street addresses of both parties at the time the caller's audiovisual message data is recorded, and indicate the locations of both parties on the map data at the time the caller's audiovisual message data is recorded. CPU 211 (FIG. 1) of Device A retrieves the caller's audiovisual message data from Caller's Audiovisual Message Data Storage Area 206A581*b*4 (Paragraph [0139]) (S2). CPU 211 (FIG. 1) of Device A outputs the caller's audiovisual message data retrieved in the previous step from Speaker 216 (FIG. 1) and LCD 201 (FIG. 1) of Device A (S3). CPU 211 (FIG. 1) of Device A retrieves the 1st auto answering location data from 1st Auto Answering Location Data Storage Area 206A581b6a (Paragraph [0141]) (S4). CPU 211 (FIG. 1) of Device A identifies the registered location data (e.g., Registered Location Data#1) matching with the 1st auto answering location data retrieved in the previous step in Registered Location Data Storage Area 206A581b7 (Paragraph [0142]) (S5). CPU 211 (FIG. 1) of Device A retrieves the registered street address data (e.g., Registered Street Address Data#1) corresponding to the registered location data (e.g., Registered Location Data#1) identified in the previous step from Registered Street Address Data Storage Area 206A581b8 (Paragraph [0143]) (S6). CPU 211 (FIG. 1) of Device A displays the registered street address data (e.g., Registered Street Address Data#1) retrieved in the previous step on LCD 201 (FIG. 1) of Device A (S7). CPU 211 (FIG. 1) of Device A retrieves the 2nd auto answering location data from 2nd Auto Answering Location Data Storage Area 206A581b6b (Paragraph [0141]) (S8). CPU 211 (FIG. 1) of Device A identifies the registered location data (e.g., Registered Location Data#2) matching with the 2nd auto answering location data retrieved in the previous step in Registered Location Data Storage Area 206A581b7 (Paragraph [0142]) (S9). CPU 211 (FIG. 1) of Device A retrieves the registered street address data (e.g., Registered Street Address Data#2) corresponding to the registered location data (e.g., Registered Location Data#2) identified in the previous step from Registered Street Address Data Storage Area 206A581b8 (Paragraph [0143]) (S10). CPU 211 (FIG. 1) of Device A displays the registered street address data (e.g., Registered Street Address Data#2) retrieved in the previous step on LCD 201 (FIG. 1) of Device A (S11). CPU 211 (FIG. 1) of Device A retrieves the map data from Map Data Storage Area 206A581b9 (Paragraph [0139]) (S12). CPU 211 (FIG. 1) of Device A displays the map data retrieved in the previous step on LCD 201 (FIG. 1) of Device A (S13). CPU 211 (FIG. 1) of Device A retrieves the 1st auto answering location data from 1st Auto Answering Location Data Storage Area 206A581b6a (Paragraph [0141]) (S14). CPU 211 (FIG. 1) of Device A retrieves the 1st icon data from 1st Icon Data Storage Area 206A581b10a (Paragraph [0144]) (S15). CPU 211 (FIG. 1) of Device A displays the 1st icon data retrieved in the previous step at the location corresponding to the 1st auto answering location data retrieved in S14 on the map data displayed in S13 (S16). CPU 211 (FIG. 1) of Device A retrieves the 2nd auto answering location data from 2nd Auto Answering Location Data Storage Area 206A581b6b (Paragraph [0141]) (S17). CPU 211 (FIG. 1) of Device A retrieves the 2nd icon data from 2nd Icon Data Storage Area 206A581b10b (Paragraph [0144]) (S18). CPU 211 (FIG. 1) of Device A displays the 2nd icon data retrieved in the previous step at the location corresponding to the 2nd auto answering location data retrieved in S17 on the map data displayed in S13 (S19).

Paragraph [0186]—This Paragraph [0186] illustrate(s) Caller's Audiovisual Message Data Replaying Software H581c4 (Paragraph [0135]) of Host H (Paragraph [0025]) and Caller's Audiovisual Message Data Replaying Software 206B581c4 (Paragraph [0155]) of Device B, which replay(s) the caller's audiovisual message data. In the present embodiment, the user of Device B inputs, by utilizing Input Device 210 (FIG. 1) or via voice recognition system, the caller's audiovisual message data replaying command (S1). Here, the caller's audiovisual message data replaying command is the command to replay the caller's audiovisual message data. CPU 211 (FIG. 1) of Device B sends the caller's audiovisual message data replaying command input in the previous step to Host H (Paragraph [0025]) in a wireless fashion (S2). Host H (Paragraph [0025]) receives the caller's audiovisual message data replaying command from Device B (S3). Host H (Paragraph [0025]) retrieves the caller's audiovisual message data from Caller's Audiovisual Message Data Storage Area H581b4 (Paragraph [0129]) and sends the data to Device B (S4). CPU 211 (FIG. 1) of Device B receives the caller's audiovisual message data from Host H (Paragraph [0025]) in a wireless fashion and outputs the data from Speaker 216 (FIG. 1) and LCD 201 (FIG. 1) of Device B (S5).

Paragraph [0187]—This Paragraph [0187] illustrate(s) Message Data/Street Address Outputting Software H581c5 (Paragraph [0135]) of Host H (Paragraph [0025]) and Message Data/Street Address Outputting Software 206B581c5 (Paragraph [0155]) of Device B, which replay(s) the caller's audiovisual message data and display(s) the street addresses of both parties at the time the caller's audiovisual message data is recorded. In the present embodiment, the user of Device B inputs, by utilizing Input Device 210 (FIG. 1) or via voice recognition system, the message data/street address outputting command (S1). Here, the message data/street address outputting command is the command to replay the caller's audiovisual message data and display the street addresses of both parties at the time the caller's audiovisual message data is recorded. CPU 211 (FIG. 1) of Device B sends the message data/street address outputting command to Host H (Paragraph [0025]) in a wireless fashion (S2). Host H (Paragraph [0025]) receives the message data/street address outputting command from Device B (S3). Host H (Paragraph [0025]) retrieves the caller's audiovisual message data from Caller's Audiovisual Message Data Storage Area H581b4 (Paragraph [0129]) and sends the data to Device B (S4). CPU 211 (FIG. 1) of Device B receives the caller's audiovisual message data from Host H (Paragraph [0025]) in a wireless fashion and outputs the data from Speaker 216 (FIG. 1) and LCD 201 (FIG. 1) of Device B (S5). Host H (Paragraph [0025]) retrieves the 1st auto answering location data from 1st Auto Answering Location Data Storage Area H581b6a (Paragraph [0131]) (S6). Host H (Paragraph [0025]) identifies the registered location data (e.g., Registered Location Data#1) matching with the 1st auto answering location data retrieved in the previous step in Registered Location Data Storage Area H581b7 (Paragraph [0132]) (S7). Host H (Paragraph [0025]) retrieves the registered street address data (e.g., Registered Street Address Data#1) corresponding to the registered location data (e.g., Registered Location Data#1) identified in the previous step from Registered Street Address Data Storage Area H581b8 (Paragraph [0133]) and sends the data to Device B (S8). CPU 211 (FIG. 1) of Device B receives the registered street address data (e.g., Registered Street Address Data#1) from Host H (Paragraph [0025]) in a wireless fashion and displays the data on LCD 201 (FIG. 1) of Device B (S9). Host H (Paragraph [0025]) retrieves the 2nd auto answering location data from 2nd Auto Answering Location Data Storage Area H581b6b (Paragraph [0131]) (S10). Host H (Paragraph [0025]) identifies the registered location data (e.g., Registered Location Data#2) matching with the 2nd auto answering location data retrieved in the previous step in Registered Location Data Storage Area H581b7 (Paragraph [0132]) (S11). Host H (Paragraph [0025]) retrieves the registered street address data (e.g., Registered Street Address Data#2) corresponding to the registered location data (e.g., Registered Location Data#2) identified in the previous step from Registered Street Address Data Storage Area H581b8 (Paragraph [0133]) and sends the data to Device B (S12). CPU 211 (FIG. 1) of Device B receives the registered street address data (e.g., Registered Street Address Data#2) from Host H (Paragraph [0025]) in a wireless fashion and displays the data on LCD 201 (FIG. 1) of Device B (S13).

Paragraph [0188]—This Paragraph [0188] illustrate(s) Message Data/Street Address/Map Outputting Software H581c6 (Paragraph [0135]) of Host H (Paragraph [0025]) and Message Data/Street Address/Map Outputting Software 206B581c6 (Paragraph [0155]) of Device B, which replay(s) the caller's audiovisual message data, display(s) the street addresses of both parties at the time the caller's audiovisual message data is recorded, and indicate(s) the locations of both parties on the map data at the time the caller's audiovisual message data is recorded. In the present embodiment, the user of Device B inputs, by utilizing Input Device 210 (FIG. 1) or via voice recognition system, the message data/street address outputting command (S1). Here, the message data/street address outputting command is the command to replay the caller's audiovisual message data and display the street addresses of both parties at the time the caller's audiovisual message data is recorded. CPU 211 (FIG. 1) of Device B sends the message data/street address outputting command to Host H (Paragraph [0025]) in a wireless fashion (S2). Host H (Paragraph [0025]) receives the message data/street address outputting command from Device B (S3). Host H (Paragraph [0025]) retrieves the caller's audiovisual message data from Caller's Audiovisual Message Data Storage Area H581b4 (Paragraph [0129]) and sends the data to Device B (S4). CPU 211 (FIG. 1) of Device B receives the caller's audiovisual message data from Host H (Paragraph [0025]) in a wireless fashion and outputs the data from Speaker 216 (FIG. 1) and LCD 201 (FIG. 1) of Device B (S5). Host H (Paragraph [0025]) retrieves the 1st auto answering location data from 1st Auto Answering Location Data Storage Area H581b6a (Paragraph [0131]) (S6). Host H (Paragraph [0025]) identifies the registered location data (e.g., Registered Location Data#1) matching with the 1st auto answering location data retrieved in the previous step in Registered Location Data Storage Area H581b7 (Paragraph [0132]) (S7). Host H (Paragraph [0025]) retrieves the registered street address data (e.g., Registered Street Address Data#1) corresponding to the registered location data (e.g., Registered Location Data#1) identified in the previous step from Registered Street Address Data Storage Area H581b8 (Paragraph [0133]) and sends the data to Device B (S8). CPU 211 (FIG. 1) of Device B receives the registered street address data (e.g., Registered Street Address Data#1) from Host H (Paragraph [0025]) in a wireless fashion and displays the data on LCD 201 (FIG. 1) of Device B (S9). Host H (Paragraph [0025]) retrieves the 2nd auto answering location data from 2nd Auto Answering Location Data Storage Area H581b6b (Paragraph [0131]) (S10). Host H (Paragraph [0025]) identifies the registered location data (e.g., Registered Location Data#2) matching with the 2nd auto answering location data retrieved in the previous step in Registered Location Data Storage Area H581b7 (Paragraph [0132]) (S11). Host H (Paragraph [0025]) retrieves the registered street address data (e.g., Registered Street Address Data#2) corresponding to the registered location data (e.g., Registered Location Data#2) identified in the previous step from Registered Street Address Data Storage Area H581b8 (Paragraph [0133]) and sends the data to Device B (S12). CPU 211 (FIG. 1) of Device B receives the registered street address data (e.g., Registered Street Address Data#2) from Host H (Paragraph [0025]) in a wireless fashion and displays the data on LCD 201 (FIG. 1) of Device B (S13). Host H (Paragraph [0025]) retrieves the map data from Map Data Storage Area H581b9 (Paragraph [0129]) and sends the data to Device B (S14). CPU 211 (FIG. 1) of Device B receives the map data from Host H (Paragraph [0025]) in a wireless fashion and displays the data on LCD 201 (FIG. 1) of Device B (S15). Host H (Paragraph [0025]) retrieves the 1st auto answering location data from 1st Auto Answering Location Data Storage Area H581b6a (Paragraph [0131]) and sends the data to Device B (S16). CPU 211 (FIG. 1) of Device B receives the 1st auto answering location data from Host H (Paragraph [0025]) in a wireless fashion (S17). Host H (Paragraph [0025]) retrieves the 1st icon data from 1st Icon Data Storage Area H581b10a (Paragraph [0134]) and sends the data to Device B (S18). CPU 211 (FIG. 1) of Device B receives the 1st icon data from Host H (Paragraph [0025]) in a wireless fashion (S19). CPU 211 (FIG. 1) of Device B displays the 1st icon data received in the previous step at the location corresponding to the 1st auto answering location data received in S17 on the map data displayed in S15 (S20). Host H (Paragraph [0025]) retrieves the 1st auto answering location data from 1st Auto Answering Location Data Storage Area H581b6a (Paragraph [0131]) and sends the data to Device B (S21). CPU 211 (FIG. 1) of Device B receives the 1st auto answering location data from Host H (Paragraph [0025]) in a wireless fashion (S22). Host H (Paragraph [0025]) retrieves the 1st icon data from 1st Icon Data Storage Area H581b10a (Paragraph [0134]) and sends the data to Device B (S23). CPU 211 (FIG. 1) of Device B receives the 1st icon data from Host H (Paragraph [0025]) in a wireless fashion (S24). CPU 211 (FIG. 1) of Device B displays the 1st icon data received in the previous step at the location corresponding to the 1st auto answering location data received in S22 on the map data displayed in S15 (S25).

Paragraph [0189]—<<Multiple Software Download Function>>

Paragraph [0190]—Paragraph [0191] through Paragraph [0197] illustrate(s) the multiple software download function which enables Communication Device 200 to download a plurality of software programs simultaneously. All software programs, data, any types of information to implement all modes, functions, and systems described in this specification are stored in a host or server from which Communication Device 200 can download.

Paragraph [0191]—This Paragraph [0191] illustrate(s) the software programs stored in RAM 206 (FIG. 1). In the present embodiment, RAM 206 includes Multiple Software Download Controller Storage Area 20691a. Multiple Software Download Controller Storage Area 20691a includes Multiple Software Download Controller 20691b, Download Software List Displaying Software 20691c, Download Software Selector 20691d, Download Software Storage Area Selector 20691e, Download Implementer 20691f, and Download Repeater 20691g. Multiple Software Download Controller 20691b administers the overall implementation of the present function. One of the major tasks of Multiple Software Download Controller 20691b is to administer and control the timing and sequence of Download Software List Displaying Software 20691c, Download Software Selector 20691d, Download Software Storage Area Selector 20691e, Download Implementer 20691f, and Download Repeater 20691g. For example, Multiple Software Download Controller 20691b executes them in the following order: Download Software List Displaying Software 20691c, Download Software Selector 20691d, Download Software Storage Area Selector 20691e, Download Implementer 20691f, and Download Repeater 20691g. Download Software List Displaying Software 20691c displays on LCD 201 (FIG. 1) a list of a certain amount or all software programs necessary to implement the modes, functions, and/or systems explained in this specification of which the sequence is explained in Paragraph [0192] hereinafter. Download Software Selector 20691d selects one of the software programs displayed on LCD 201 of which the sequence is explained in Paragraph [0193] hereinafter. Download Software Storage Area Selector 20691e selects the storage area in RAM 206 where the downloaded software program is stored of which the sequence is explained in Paragraph [0194] hereinafter. Download Implementer 20691f implements the download process of the software program selected by Download Software Selector 20691d hereinbefore and stores the software program in the storage area selected by Download Software Storage Area Selector 20691e hereinbefore of which the sequence is explained in Paragraph [0195] hereinafter. Download Repeater 20691g executes Multiple Software Download Controller 20691b which reactivates Download Software List Displaying Software 20691c, Download Software Selector 20691d, Download Software Storage Area Selector 20691e, and Download Implementer 20691f of which the sequence is explained in Paragraph [0195] hereinafter.

Paragraph [0192]—This Paragraph [0192] illustrate(s) the sequence of Download Software List Displaying Software 20691c (Paragraph [0191]). Referring to Paragraph [0192], CPU 211 (FIG. 1), under the command of Download Software List Displaying Software 20691c, displays a list of a certain amount or all software programs to implement all modes, functions, and systems described in this specification on LCD 201 (FIG. 1).

Paragraph [0193]—This Paragraph [0193] illustrate(s) the sequence of Download Software Selector 20691d (Paragraph [0191]). Referring to Paragraph [0193], the user of Communication Device 200 inputs an input signal by utilizing Input Device 210 (FIG. 1) or via voice recognition system identifying one of the software programs displayed on LCD 201 (FIG. 1) (S1), and CPU 211, under the command of Download Software Selector 20691d, interprets the input signal and selects the corresponding software program (S2).

Paragraph [0194]—This Paragraph [0194] illustrate(s) the sequence of Download Software Storage Area Selector 20691e (Paragraph [0191]). Referring to Paragraph [0194], CPU 211 (FIG. 1), under the command of Download Software Storage Area Selector 20691e, selects a specific storage area in RAM 206 (FIG. 1) where the downloaded software program is to be stored. The selection of the specific storage area in RAM 206 may be done automatically by CPU 211 or manually by the user of Communication Device 200 by utilizing Input Device 210 (FIG. 1) or via voice recognition system.

Paragraph [0195]—This Paragraph [0195] illustrate(s) the sequence of Download Implementer 20691f (Paragraph [0191]). Referring to Paragraph [0195], CPU 211 (FIG. 1), under the command of Download Implementer 20691f, implements the download process of the software program selected by Download Software Selector 20691d (Paragraph [0193]) and stores the software program in the storage area selected by Download Software Storage Area Selector 20691e (Paragraph [0194]).

Paragraph [0196]—This Paragraph [0196] illustrate(s) the sequence of Download Repeater 20691g (Paragraph [0191]). Referring to Paragraph [0196], the user of Communication Device 200 inputs an input signal by utilizing Input Device 210 (FIG. 1) or via voice recognition system when the downloading process of the software program is completed (S1). If the input signal indicates to repeat the process to download another software program, CPU 211 (FIG. 1), under the command of Download Repeater 20691g, executes Multiple Software Download Controller 20691b (Paragraph [0191]), which reactivates Download Software List Displaying Software 20691c (Paragraph [0191]), Download Software Selector 20691d (Paragraph [0191]), Download Software Storage Area Selector 20691e (Paragraph [0191]), and Download Implementer 20691f (Paragraph [0191]) to download the second software program while the downloading process of the first software program is still in progress by utilizing the method so-called 'time sharing' (S3). Download Software List Displaying Software 20691c, Download Software Selector 20691d, Download Software Storage Area Selector 20691e, and Download Implementer 20691f can be repeatedly executed until all software programs displayed on LCD 201 (FIG. 1) are selected and downloaded. The downloading process is not repeated if the input signal explained in S2 so indicates.

Paragraph [0197]—As another embodiment, as described in this Paragraph [0197], Multiple Software Download Controller 20691b, Download Software List Displaying Software 20691c, Download Software Selector 20691d, Download Software Storage Area Selector 20691e, Download Implementer 20691f, and Download Repeater 20691g may be integrated into a single software program, Multiple Software Download Controller 20691b. First of all, CPU 211 (FIG. 1) displays a list of all software programs downloadable from a host or server on LCD 201 (FIG. 1) (S1). The user of Communication Device 200 inputs an input signal by utilizing Input Device 210 (FIG. 1) or via voice recognition system identifying one of the software programs displayed on LCD 201 (S2), and CPU 211 interprets the input signal and selects the corresponding software program (S3) and selects the storage area in RAM 206 (FIG. 1) where the downloaded software program is to be stored (S4). The selection of the specific storage area in RAM 206 may be done automatically by CPU 211 or manually by the user of Communication Device 200 by utilizing Input Device 210 (FIG. 1) or via voice recognition system. CPU 211 then implements the download process of the software program selected in S3 and stores the software program in the storage area selected in S4 (S5). The user of Communication Device 200 inputs an input signal by utilizing Input Device 210 or via voice recognition system when the activation of downloading process of the software program described in S5 is completed (S6). If the input signal indicates to repeat the process to download another software program, CPU 211 repeats the steps of S1 through S5 to download the second software program while the downloading process of the first software program is still in progress by utilizing the method so-called 'time sharing' (S7). The steps of S1 through S5 can be repeated until all software programs displayed on LCD 201 are selected and downloaded. The downloading process is not repeated if the input signal explained in S6 so indicates.

Paragraph [0198]—For the avoidance of doubt, Paragraph [0191] through Paragraph [0197] are also applicable to download data and any types of information other than software programs.

Paragraph [0199]—<<Incorporation By Reference>>

Paragraph [0200]—The following paragraphs and drawings described in U.S. Ser. No. 11/423,432, filed 2006 Jun. 10, are incorporated to this application by reference: the preamble described in paragraph [2149] (no drawings); Communication Device 200 (Voice Communication Mode) described in paragraphs [2150] through [2155] (FIGS. 1 through 2c); Voice Recognition System described in paragraphs [2156] through [2188] (FIGS. 3 through 19); Positioning System described in paragraphs [2189] through [2220] (FIGS. 20a through 32e); Auto Backup System described in paragraphs [2221] through [2230] (FIGS. 33 through 37); Signal Amplifier described in paragraphs [2231] through [2236] (FIG. 38); Audio/Video Data Capturing System described in paragraphs

[2237] through [2249] (FIGS. 39 through 44b); Digital Mirror Function (1) described in paragraphs [2250] through [2258] (FIGS. 44c through 44e); Caller ID System described in paragraphs [2259] through [2266] (FIGS. 45 through 47); Stock Purchasing Function described in paragraphs [2267] through [2276] (FIGS. 48 through 52); Timer Email Function described in paragraphs [2277] through [2283] (FIGS. 53a and 53b); Call Blocking Function described in paragraphs [2284] through [2297] (FIGS. 54 through 59); Online Payment Function described in paragraphs [2298] through [2307] (FIGS. 60 through 64); Navigation System described in paragraphs [2308] through [2330] (FIGS. 65 through 74a); Remote Controlling System described in paragraphs [2331] through [2349] (FIGS. 75 through 85); Auto Emergency Calling System described in paragraphs [2350] through [2358] (FIGS. 86 and 87); Cellular TV Function described in paragraphs [2359] through [2443] (FIGS. 88 through 135); 3D Video Game Function described in paragraphs [2444] through [2456] (FIGS. 136 through 144); Digital Mirror Function (2) described in paragraphs [2457] through [2466] (FIGS. 145 through 155); Voice Recognition Sys—E-mail (2) described in paragraphs [2467] through [2475] (FIGS. 156 through 160); Positioning System—GPS Search Engine described in paragraphs [2476] through [2518] (FIGS. 161 through 182); Mobile Ignition Key Function described in paragraphs [2519] through [2541] (FIGS. 183 through 201); Voice Print Authentication System described in paragraphs [2542] through [2552] (FIGS. 202 through 211); Fingerprint Authentication System described in paragraphs [2553] through [2565] (FIGS. 212 through 221); Auto Time Adjust Function described in paragraphs [2566] through [2570] (FIGS. 222 through 224); Video/Photo Mode described in paragraphs [2571] through [2599] (FIGS. 225 through 242); Call Taxi Function described in paragraphs [2600] through [2640] (FIGS. 243 through 269); Shooting Video Game Function described in paragraphs [2641] through [2657] (FIGS. 270 through 283); Driving Video Game Function described in paragraphs [2658] through [2671] (FIGS. 284 through 294); Address Book Updating Function described in paragraphs [2672] through [2692] (FIGS. 295 through 312); Batch Address Book Updating Function—With Host described in paragraphs [2693] through [2714] (FIGS. 313 through 329); Batch Address Book Updating Function—Peer-To-Peer Connection described in paragraphs [2715] through [2719] (FIGS. 329a through 329c); Batch Scheduler Updating Function—With Host described in paragraphs [2720] through (FIGS. 330 through 350); Batch Scheduler Updating Function—Peer-To-Peer Connection described in paragraphs [2744] through [2748] (FIGS. 351 and 352); Calculator Function described in paragraphs [2749] through [2754] (FIGS. 353 through 356); Spreadsheet Function described in paragraphs [2755] through [2762] (FIGS. 357 through 360); Word Processing Function described in paragraphs [2763] through [2778] (FIGS. 361 through 373); TV Remote Controller Function described in paragraphs [2779] through [2801] (FIGS. 374 through 394); CD/PC Inter-communicating Function described in paragraphs [2802] through [2826] (FIGS. 413 through 427); PDWR Sound Selecting Function described in paragraphs [2827] through [2863] (FIGS. 428 through 456); Start Up Software Function described in paragraphs [2864] through [2880] (FIGS. 457 through 466); Another Embodiment Of Communication Device 200 described in paragraphs [2881] through [2885] (FIGS. 467a through 467d); Stereo Audio Data Output Function described in paragraphs [2886] through [2905] (FIGS. 468 through 479); Stereo Visual Data Output Function described in paragraphs [2906] through [2925] (FIGS. 480 through 491); Multiple Signal Processing Function described in paragraphs [2926] through [2998] (FIGS. 492 through 529); Positioning System—Pin-pointing Function described in paragraphs [2999] through [3032] (FIGS. 530 through 553); Artificial Satellite Host described in paragraphs [3033] through [3051] (FIGS. 554 through 567); CCD Bar Code Reader Function described in paragraphs [3052] through [3073] (FIGS. 568 through 579); Online Renting Function described in paragraphs [3074] through [3151] (FIGS. 580 through 633); SOS Calling Function described in paragraphs [3152] through [3172] (FIGS. 634 through 645); Input Device described in paragraphs [3173] through [3178] (FIGS. 646 through 650); PC Remote Controlling Function described in paragraphs [3179] through [3214] (FIGS. 651 through 670); PC Remote Downloading Function described in paragraphs [3215] through [3264] (FIGS. 671 through 701); Audiovisual Playback Function described in paragraphs [3265] through [3290] (FIGS. 702 through 716); Audio Playback Function described in paragraphs [3291] through [3315] (FIGS. 717 through 731); Ticket Purchasing Function described in paragraphs [3316] through [3345] (FIGS. 732 through 753); Remote Data Erasing Function described in paragraphs [3346] through [3375] (FIGS. 754 through 774); Business Card Function described in paragraphs [3376] through [3392] (FIGS. 775 through 783); Game Vibrating Function described in paragraphs [3393] through [3403] (FIGS. 784 through 786); Part-time Job Finding Function described in paragraphs [3404] through [3424] (FIGS. 787 through 801); Parking Lot Finding Function described in paragraphs [3425] through [3464] (FIGS. 802 through 832); Parts Upgradable Communication Device described in paragraphs [3465] through [3490] (FIGS. 833a through 833x); On Demand TV Function described in paragraphs [3491] through [3521] (FIGS. 834 through 855); Inter-communicating TV Function described in paragraphs [3522] through [3556] (FIGS. 856 through 882); Display Controlling Function described in paragraphs [3557] through [3574] (FIGS. 883 through 894); Multiple Party Communicating Function described in paragraphs [3575] through [3608] (FIGS. 894a through 917); Display Brightness Controlling Function described in paragraphs [3609] through [3618] (FIGS. 918 through 923); Multiple Party Pin-pointing Function described in paragraphs [3619] through [3666] (FIGS. 924 through 950f); Digital Camera Function described in paragraphs [3667] through [3694] (FIGS. 951 through 968); Phone Number Linking Function described in paragraphs [3695] through [3718] (FIGS. 968a through 983); Multiple Window Displaying Function described in paragraphs [3719] through [3737] (FIGS. 984 through 995); Mouse Pointer Displaying Function described in paragraphs [3738] through [3775] (FIGS. 996 through 1021); House Item Pin-pointing Function described in paragraphs [3776] through [3935] (FIGS. 1022 through 1152); Membership Administrating Function described in paragraphs [3936] through [3978] (FIGS. 1153 through 1188); Keyword Search Timer Recording Function described in paragraphs [3979] through [4070] (FIGS. 1189 through 1254); Weather Forecast Displaying Function described in paragraphs [4071] through [4112] (FIGS. 1255 through 1288); Multiple Language Displaying Function described in paragraphs [4113] through [4170] (FIGS. 1289 through 1331); Caller's Information Displaying Function described in paragraphs [4171] through [4224] (FIGS. 1332 through 1375); Communication Device Remote Controlling Function (By Phone) described in paragraphs [4225] through [4265] (FIGS. 1394 through 1415); Communication Device Remote Controlling Function (By Web) described in paragraphs [4266] through [4306] (FIGS. 1416 through 1437);

Shortcut Icon Displaying Function described in paragraphs [4307] through [4334] (FIGS. 1438 through 1455); Task Tray Icon Displaying Function described in paragraphs [4335] through [4357] (FIGS. 1456 through 1470); Multiple Channel Processing Function described in paragraphs [4358] through [4405] (FIGS. 1471 through 1498); Solar Battery Charging Function described in paragraphs [4406] through [4419] (FIGS. 1499 through 1509); OS Updating Function described in paragraphs [4420] through [4487] (FIGS. 1510 through 1575); Device Managing Function described in paragraphs [4488] through [4505] (FIGS. 1576 through 1587); Automobile Controlling Function described in paragraphs [4506] through [4554] (FIGS. 1588 through 1627); OCR Function described in paragraphs [4555] through [4590] (FIGS. 1628 through 1652); Real-time GPS Function described in paragraphs [4591] through [4660] (FIGS. 1653 through 1712); CCD Video Stabilizing Function described in paragraphs [4661] through [4692] (FIGS. 1713 through 1736); DVD Remote Controlling Function described in paragraphs [4693] through [4731] (FIGS. 1737 through 1757); Dual Frame Buffer Implementing Function described in paragraphs [4732] through [4748] (FIGS. 1758 through 1767); Mouse Pointer Image Auto Changing Function described in paragraphs [4749] through [4762] (FIGS. 1768 through 1774); Dual CCD Camera Function described in paragraphs [4763] through [4783] (FIGS. 1775a through 1786); Radio Tuner Function described in paragraphs [4784] through [4814] (FIGS. 1787 through 1812); Registered Voice Recognizing Function described in paragraphs [4815] through [4854] (FIGS. 1813 through 1842); Host's TV Resolution Converting Function described in paragraphs [4855] through [4884] (FIGS. 1843 through 1864); Voice Shortcut Recognizing Function described in paragraphs [4885] through [4919] (FIGS. 1865 through 1889); Vital Sign Monitoring Function described in paragraphs [4920] through [5009] (FIGS. 1890a through 1954); Three-Dimensional Map described in (FIGS. 2 and 3); Auto Collision Avoiding Function described in (FIGS. 4 through 7); Remote Controlling System described in (FIG. 8a through FIG. 10); Emergency Landing System described in (FIG. 11 through FIG. 12b); Connection Between Host H And Carrier 300 described in (FIG. 13); 3D Map Data Updating Function described in (FIGS. 16 through 30); Auto Collision Avoiding Function—Other Embodiments described in (FIGS. 31 through 34); Satellite TV Function described in (FIGS. 35 through 50); Wireless Communication Facilitating System described in (FIGS. 51 through 64b); Three-Dimensional Map described in (??); Attached File Emailing Function described in paragraphs [5009.1] through [5009.13] (FIGS. 1955 through 1961); Movie eTicket Function described in paragraphs [5009.14] through [5009.66] (FIGS. 1962 through 2002); Carrier Prepaid eCard Function described in paragraphs [5009.67] through [5009.104] (FIGS. 2003 through 2032); Carrier ePass Function described in paragraphs [5009.105] through [5009.144] (FIGS. 2033 through 2061b); Communication Device 200 Installed In Carrier described in paragraphs [5009.145] and [5009.146] (FIG. 2062); Wireless Communication Facilitating System described in paragraphs [5009.147] through [5009.176] (FIGS. 2063 through 2076b); In-Carrier Notifying Function described in paragraphs [5009.177] through [5009.207] (FIGS. 2077 through 2093); Station Name Notifying Function described in paragraphs [5009.208] through [5009.237] (FIGS. 2094 through 2110); Restaurant eMenu Function described in paragraphs [5009.238] through [5009.280] (FIGS. 2111 through 2144); Geographic Location Recording Function described in paragraphs [5009.281] through [5009.322] (FIGS. 2145 through 2176b); CCD Dictionary Function described in paragraphs [5009.323] through [5009.347] (FIGS. 2177 through 2195b); Schedule Notifying Function described in paragraphs [5009.348] through [5009.374] (FIGS. 2196 through 2215); Customized Device Purchasing System described in paragraphs [5009.375] through [5009.415] (FIGS. 2216 through 2250); Multiple Type TV Program Distributing System described in paragraphs [5009.416] through [5009.446] (FIGS. 2251 through 2274); Multiple TV Screen Displaying Function described in paragraphs [5009.447] through [5009.478] (FIGS. 2275 through 2297); Touch Panel Function described in paragraphs [5009.479] through [5009.504] (FIGS. 2298 through 2315); Communication Device Finding Function described in paragraphs [5009.505] through [5009.516] (FIGS. 2316 through 2322); Carrier Safety Measure Controlling Function described in paragraphs [5009.517] through [5009.551] (FIGS. 2323 through 2342); Product Information Retrieving Function (CCD) described in paragraphs [5009.552] through [5009.580] (FIGS. 2343 through 2360); Product Information Stored Chip Function described in paragraphs [5009.581] through [5009.618] (FIGS. 2361 through 2385); Karaoke Playing Function described in paragraphs [5009.619] through [5009.647] (FIGS. 2386 through 2406); Performing Pattern Identifying Anti-Virus Function described in paragraphs [5009.648] through [5009.670] (FIGS. 2407 through 2421); Continue Enabled Video Game Function described in paragraphs [5009.671] through [5009.693] (FIGS. 2422 through 2436); Resume Enabled Video Game Function described in paragraphs [5009.694] through [5009.716] (FIGS. 2437 through 2451); Signal Forwarding Function described in paragraphs [5009.717] through [5009.745] (FIGS. 2452 through 2472); In-Carrier Auto Implementing Mode Function described in paragraphs [5009.746] through [5009.775] (FIGS. 2473 through 2492); Voice Message Displaying Function described in paragraphs [5009.776] through [5009.796] (FIGS. 2493 through 2503c); Human Toes Displaying Function described in paragraphs [5009.797] through [5009.814] (FIGS. 2504 through 2521); Wrinkles/Muscles Displaying Function described in paragraphs [5009.815] through [5009.856] (FIGS. 2522a through 2552e); Protruded Body Part Displaying Function described in paragraphs [5009.857] through [5009.876] (FIGS. 2553 through 2566b); Satellite TV Program Displaying Function described in paragraphs [5009.877] through [5009.921] (FIGS. 2567 through 2601); Definition of Communication Device 200 described in paragraphs [5009.922] and [5009.923] (no drawings); Remote Parameter Setting Function described in paragraphs [5009.924] through [5009.1017] (FIGS. 2602 through 2682); Multiple Sender's Email Address Function described in paragraphs [5009.1018] through [5009.1035] (FIGS. 2683 through 2695); Multiple Phone Number Function described in paragraphs [5009.1036] through [5009.1055] (FIGS. 2696 through 2709); TV Commercial Customizing Function described in paragraphs [5009.1056] through [5009.1085] (FIGS. 2710 through 2732c); Common Video Game Platform Function described in paragraphs [5009.1086] through [5009.1102] (FIGS. 2733 through 2741); Directory Displaying Function described in paragraphs [5009.1103] through [5009.1130] (FIGS. 2742 through 2761); Directory Customizing Function described in paragraphs [5009.1131] through [5009.1186] (FIGS. 2762 through 2807); Host's Directory Customizing Function described in paragraphs [5009.1187] through [5009.1246] (FIGS. 2808 through 2853); Trash Can Function described in paragraphs [5009.1247] through [5009.1295] (FIGS. 2854 through 2895f); Motion Character Displaying Function described in paragraphs [5009.1296] through [5009.1318] (FIGS. 2896 through 2909); Bookmark Displaying Function described in paragraphs [5009.1319] through [5009.1374] (FIGS. 2910 through 2955); CCD/LCD Function described in paragraphs [5009.1375] through [5009.1387] (FIGS. 2956 through 2959b); Pop Up Window Blocking Function described in paragraphs [5009.1388] through [5009.1401] (FIGS. 2960 through 2965); Map Heading Up Function described in paragraphs [5009.1402] through [5009.1421] (FIGS. 2966 through 2976); Copy Once Function described in paragraphs [5009.1422] through [5009.1443] (FIGS. 2977 through 2991); Copy Restricted Software Integrated Data described in paragraphs [5009.1444] through [5009.1457] (FIGS. 2992 through 2998); Folder Sharing Function described in paragraphs [5009.1458] through [5009.1508] (FIGS. 2999 through 3038c); Email Folder Managing Function described in paragraphs [5009.1509] through [5009.1577] (FIGS. 3039 through 3092e); Power On Auto Software Executing Function described in paragraphs [5009.1578] through [5009.1594] (FIGS. 3093 through 3103); Enhanced TV Remote Controlling Function described in paragraphs [5009.1595] through [5009.1639] (FIGS. 3104 through 3137c); 3 CCD Unit Function described in paragraphs [5009.1640] through [5009.1660] (FIGS. 3138 through 3150c); Multiple Direction Scrolling Function described in paragraphs [5009.1661] through [5009.1762] (FIGS. 3151 through 3238); Radio Frequency Soft Handover Function described in paragraphs [5009.1763] through [5009.1793] (FIGS. 3239 through 3262); Inter Com Function described in paragraphs [5009.1794] through [5009.1816] (FIGS. 3263 through 3277c); Website History Recording Function described in paragraphs [5009.1817] through [5009.1870] (FIGS. 3278 through 3324); Motion Picture Thumbnail Displaying Function described in paragraphs [5009.1871] through [5009.1908] (FIGS. 3325 through 3353b); 2D/3D Map Displaying Function described in paragraphs [5009.1909] through [5009.1952] (FIGS. 3354 through 3380b); Remote Schedule Notifying Function described in paragraphs [5009.1953] through [5009.1975] (FIGS. 3381 through 3393); Remote Email Notifying Function described in paragraphs [5009.1976] through [5009.2000] (FIGS. 3394 through 3406); Remote Document Printing Function described in paragraphs [5009.2001] through [5009.2022] (FIGS. 3407 through 3419b); Anti-virus Protection Identifying Function described in paragraphs [5009.2023] through [5009.2043] (FIGS. 3420 through 3431c); Alphanumeric Phone Number Dialing Function described in paragraphs [5009.2044] through [5009.2076] (FIGS. 3432 through 3453b); Automobile License Number Dialing Function described in paragraphs [5009.2077] through [5009.2109] (FIGS. 3454 through 3475b); Point Card Function described in paragraphs [5009.2110] through [5009.2147] (FIGS. 3476 through 3504c); Display Sharing Function described in paragraphs [5009.2148] through [5009.2169] (FIGS. 3505 through 3516); Email Filtering Function described in paragraphs [5009.2170] through [5009.2212] (FIGS. 3517 through 3549); Received Email Auto Sorting Function described in paragraphs [5009.2213] through [5009.2238] (FIGS. 3550 through 3565b); Sent Email Auto Sorting Function described in paragraphs [5009.2239] through [5009.2264] (FIGS. 3566 through 3581b); Country Name Displaying Function described in paragraphs [5009.2265] through [5009.2286] (FIGS. 3582 through 3595); Email Attached File Splitting Function described in paragraphs [5009.2287] through [5009.2300] (FIGS. 3596 through 3603c); Auto TV Starting Function described in paragraphs [5009.2301] through [5009.2329] (FIGS. 3604 through 3623); Enhanced TV Program Replaying Function (Communication Device 200) described in paragraphs [5009.2330] through [5009.2361] (FIGS. 3624 through 3648b); Enhanced TV Program Replaying Function (Host H) described in paragraphs [5009.2362] through [5009.2400] (FIGS. 3649 through 3680b); Enhanced TV Program Replaying Function (Devices A and B) described in paragraphs [5009.2401] through [5009.2440] (FIGS. 3681 through 3712b); Enhanced TV Program Replaying Function (Host H, and Devices A and B) described in paragraphs [5009.2441] through [5009.2491] (FIGS. 3713 through 3754b); TV Commercial Skipping Function described in paragraphs [5009.2492] through [5009.2516] (FIGS. 3755 through 3772); Timer Schedule Auto Changing Function described in paragraphs [5009.2517] through [5009.2542] (FIGS. 3773 through 3789); Remote Alarm Setting Function described in paragraphs [5009.2543] through [5009.2585] (FIGS. 3789a through 3817b); Current Location Non-notifying Function described in paragraphs [5009.2586] through [5009.2612] (FIGS. 3818 through 3833); Device Remotely Locking Function described in paragraphs [5009.2613] through [5009.2644] (FIGS. 3834 through 3857); EZ Macro Function described in paragraphs [5009.2645] through [5009.2668] (FIGS. 3858 through 3873b); Alcohol Level Identifying Function described in paragraphs [5009.2669] through [5009.2694] (FIGS. 3874 through 3889b); Displayed Visual Data Size Modifying Function described in paragraphs [5009.2695] through [5009.2729] (FIGS. 3890 through 3915); Button Size Changing Function described in paragraphs [5009.2730] through [5009.2758] (FIGS. 3916 through 3937); Epayment Sound Selecting Function described in paragraphs [5009.2759] through [5009.2778] (FIGS. 3938 through 3950c); Multiple TV Program Recording Function described in paragraphs [5009.2779] through [5009.2823] (FIGS. 3951 through 3988); TV Program Data Trashcan Function described in paragraphs [5009.2824] through [5009.2856] (FIGS. 3989 through 4010b); Ereceipt Producing Function described in paragraphs [5009.2857] through [5009.2888] (FIGS. 4011 through 4033); Memo Sharing Function described in paragraphs [5009.2889] through [5009.2930] (FIGS. 4034 through 4064); Selected Function Remotely Freezing Function described in paragraphs [5009.2931] through [5009.2964] (FIGS. 4065 through 4085); Selected Software Remotely Activating Function described in paragraphs [5009.2965] through [5009.2998] (FIGS. 4086 through 4106); Selected Function Remotely Activating Function described in paragraphs [5009.2999] through [5009.3032] (FIGS. 4107 through 4127); Selected Software Remotely Freezing Function described in paragraphs [5009.3033] through [5009.3066] (FIGS. 4128 through 4148); Selected Data Remotely Deleting Function described in paragraphs [5009.3067] through [5009.3100] (FIGS. 4149 through 4169); Web Cash Memory Function described in paragraphs [5009.3101] through [5009.3122] (FIGS. 4170 through 4183b); Keypad Auto Unlocking Function described in paragraphs [5009.3123] through [5009.3145] (FIGS. 4184 through 4199); Voice Recog Sys Auto Unlocking Function described in paragraphs [5009.3146] through [5009.3168] (FIGS. 4200 through 4215); Upgraded Voice Recog Sys Auto Unlocking Function described in paragraphs [5009.3169] through [5009.3192] (FIGS. 4216 through 4231); TV Program Information Displaying Function described in paragraphs [5009.3193] through [5009.3215] (FIGS. 4232 through 4247b); Best Signal Auto Selecting Function described in paragraphs [5009.3216] through [5009.3269] (FIGS. 4248 through 4291); Software Timer Activating Function described in paragraphs [5009.3270] through [5009.3295] (FIGS. 4292 through 4305b); Software Timer Terminating Function described in paragraphs [5009.3296] through [5009.3321] (FIGS. 4306 through 4319b); Software Timer Deleting Function described in paragraphs [5009.3322] through [5009.3347] (FIGS. 4320 through 4333b); TV Phone Recording Function described in paragraphs [5009.3348] through [5009.3381] (FIGS. 4334 through 4358b); Hybrid GPS Function described in paragraphs [5009.3382] through [5009.3421] (FIGS. 4359 through 4381); Elevator Controlling Function described in paragraphs [5009.3422] through [5009.3447] (FIGS. 4382 through 4397); Device Migrating Function described in paragraphs [5009.3448] through [5009.3509] (FIGS. 4398 through 4445b); Cordless Phone Connecting Function described in paragraphs [5009.3510] through [5009.3547] (FIGS. 4446 through 4474b); Cash Deposit Function described in paragraphs [5009.3548] through [5009.3585] (FIGS. 4475 through 4497d); Highway Fee Auto Paying Function described in paragraphs [5009.3586] through [5009.3616] (FIGS. 4498 through 4518f); By Distance Auto Action Function described in paragraphs [5009.3617] through [5009.3639] (FIGS. 4519 through 4532); Emoney Transferring Function described in paragraphs [5009.3640] through [5009.3666] (FIGS. 4533 through 4548c); Coupon Disposing Function described in paragraphs [5009.3667] through [5009.3698] (FIGS. 4549 through 4569); Multiple Device Searching Function described in paragraphs [5009.3699] through [5009.3717] (FIGS. 4570 through 4581b); Battery Meter Notifying Function described in paragraphs [5009.3718] through [5009.3737] (FIGS. 4582 through 4593b); Software Infrared Transmitting Function described in paragraphs [5009.3738] through [5009.3759] (FIGS. 4594 through 4606); Electronic Key Function described in paragraphs [5009.3760] through [5009.3824] (FIGS. 4607 through 4647b); Automobile Status Monitoring Function described in paragraphs [5009.3825] through [5009.3885] (FIGS. 4648 through 4691); Enhanced Business Card Transferring Function described in paragraphs [5009.3886] through [5009.3928] (FIGS. 4692 through 4720c); Removal Media Data Transferring Function described in paragraphs [5009.3929] through [5009.3954] (FIGS. 4721 through 4737c); Audiovisual Data Sharing Function described in paragraphs [5009.3955] through [5009.3992] (FIGS. 4738 through 4763b); Email Attachment Supplementing Function described in paragraphs [5009.3993] through [5009.4012] (FIGS. 4764 through 4775c); Other Device File Emailing Function described in paragraphs [5009.4013] through [5009.4043] (FIGS. 4776 through 4799b); Slide Authoring Function described in paragraphs [5009.4044] through [5009.4082] (FIGS. 4800 through 4828); Remote/Local Credit Card Transaction Function described in paragraphs [5009.4083] through [5009.4119] (FIGS. 4829 through 4855d); Unread Email Sorting Function described in paragraphs [5009.4120] through [5009.4166] (FIGS. 4856 through 4890); TV Program Replying Function described in paragraphs [5009.4167] through [5009.4200] (FIGS. 4891 through 4914); PC Keyboard Function described in paragraphs [5009.4201] through [5009.4212] (FIGS. 4915 through 4920b); Antenna Mark Displaying Function described in paragraphs [5009.4213] through [5009.4228] (FIGS. 4921 through 4928b); Enhanced Caller ID Displaying Function described in paragraphs [5009.4229] through [5009.4264] (FIGS. 4929 through 4951c); Enhanced Call Waiting Function described in paragraphs [5009.4265] through [5009.4300] (FIGS. 4952 through 4974c); Phonebook Auto Icon Displaying Function described in paragraphs [5009.4301] through [5009.4332] (FIGS. 4975 through 4996); One Click Call Back Function described in paragraphs [5009.4333] through [5009.4357] (FIGS. 4997 through 5014); Phone Conversation Storing Function described in paragraphs [5009.4358] through [5009.4386] (FIGS. 5015 through 5031c); Caller ID Requesting Function described in paragraphs [5009.4387] through [5009.4410] (FIGS. 5032 through 5045c); Phone Call Audio Notifying Function described in paragraphs [5009.4411] through [5009.4433] (FIGS. 5046 through 5059c); Entry Phone Function described in paragraphs [5009.4434] through [5009.4459] (FIGS. 5060 through 5074b); FAX Sending/Receiving Function described in paragraphs [5009.4460] through [5009.4505] (FIGS. 5075 through 5108b); Other Device's Phone Book Utilizing Function described in paragraphs [5009.4506] through [5009.4536] (FIGS. 5109 through 5128); Multiple Program Executing Function described in paragraphs [5009.4537] through [5009.4564] (FIGS. 5129 through 5148); Removal Medium Operating Function described in paragraphs [5009.4565] through [5009.4601] (FIGS. 5149 through 5178); Removal Medium Audiovisual Data Recording Function described in paragraphs [5009.4602] through [5009.4629] (FIGS. 5178a through 5199); Nearest Printer Selecting Function described in paragraphs [5009.4630] through [5009.4656] (FIGS. 5200 through 5216d); In-Cabin Com Function described in paragraphs [5009.4657] through [5009.4680] (FIGS. 5217 through 5233c); Carrier Current Condition Notifying Function described in paragraphs [5009.4681] through [5009.4710] (FIGS. 5234 through 5251b); Virtual Space Creating Function described in paragraphs [5009.4711] through [5009.4743] (FIGS. 5252 through 5274); Security Camera Function described in paragraphs [5009.4744] through [5009.4778] (FIGS. 5275 through 5295); Remote Camera Controlling Function described in paragraphs [5009.4779] through [5009.4820] (FIGS. 5296 through 5326); Day/Night Camera Function described in paragraphs [5009.4821] through [5009.4851] (FIGS. 5327 through 5346); Multiple Wireless Signal Handover Function described in paragraphs [5009.4852] through [5009.4897] (FIGS. 5347 through 5365); Multiple Tab Web Browsing Function described in paragraphs [5009.4898] through [5009.4926] (FIGS. 5366 through 5388); Multiple Tab Visual Data Viewing Function described in paragraphs [5009.4927] through [5009.4955] (FIGS. 5389 through 5411); Multiple Tab Document Data Viewing Function described in paragraphs [5009.4956] through [5009.4984] (FIGS. 5412 through 5434); Multiple Tab Email Data Viewing Function described in paragraphs [5009.4985] through [5009.5013] (FIGS. 5435 through 5457); Convenient TV Remote Controlling Function described in paragraphs [5009.5014] through [5009.5034] (FIGS. 5458 through 5471); Form Auto Filling Function described in paragraphs [5009.5035] through [5009.5072] (FIGS. 5472 through 5495e); Hybrid Carrier Function described in paragraphs [5009.5073] through [5009.5105] (FIGS. 5496 through 5522b); Carrier Current Condition Monitoring Function described in paragraphs [5009.5106] through [5009.5141] (FIGS. 5523 through 5546c); Memory Defragmenting Function described in paragraphs [5009.5142] through [5009.5175] (FIGS. 5547 through 5568); Memory Formatting Function described in paragraphs [5009.5176] through [5009.5209] (FIGS. 5569 through 5590); Memory Partitioning Function described in paragraphs [5009.5210] through [5009.5243] (FIGS. 5591 through 5612); TV Phone Pausing Function described in paragraphs [5009.5244] through [5009.5268] (FIGS. 5613 through 5629); Reflecting Object Displaying Function described in paragraphs [5009.5269] through [5009.5294]

(FIGS. 5630 through 5648c); Alternative TV Program Receiving Function described in paragraphs [5009.5295] through [5009.5325] (FIGS. 5649 through 5670c); Alternative Radio Program Receiving Function described in paragraphs [5009.5326] through [5009.5356] (FIGS. 5671 through 5692c); Audiovisual Auto Fading Function described in paragraphs [5009.5357] through [5009.5377] (FIGS. 5693 through 5706); Audio Auto Fading Function described in paragraphs [5009.5378] through [5009.5398] (FIGS. 5707 through 5720); Video-In-Video Displaying Function described in paragraphs [5009.5399] through [5009.5431] (FIGS. 5721 through 5747b); Pre-Installed Item Purchasing Function described in paragraphs [5009.5432] through [5009.5470] (FIGS. 5748 through 5775b); Multiple CPU Function described in paragraphs [5009.5471] through [5009.5476] (FIGS. 5776 and 5777); Radio Music Downloading Function described in paragraphs [5009.5477] through [5009.5516] (FIGS. 5778 through 5807); File Auto Saving Function described in paragraphs [5009.5517] through [5009.5559] (FIGS. 5808 through 5837b); TV Tuner Function described in paragraphs [5009.5560] through [5009.5600] (FIGS. 5838 through 5866); GPS Receiver's Log Function described in paragraphs [5009.5601] through [5009.5629] (FIGS. 5867 through 5884b); Remote Room Light Controlling Function described in paragraphs [5009.5630] through [5009.5662] (FIGS. 5885 through 5906b); Remote Kitchen Stove Controlling Function described in paragraphs [5009.5663] through [5009.5695] (FIGS. 5907 through 5928b); Remote Refrigerator Controlling Function described in paragraphs [5009.5696] through [5009.5728] (FIGS. 5929 through 5950b); Remote Washing Machine Controlling Function described in paragraphs [5009.5729] through [5009.5761] (FIGS. 5951 through 5972b); Remote Faucet Controlling Function described in paragraphs [5009.5762] through [5009.5794] (FIGS. 5973 through 5994b); Remote Door Lock Controlling Function described in paragraphs [5009.5795] through [5009.5827] (FIGS. 5995 through 6016b); Remote Air Conditioner Controlling Function described in paragraphs [5009.5828] through [5009.5860] (FIGS. 6017 through 6038b); Remote Vending Machine Controlling Function described in paragraphs [5009.5861] through [5009.5893] (FIGS. 6039 through 6060b); Remote Video Recorder Controlling Function described in paragraphs [5009.5894] through [5009.5926] (FIGS. 6061 through 6082b); Remote Printer Controlling Function described in paragraphs [5009.5927] through [5009.5959] (FIGS. 6083 through 6104b); Remote Camera Controlling Function described in paragraphs [5009.5960] through [5009.5992] (FIGS. 6105 through 6126b); Remote TV Tuner Controlling Function described in paragraphs [5009.5993] through [5009.6025] (FIGS. 6127 through 6148b); Remote Radio Tuner Controlling Function described in paragraphs [5009.6026] through [5009.6058] (FIGS. 6149 through 6170b); Remote Computer Controlling Function described in paragraphs [5009.6059] through [5009.6091] (FIGS. 6171 through 6192b); Remote Carrier Controlling Function described in paragraphs [5009.6092] through [5009.6124] (FIGS. 6193 through 6214b); Remote Food Processor Controlling Function described in paragraphs [5009.6125] through [5009.6157] (FIGS. 6215 and 6236b); Remote Dryer Controlling Function described in paragraphs [5009.6158] through [5009.6190] (FIGS. 6237 and 6258b); Remote Rice Cooker Controlling Function described in paragraphs [5009.6191] through [5009.6223] (FIGS. 6259 and 6280b); Remote Sound Outputting Device Controlling Function described in paragraphs [5009.6224] through [5009.6256] (FIGS. 6281 and 6302b); Remote Vacuum Cleaner Controlling Function described in paragraphs [5009.6257] through [5009.6289] (FIGS. 6303 and 6324b); Remote FAX Machine Controlling Function described in paragraphs [5009.6290] through [5009.6322] (FIGS. 6325 and 6346b); Remote Copying Machine Controlling Function described in paragraphs [5009.6323] through [5009.6355] (FIGS. 6347 and 6368b); Remote Coffee Maker Controlling Function described in paragraphs [5009.6356] through [5009.6388] (FIGS. 6369 and 6390b); Remote Scanner Controlling Function described in paragraphs [5009.6389] through [5009.6421] (FIGS. 6391 and 6412b); Remote Clothes Iron Controlling Function described in paragraphs [5009.6422] through [5009.6454] (FIGS. 6413 and 6434b); Remote Escalator Controlling Function described in paragraphs [5009.6455] through [5009.6487] (FIGS. 6435 and 6456b); Vending Machine Accessing Function described in paragraphs [5009.6488] through [5009.6527] (FIGS. 6457 through 6485d); Audiovisual Data Shuffling Function described in paragraphs [5009.6528] through [5009.6551] (FIGS. 6486 through 6503b); Unknown File Icon Displaying Function described in paragraphs [5009.6552] through [5009.6575] (FIGS. 6504 through 6521c); Audiovisual Document Producing Function described in paragraphs [5009.6576] through [5009.6601] (FIGS. 6522 through 6539b); Audiovisual Data Searching Function described in paragraphs [5009.6602] through [5009.6626] (FIGS. 6540 through 6558b); Finger Print Log-on Function described in paragraphs [5009.6627] through [5009.6645] (FIGS. 6559 through 6571c); Voice Print Log-on Function described in paragraphs [5009.6646] through [5009.6663] (FIGS. 6572 through 6583c); Finger Print Screen Saver Deactivating Function described in paragraphs [5009.6664] through [5009.6682] (FIGS. 6584 through 6596c); Voice Print Screen Saver Deactivating Function described in paragraphs [5009.6683] through [5009.6700] (FIGS. 6597 through 6608c); Finger Print Folder Accessing Function described in paragraphs [5009.6701] through [5009.6719] (FIGS. 6609 through 6621c); Voice Print Folder Accessing Function described in paragraphs [5009.6720] through [5009.6737] (FIGS. 6622 through 6633c); Finger Print File Accessing Function described in paragraphs [5009.6738] through [5009.6756] (FIGS. 6634 through 6646c); Voice Print File Accessing Function described in paragraphs [5009.6757] through [5009.6774] (FIGS. 6647 through 6658c); Finger Print Internet Accessing Function described in paragraphs [5009.6775] through [5009.6793] (FIGS. 6659 through 6671c); Voice Print Internet Accessing Function described in paragraphs [5009.6794] through [5009.6811] (FIGS. 6672 through 6683c); Finger Print PC Log-on Function described in paragraphs [5009.6812] through [5009.6838] (FIGS. 6684 through 6703b); Voice Print PC Log-on Function described in paragraphs [5009.6839] through [5009.6864] (FIGS. 6704 through 6722b); Finger Print PC Screen Saver Deactivating Function described in paragraphs [5009.6865] through [5009.6891] (FIGS. 6723 through 6742b); Voice Print PC Screen Saver Deactivating Function described in paragraphs [5009.6892] through [5009.6917] (FIGS. 6743 through 6761b); Finger Print PC Folder Accessing Function described in paragraphs [5009.6918] through [5009.6944] (FIGS. 6762 through 6781b); Voice Print PC Folder Accessing Function described in paragraphs [5009.6945] through [5009.6970] (FIGS. 6782 through 6800b); Finger Print PC File Accessing Function described in paragraphs [5009.6971] through [5009.6997] (FIGS. 6801 through 6820b); Voice Print PC File Accessing Function described in paragraphs [5009.6998] through [5009.7023] (FIGS. 6821 through 6839b); Finger Print PC Internet Accessing Function described in paragraphs

[5009.7024] through [5009.7050] (FIGS. 6840 through 6859b); Voice Print PC Internet Accessing Function described in paragraphs [5009.7051] through [5009.7076] (FIGS. 6860 through 6878b); Shock Proof Memory Function described in paragraphs [5009.7077] through [5009.7093] (FIGS. 6879 through 6889b); Remote Audiovisual Device Controlling Function described in paragraphs [5009.7094] through [5009.7133] (FIGS. 6890 through 6916); Direct TV-Audio Phone Switching Function described in paragraphs [5009.7134] through [5009.7157] (FIGS. 6917 through 6932b); Audiovisual Data Downloading Function described in paragraphs [5009.7158] through [5009.7218] (FIGS. 6933 through 6972); Audio Data Downloading Function described in paragraphs [5009.7219] through [5009.7279] (FIGS. 6973 through 7012); Self-Active Encrypted Image Reader Function described in paragraphs [5009.7280] through [5009.7301] (FIGS. 7013 through 7028c); Robot Remote Controlling Function described in paragraphs [5009.7302] through [5009.7371] (FIGS. 7029 through 7071b); Home Page Displaying Function described in paragraphs [5009.7372] through [5009.7396] (FIGS. 7072 through 7090); Multiple OS Operating Function described in paragraphs [5009.7397] through [5009.7442] (FIGS. 7091 through 7130c); Audiovisual Conversation Data Forwarding Function described in paragraphs [5009.7443] through [5009.7465] (FIGS. 7131 through 7146b); Audio Conversation Data Forwarding Function described in paragraphs [5009.7466] through [5009.7488] (FIGS. 7147 through 7162b); Phone Call Auto Forwarding Function described in paragraphs [5009.7489] through [5009.7514] (FIGS. 7163 through 7180c); Wireless Communication Method Switching Function described in paragraphs [5009.7515] through [5009.7535] (FIGS. 7181 through 7194e); Drafted Email Viewing Function described in paragraphs [5009.7536] through [5009.7585] (FIGS. 7195 through 7236); Email Replying Function described in paragraphs [5009.7586] through [5009.7617] (FIGS. 7237 through 7262b); Attached File Editing Function described in paragraphs [5009.7618] through [5009.7649] (FIGS. 7263 through 7288b); Email Audiovisual Data Auto Blocking Function described in paragraphs [5009.7650] through [5009.7673] (FIGS. 7289 through 7306); HDD Stored TV Program Replaying Function described in paragraphs [5009.7674] through [5009.7695] (FIGS. 7307 through 7322b); Cooking Menu Auto Implementing Function described in paragraphs [5009.7696] through [5009.7722] (FIGS. 7323 through 7343b); Micro Wave Oven Auto Alarm Function described in paragraphs [5009.7723] through [5009.7776] (FIGS. 7344 through 7387b); Oven Temperature Remote Controlling Function described in paragraphs [5009.7777] through [5009.7830] (FIGS. 7388 through 7431c); Audio Amplifying Function described in paragraphs [5009.7831] through [5009.7848] (FIGS. 7432 through 7443b); Calorie Calculating Function described in paragraphs [5009.7849] through [5009.7868] (FIGS. 7444 through 7457b); Sickness Identifying Function described in paragraphs [5009.7869] through [5009.7902] (FIGS. 7458 through 7481b); Weather Hazard Auto Notifying Function described in paragraphs [5009.7903] through [5009.7955] (FIGS. 7482 through 7517d); Phone Call Auto Forwarding Function described in paragraphs [5009.7956] through [5009.7981] (FIGS. 7518 through 7535c); Multiple Massaging Function described in paragraphs [5009.7982] through [5009.8022] (FIGS. 7536 through 7566); Microscope Function described in paragraphs [5009.8023] through [5009.8097] (FIGS. 7567 through 7629); Door Auto Lock/Unlock Function described in paragraphs [5009.8098] through [5009.8139] (FIGS. 7630 through 7658b); Door Auto Close/Open Function described in paragraphs [5009.8140] through [5009.8181] (FIGS. 7659 through 7687b); Room Light Auto On/Off Function described in paragraphs [5009.8182] through [5009.8223] (FIGS. 7688 through 7716b); Air Conditioner Auto On/Off Function described in paragraphs [5009.8224] through [5009.8265] (FIGS. 7717 through 7745b); Heater Auto On/Off Function described in paragraphs [5009.8266] through [5009.8307] (FIGS. 7746 through 7774b); Faucet Auto On/Off Function described in paragraphs [5009.8308] through [5009.8349] (FIGS. 7775 through 7803b); Sound Outputting Device Auto On/Off Function described in paragraphs [5009.8350] through [5009.8391] (FIGS. 7804 through 7832b); Vein Print Log-on Function described in paragraphs [5009.8392] through [5009.8410] (FIGS. 7833 through 7845c); Vein Print Screen Saver Deactivating Function described in paragraphs [5009.8411] through [5009.8429] (FIGS. 7846 through 7858c); Vein Print Folder Accessing Function described in paragraphs [5009.8430] through [5009.8448] (FIGS. 7859 through 7871c); Vein Print File Accessing Function described in paragraphs [5009.8449] through [5009.8467] (FIGS. 7872 through 7884c); Vein Print Internet Accessing Function described in paragraphs [5009.8468] through [5009.8486] (FIGS. 7885 through 7897c); Vein Print PC Log-on Function described in paragraphs [5009.8487] through [5009.8513] (FIGS. 7898 through 7917b); Vein Print PC Screen Saver Deactivating Function described in paragraphs [5009.8514] through [5009.8540] (FIGS. 7918 through 7937b); Vein Print PC Folder Accessing Function described in paragraphs [5009.8541] through [5009.8567] (FIGS. 7938 through 7957b); Vein Print PC File Accessing Function described in paragraphs [5009.8568] through [5009.8594] (FIGS. 7958 through 7977b); Vein Print PC Internet Accessing Function described in paragraphs [5009.8595] through [5009.8621] (FIGS. 7978 through 7997b); Ringtone Auto Updating Function described in paragraphs [5009.8622] through [5009.8643] (FIGS. 7998 through 8013b); Time Limited Current Location Identifying Function described in paragraphs [5009.8644] through [5009.8673] (FIGS. 8014 through 8035b); In Carrier Message Inserting Function described in paragraphs [5009.8674] through [5009.8695] (FIGS. 8036 through 8050b); Electric Cable Networking Function described in paragraphs [5009.8696] through [5009.8707] (FIGS. 8051 through 8057); Shoe Sole Pressure Adjusting Function described in paragraphs [5009.8708] through [5009.8741] (FIGS. 8058 through 8080b); Finger Print Removal Media Accessing Function described in paragraphs [5009.8742] through [5009.8762] (FIGS. 8081 through 8095b); Voice Print Removal Media Accessing Function described in paragraphs [5009.8763] through [5009.8783] (FIGS. 8096 through 8110b); Vein Print Removal Media Accessing Function described in paragraphs [5009.8784] through [5009.8804] (FIGS. 8111 through 8125b); Finger Print PC Removal Media Accessing Function described in paragraphs [5009.8805] through [5009.8833] (FIGS. 8126 through 8145b); Voice Print PC Removal Media Accessing Function described in paragraphs [5009.8834] through [5009.8862] (FIGS. 8146 through 8165b); Vein Print PC Removal Media Accessing Function described in paragraphs [5009.8863] through [5009.8891] (FIGS. 8166 through 8185b); Printer Function described in paragraphs [5009.8892] through [5009.8967] (FIGS. 8186 through 8245f); Scanner Function described in paragraphs [5009.8968] through [5009.9016] (FIGS. 8246 through 8284b); Multiple Signal Transferring Function described in paragraphs [5009.9017] through [5009.9205] (FIGS. 8285 through 8453); Free Access Point Function described in paragraphs [5009.9206] through [5009.9245] (FIGS. 8454 through 8482); Partial BCC Email Function described in paragraphs [5009.9246] through [5009.9273] (FIGS. 8483 through 8504b); Noise Reversing Function described in paragraphs [5009.9274] through [5009.9291] (FIGS. 8505 through 8516); Door Status Sensoring Function described in paragraphs [5009.9292] through [5009.9345] (FIGS. 8517 through 8557); Drawer Status Sensoring Function described in paragraphs [5009.9346] through [5009.9399] (FIGS. 8558 through 8598); Window Status Sensoring Function described in paragraphs [5009.9400] through [5009.9453] (FIGS. 8599 through 8639); Curtain Status Sensoring Function described in paragraphs [5009.9454] through [5009.9509] (FIGS. 8640 through 8680); Gate Status Sensoring Function described in paragraphs [5009.9510] through [5009.9563] (FIGS. 8681 through 8721); Stop Watch Function described in paragraphs [5009.9564] through [5009.9584] (FIGS. 8722 through 8736b); Decrementing Time Function described in paragraphs [5009.9585] through [5009.9607] (FIGS. 8737 through 8753b); Energy Efficient Multiple CPU Function described in paragraphs [5009.9608] through [5009.9636] (FIGS. 8754 through 8776b); Content Notifying Function described in paragraphs [5009.9637] through [5009.9681] (FIGS. 8777 through 8809); Virtual Tilting Function described in paragraphs [5009.9682] through [5009.9720] (FIGS. 8810 through 8840); Virtual Vehicle Tilting Function described in paragraphs [5009.9721] through [5009.9758] (FIGS. 8841 through 8871); Device Approach Notifying Function described in paragraphs [5009.9759] through [5009.9801] (FIGS. 8872 through 8904); Clock Alarm Snooze Function described in paragraphs [5009.9802] through [5009.9829] (FIGS. 8905 through 8926); News Auto Outputting Function described in paragraphs [5009.9830] through [5009.9867] (FIGS. 8927 through 8958b); Advertisement Auto Outputting Function described in paragraphs [5009.9868] through [5009.9905] (FIGS. 8959 through 8990b); Online RPG Function described in paragraphs [5009.9906] through [5009.10028] (FIGS. 8991 through 9098b); Inter Device Distance Notifying Function described in paragraphs [5009.10029] through [5009.10065] (FIGS. 9099 through 9126); Link Embedded Motion Picture Displaying Function described in paragraphs [5009.10066] through [5009.10089] (FIGS. 9127 through 9141); Audiovisual Meta Data Producing Function described in paragraphs [5009.10090] through [5009.10128] (FIGS. 9142 through 9171c); Audiovisual Highlight Producing Function described in paragraphs [5009.10129] through [5009.10163] (FIGS. 9172 through 9197); Enhanced Audiovisual Highlight Producing Function described in paragraphs [5009.10164] through [5009.10196] (FIGS. 9198 through 9221); Wireless Power Off Function described in paragraphs [5009.10197] through [5009.10227] (FIGS. 9222 through 9240); Screen Layout Changing Function described in paragraphs [5009.10228] through [5009.10255] (FIGS. 9241 through 9258b); Face Feature Log-on Function described in paragraphs [5009.10256] through [5009.10273] (FIGS. 9259 through 9270c); Face Feature Screen Saver Deactivating Function described in paragraphs [5009.10274] through [5009.10291] (FIGS. 9271 through 9282c); Face Feature Folder Accessing Function described in paragraphs [5009.10292] through [5009.10309] (FIGS. 9283 through 9294c); Face Feature File Accessing Function described in paragraphs [5009.10310] through [5009.10327] (FIGS. 9295 through 9306c); Face Feature Internet Accessing Function described in paragraphs [5009.10328] through [5009.10345] (FIGS. 9307 through 9318c); Face Feature PC Log-on Function described in paragraphs [5009.10346] through [5009.10371] (FIGS. 9319 through 9337b); Face Feature PC Screen Saver Deactivating Function described in paragraphs [5009.10372] through [5009.10397] (FIGS. 9338 through 9356b); Face Feature PC Folder Accessing Function described in paragraphs [5009.10398] through [5009.10423] (FIGS. 9357 through 9375b); Face Feature PC File Accessing Function described in paragraphs [5009.10424] through [5009.10449] (FIGS. 9376 through 9394b); Face Feature PC Internet Accessing Function described in paragraphs [5009.10450] through [5009.10475] (FIGS. 9395 through 9413b); Face Feature Removal Media Accessing Function described in paragraphs [5009.10476] through [5009.10496] (FIGS. 9414 through 9428b); Face Feature PC Removal Media Accessing Function described in paragraphs [5009.10497] through [5009.10524] (FIGS. 9429 through 9448b); Security Formatted Removal Media Function described in paragraphs [5009.10525] through [5009.10545] (FIGS. 9449 through 9463b); Lite Security Formatted Removal Media Function described in paragraphs [5009.10546] through [5009.10568] (FIGS. 9464 through 9480b); Security Formatted Folder Function described in paragraphs [5009.10569] through [5009.10605] (FIGS. 9481 through 9509b); Host Host Security Formatted Folder Function described in paragraphs [5009.10606] through [5009.10631] (FIGS. 9510 through 9528); Email Security Formatted Folder Function described in paragraphs [5009.10632] through [5009.10668] (FIGS. 9529 through 9557b); Host Email Security Formatted Folder Function described in paragraphs [5009.10669] through [5009.10694] (FIGS. 9558 through 9576); Secured Email Sending Function described in paragraphs [5009.10695] through [5009.10726] (FIGS. 9577 through 9599c); Secured Email Receiving Function described in paragraphs [5009.10727] through [5009.10746] (FIGS. 9600 through 9613); Received Email Security Auto Sorting Function described in paragraphs [5009.10747] through [5009.10770] (FIGS. 9614 through 9629b); Secured Email Opening Function described in paragraphs [5009.10771] through [5009.10793] (FIGS. 9630 through 9645b); Secured Email Attached File Opening Function described in paragraphs [5009.10794] through [5009.10818] (FIGS. 9646 through 9663b); Secured Email Attached File Deleting Function described in paragraphs [5009.10819] through [5009.10845] (FIGS. 9664 through 9679b); Unsafe Email Host Handled Function described in paragraphs [5009.10846] through [5009.10873] (FIGS. 9680 through 9701b); Unsafe Attached File Host Handled Function described in paragraphs [5009.10874] through [5009.10901] (FIGS. 9702 through 9723c); Com Stored Email Viewing Function described in paragraphs [5009.10902] through [5009.10925] (FIGS. 9724 through 9741c); Non-secured Email Forwarding Function described in paragraphs [5009.10926] through [5009.10950] (FIGS. 9742 through 9759b); Electronic Money Transferring Function described in paragraphs [5009.10951] through [5009.10993] (FIGS. 9760 through 9790b); Electronic Money Time Identified Transferring Function described in paragraphs [5009.10994] through [5009.11051] (FIGS. 9791 through 9835b); Electronic Money Repeatedly Transferring Function described in paragraphs [5009.11052] through [5009.11117] (FIGS. 9836 through 9888b); Electronic Money Transfer Canceling Function described in paragraphs [5009.11118] through [5009.11194] (FIGS. 9889 through 9952b); Electronic Money Email Transferring Function described in paragraphs [5009.11195] through [5009.11238] (FIGS. 9953 through 9985c); Money Email Time Identified Transferring Function described in paragraphs [5009.11239] through [5009.11286] (FIGS. 9986 through 10022c); Money Email Repeatedly Transferring Function described in paragraphs [5009.11287] through [5009.11338] (FIGS. 10023 through 10063c); Electronic Money Email Transfer Canceling Function described in paragraphs [5009.11339] through [5009.11405] (FIGS. 10064 through 10119c); Address Book Administrating Function described in paragraphs [5009.11406] through [5009.11451] (FIGS. 10120 through 10152b); File Synchronizing Function described in paragraphs [5009.11452] through [5009.11578] (FIGS. 10153 through 10263b); Folder Synchronizing Function described in paragraphs [5009.11579] through [5009.11671] (FIGS. 10264 through 10342b); Area Dependent Software Activating Function described in paragraphs [5009.11672] through [5009.11702] (FIGS. 10343 through 10366b); Area Dependent Message Displaying Function described in paragraphs [5009.11703] through [5009.11730] (FIGS. 10367 through 10388); Visible Light Schedule Communicating Function described in paragraphs [5009.11731] through [5009.11796] (FIGS. 10389 through 10437b); Visible Light Web Address Communicating Function described in paragraphs [5009.11797] through [5009.11862] (FIGS. 10438 through 10486b); Visible Light Software Program Communicating Function described in paragraphs [5009.11863] through [5009.11928] (FIGS. 10487 through 10535b); Visible Light Restaurant Menu Communicating Function described in paragraphs [5009.11929] through [5009.11994] (FIGS. 10536 through 10584b); Visible Light TV Listing Communicating Function described in paragraphs [5009.11995] through [5009.12060] (FIGS. 10585 through 10633b); Visible Light Movie Listing Communicating Function described in paragraphs [5009.12061] through [5009.12126] (FIGS. 10634 through 10682b); Visible Light Product Advertisement Communicating Function described in paragraphs [5009.12127] through [5009.12192] (FIGS. 10683 through 10731b); Visible Light Message Communicating Function described in paragraphs [5009.12193] through [5009.12258] (FIGS. 10732 through 10780b); Visible Light Visual Clip Communicating Function described in paragraphs [5009.12259] through [5009.12324] (FIGS. 10781 through 10829b); Visible Light Weather Forecast Communicating Function described in paragraphs [5009.12325] through [5009.12390] (FIGS. 10830 through 10878b); Visible Light News Clip Communicating Function described in paragraphs [5009.12391] through [5009.12456] (FIGS. 10879 through 10927b); Visible Light Map Clip Communicating Function described in paragraphs [5009.12457] through [5009.12522] (FIGS. 10928 through 10976b); File Thumbnail Preview Function described in paragraphs [5009.12523] through [5009.12555] (FIGS. 10977 through 11002b); Taxi Fare Credit Card Payment Function described in paragraphs [5009.12556] through [5009.12632] (FIGS. 11003 through 11067); Taxi Fare Electronic Money Payment Function described in paragraphs [5009.12633] through [5009.12712] (FIGS. 11068 through 11132); Taxi Destination Identifying Function described in paragraphs [5009.12713] through [5009.12783] (FIGS. 11133 through 11194); Taxi Destination Map Displaying Function described in paragraphs [5009.12784] through [5009.12860] (FIGS. 11195 through 11262); QR Code Schedule Communicating Function described in paragraphs [5009.12861] through [5009.12906] (FIGS. 11263 through 11298b); QR Code Web Address Communicating Function described in paragraphs [5009.12907] through [5009.12952] (FIGS. 11299 through 11334b); QR Code Software Program Communicating Function described in paragraphs [5009.12953] through [5009.12998] (FIGS. 11335 through 11370b); QR Code Restaurant Menu Communicating Function described in paragraphs [5009.12999] through [5009.13044] (FIGS. 11371 through 11406b); QR Code TV Listing Communicating Function described in paragraphs [5009.13045] through [5009.13090] (FIGS. 11407 through 11442b); QR Code Movie Listing Communicating Function described in paragraphs [5009.13091] through [5009.13136] (FIGS. 11443 through 11478b); QR Code Product Advertisement Communicating Function described in paragraphs [5009.13137] through [5009.13182] (FIGS. 11479 through 11514b); QR Code Message Communicating Function described in paragraphs [5009.13183] through [5009.13228] (FIGS. 11515 through 11550b); QR Code Visual Clip Communicating Function described in paragraphs [5009.13229] through [5009.13274] (FIGS. 11551 through 11586b); QR Code Weather Forecast Communicating Function described in paragraphs [5009.13275] through [5009.13320] (FIGS. 11587 through 11622b); QR Code News Clip Communicating Function described in paragraphs [5009.13321] through [5009.13366] (FIGS. 11623 through 11658b); QR Code Map Clip Communicating Function described in paragraphs [5009.13367] through [5009.13412] (FIGS. 11659 through 11694b); QR Code Software Activating Function described in paragraphs [5009.13413] through [5009.13458] (FIGS. 11695 through 11730b); RFID Schedule Communicating Function described in paragraphs [5009.13459] through [5009.13508] (FIGS. 11731 through 11770b); RFID Web Address Communicating Function described in paragraphs [5009.13509] through [5009.13558] (FIGS. 11771 through 11810b); RFID Software Program Communicating Function described in paragraphs [5009.13559] through [5009.13608] (FIGS. 11811 through 11850b); RFID Restaurant Menu Communicating Function described in paragraphs [5009.13609] through [5009.13658] (FIGS. 11851 through 11890b); RFID TV Listing Communicating Function described in paragraphs [5009.13659] through [5009.13708] (FIGS. 11891 through 11930b); RFID Movie Listing Communicating Function described in paragraphs [5009.13709] through [5009.13758] (FIGS. 11931 through 11970b); RFID Product Advertisement Communicating Function described in paragraphs [5009.13759] through [5009.13808] (FIGS. 11971 through 12010b); RFID Message Communicating Function described in paragraphs [5009.13809] through [5009.13858] (FIGS. 12011 through 12050b); RFID Visual Clip Communicating Function described in paragraphs [5009.13859] through [5009.13908] (FIGS. 12051 through 12090b); RFID Weather Forecast Communicating Function described in paragraphs [5009.13909] through [5009.13958] (FIGS. 12091 through 12130b); RFID News Clip Communicating Function described in paragraphs [5009.13959] through [5009.14008] (FIGS. 12131 through 12170b); RFID Map Clip Communicating Function described in paragraphs [5009.14009] through [5009.14058] (FIGS. 12171 through 12210b); RFID Software Activating Function described in paragraphs [5009.14059] through [5009.14108] (FIGS. 12211 through 12250b); RFID Software Auto Activating Function described in paragraphs [5009.14109] through [5009.14158] (FIGS. 12251 through 12290b); Carrier Arrival Time Displaying Function described in paragraphs [5009.14159] through [5009.14283] (FIGS. 12291 through 12401); Multiple Audio Outputting Function described in paragraphs [5009.14284] through [5009.14310] (FIGS. 12402 through 12419); Closest Device Notifying Function described in paragraphs [5009.14311] through [5009.14416] (FIGS. 12420 through 12515); Print Screen Function described in paragraphs [5009.14417] through [5009.14474] (FIGS. 12516 through 12559b); Caller Answering Machine Activating Function described in paragraphs [5009.14475] through [5009.14513]

(FIGS. 12560 through 12587); Audiovisual Answering Machine Function described in paragraphs [5009.14514] through [5009.14546] (FIGS. 12588 through 12611); Answering Machine Message Forwarding Function described in paragraphs [5009.14547] through [5009.14607] (FIGS. 12612 through 12657); Area Map Displaying Function described in paragraphs [5009.14608] through [5009.14679] (FIGS. 12658 through 12721b); Road Map Displaying Function described in paragraphs [5009.14680] through [5009.14752] (FIGS. 12722 through 12785b); Email Reading Function described in paragraphs [5009.14753] through [5009.14781] (FIGS. 12786 through 12805c); Stand Alone Email Function described in paragraphs [5009.14782] through [5009.14850] (FIGS. 12806 through 12857b); TV Seamless Viewing Function described in paragraphs [5009.14851] through [5009.14896] (FIGS. 12858 through 12895); Multiple Movable Tab Web Browsing Function described in paragraphs [5009.14897] through [5009.14975] (FIGS. 12896 through 12966); Multiple Movable Tab Visual Data Viewing Function described in paragraphs [5009.14976] through [5009.15054] (FIGS. 12967 through 13037); Multiple Movable Tab Document Data Viewing Function described in paragraphs [5009.15055] through [5009.15133] (FIGS. 13038 through 13108); Multiple Movable Tab Email Data Viewing Function described in paragraphs [5009.15134] through [5009.15212] (FIGS. 13109 through 13179); Lost Com Device Memory Erasing/Rescuing Function described in paragraphs [5009.15213] through [5009.15275] (FIGS. 13180 through 13231c); Lost Com Device Beaconing Function described in paragraphs [5009.15276] through [5009.15353] (FIGS. 13232 through 13296); Area&Country Name Displaying Function described in paragraphs [5009.15354] through [5009.15437] (FIGS. 13297 through 13371); 3D Desktop Function described in paragraphs [5009.15438] through [5009.15536] (FIGS. 13372 through 13457); Carrier Auto Announcing Function described in paragraphs [5009.15537] through [5009.15586] (FIGS. 13458 through 13497b); Virtual Folder Displaying Function described in paragraphs [5009.15587] through [5009.15647] (FIGS. 13498 through 13548b); In-carrier Location Notifying Function described in paragraphs [5009.15648] through [5009.15703] (FIGS. 13549 through 13595c); Address Map Auto Displaying Function described in paragraphs [5009.15704] through [5009.15771] (FIGS. 13596 through 13650c); Brain Wave Device Controlling Function described in paragraphs [5009.15772] through [5009.15806] (FIGS. 13651 through 13679b); Brain Wave Sentence Composing Function described in paragraphs [5009.15807] through [5009.15829] (FIGS. 13680 through 13696); Wheel Standing Function described in paragraphs [5009.15830] through [5009.15858] (FIGS. 13697 through 13719); Robot Body Balancing Function described in paragraphs [5009.15859] through [5009.15905] (FIGS. 13720 through 13760); Robot Leg Balancing Function described in paragraphs [5009.15906] through [5009.15952] (FIGS. 13761 through 13801); Robot Head Balancing Function described in paragraphs [5009.15953] through [5009.15999] (FIGS. 13802 through 13842); Robot Upper Body Balancing Function described in paragraphs [5009.16000] through [5009.16045] (FIGS. 13843 through 13883); Digital Television Function described in paragraphs [5009.16046] through [5009.16075] (FIGS. 13884 through 13906); Total Price Calculating Function described in paragraphs [5009.16076] through [5009.16166] (FIGS. 13907 through 13985c); Brain Wave Carrier Controlling Function described in paragraphs [5009.16167] through [5009.16202] (FIGS. 13986 through 14015b); Electronic Billboard Controlling Function described in paragraphs [5009.16203] through [5009.16323] (FIGS. 14016 through 14123e); Common Phone Number Function described in paragraphs [5009.16324] through [5009.16424] (FIGS. 14124 through 14212c); Hybrid Common Phone Number Function described in paragraphs [5009.16425] through [5009.16525] (FIGS. 14213 through 14301c); Ringtone Volume Auto Adjusting Function described in paragraphs [5009.16526] through [5009.16547] (FIGS. 14302 through 14317b); Ringtone Type Auto Selecting Function described in paragraphs [5009.16548] through [5009.16575] (FIGS. 14318 through 14339b); Television Chatting Function described in paragraphs [5009.16576] through [5009.16650] (FIGS. 14340 through 14405); Device Battery Charging Function described in paragraphs [5009.16651] through [5009.16726] (FIGS. 14406 through 14471b); Hybrid Battery Solar Operating Function described in paragraphs [5009.16727] through [5009.16829] (FIGS. 14472 through 14561); Backup Solar Battery Operating Function described in paragraphs [5009.16830] through [5009.16932] (FIGS. 14562 through 14651); Hybrid Access Point Function described in paragraphs [5009.16933] through [5009.17169] (FIGS. 14652 through 14878g); Earphone Location Identifying Function described in paragraphs [5009.17170] through [5009.17266] (FIGS. 14879 through 14961); Microphone Location Identifying Function described in paragraphs [5009.17267] through [5009.17355] (FIGS. 14962 through 15036); Event Triggered Auto Audiovisual Recording Function described in paragraphs [5009.17356] through [5009.17402] (FIGS. 15037 through 15072b); Event Triggered Auto Audio Recording Function described in paragraphs [5009.17403] through [5009.17449] (FIGS. 15073 through 15108b); Audiovisual Message Bulk Transferring Function described in paragraphs [5009.17450] through [5009.17501] (FIGS. 15109 through 15150b); Multiple Party Conversing Function described in paragraphs [5009.17502] through [5009.17670] (FIGS. 15151 through 15299); Window Monitoring Function described in paragraphs [5009.17671] through [5009.17700] (FIGS. 15300 through 15321b); Window Status Monitoring Function described in paragraphs [5009.17701] through [5009.17730] (FIGS. 15322 through 15343b); Door Monitoring Function described in paragraphs [5009.17731] through [5009.17760] (FIGS. 15344 through 15365b); Door Monitoring Function described in paragraphs [5009.17761] through [5009.17790] (FIGS. 15366 through 15387b); Push-To-Talk Function described in paragraphs [5009.17791] through [5009.18008] (FIGS. 15388 through 15586c Push-To-T); Door Open Monitoring Function described in paragraphs [5009.18009] through [5009.18065] (FIGS. 15587 through 15633b); Window Open Monitoring Function described in paragraphs [5009.18066] through [5009.18122] (FIGS. 15634 through 15680b); Lock Open Monitoring Function described in paragraphs [5009.18123] through [5009.18179] (FIGS. 15681 through 15727b); Destination Proceeding Function described in paragraphs [5009.18180] through [5009.18265] (FIGS. 15728 through 15803d); Driver's Eye Monitoring Safety Function described in paragraphs [5009.18266] through [5009.18316] (FIGS. 15804 through 15845); Driver's Head Monitoring Safety Function described in paragraphs [5009.18317] through [5009.18365] (FIGS. 15846 through 15885); Drawer Open Monitoring Function described in paragraphs [5009.18366] through [5009.18422] (FIGS. 15886 through 15932b); Curtain Open Monitoring Function described in paragraphs [5009.18423] through [5009.18479] (FIGS. 15933 through 15979b); Gate Open Monitoring Function described in paragraphs [5009.18480] through [5009.18536] (FIGS. 15980 through 16026b); Faucet Open Monitoring Function described in paragraphs [5009.18537] through [5009.18593] (FIGS. 16027 through 16073b); Hybrid Refrigerator Function described in paragraphs [5009.18594] through [5009.18695] (FIGS. 16074 through 16159b); Multiple Purpose Chamber Function described in paragraphs [5009.18696] through [5009.18869] (FIGS. 16160 through 16312c); Audiovisual Quality Auto Adjusting Function described in paragraphs [5009.18870] through [5009.18930] (FIGS. 16313 through 16363b); Audio Quality Auto Adjusting Function described in paragraphs [5009.18931] through [5009.18991] (FIGS. 16364 through 16414b); TV Phone Quality Auto Adjusting Function described in paragraphs [5009.18992] through [5009.19100] (FIGS. 16415 through 16512); Voice Phone Quality Auto Adjusting Function described in paragraphs [5009.19101] through [5009.19209] (FIGS. 16513 through 16610); Television Related Audiovisual Downloading Function described in paragraphs [5009.19210] through [5009.19299] (FIGS. 16611 through 16687); Radio Related Audio Downloading Function described in paragraphs [5009.19300] through [5009.19389] (FIGS. 16688 through 16764); Header Displaying Function described in paragraphs [5009.19390] through [5009.19464] (FIG. 16765 through FIG. 16826b); Footer Displaying Function described in paragraphs [5009.19465] through [5009.19539] (FIG. 16827 through FIG. 16888b); Location Scheduled Notifying Function described in paragraphs [5009.19540] through [5009.19602] (FIG. 16889 through FIG. 16941e); Zone Leaving Notifying Function described in paragraphs [5009.19603] through [5009.19675] (FIG. 16942 through FIG. 17005d); Zone Entering Notifying Function described in paragraphs [5009.19676] through [5009.19748] (FIG. 17006 through FIG. 17069d); Power Off Notifying Function described in paragraphs [5009.19749] through [5009.19794] (FIG. 17070 through FIG. 17106d); Power On Notifying Function described in paragraphs [5009.19795] through [5009.19840] (FIG. 17107 through FIG. 17143d); Security Alarm On Notifying Function described in paragraphs [5009.19841] through [5009.19886] (FIG. 17144 through FIG. 17180d); Security Alarm Off Notifying Function described in paragraphs [5009.19887] through [5009.19932] (FIG. 17181 through FIG. 17217d); Email Transfer Notifying Function described in paragraphs [5009.19933] through [5009.19978] (FIG. 17218 through FIG. 17254d); Email Reception Notifying Function described in paragraphs [5009.19979] through [5009.20024] (FIG. 17255 through FIG. 17291d); Making Phone Call Notifying Function described in paragraphs [5009.20025] through [5009.20070] (FIG. 17292 through FIG. 17328d); Phone Call Reception Notifying Function described in paragraphs [5009.20071] through [5009.20116] (FIG. 17329 through FIG. 17365d); Key Pressed Notifying Function described in paragraphs [5009.20117] through [5009.20162] (FIG. 17366 through FIG. 17402d); Software Activation Notifying Function described in paragraphs [5009.20163] through [5009.20208] (FIG. 17403 through FIG. 17439d); Document Opening Notifying Function described in paragraphs [5009.20209] through [5009.20254] (FIG. 17440 through FIG. 17476d); Specified Event Notifying Function described in paragraphs [5009.20255] through [5009.20315] (FIG. 17477 through FIG. 17527d); Television Phone Auto Backup Function described in paragraphs [5009.20316] through [5009.20447] (FIG. 17528 through FIG. 17645b); File Auto Saving Function described in paragraphs [5009.20448] through [5009.20495] (FIG. 17646 through FIG. 17678b); File Compressing Function described in paragraphs [5009.20496] through [5009.20559] (FIG. 17679 through FIG. 17727e); Multiple Phone Number Billing Function described in paragraphs [5009.20560] through [5009.20609] (FIG. 17728 through FIG. 17771); Multiple Device Door Unlocking Function described in paragraphs [5009.20610] through [5009.20685] (FIG. 17772 through FIG. 17832c); Multiple Device Door Locking Function described in paragraphs [5009.20686] through [5009.20761] (FIG. 17833 through FIG. 17893c); Phone Call Making Log Recording Function described in paragraphs [5009.20762] through [5009.20815] (FIG. 17894 through FIG. 17938d); Phone Call Receiving Log Recording Function described in paragraphs [5009.20816] through [5009.20867] (FIG. 17939 through FIG. 17981d); Phone Call Making Log Exporting Function described in paragraphs [5009.20868] through [5009.20917] (FIG. 17982 through FIG. 18022d); Phone Call Receiving Log Exporting Function described in paragraphs [5009.20918] through [5009.20967] (FIG. 18023 through FIG. 18063d); Phone Call Making Log Synchronizing Function described in paragraphs [5009.20968] through [5009.21021] (FIG. 18064 through FIG. 18106f); Phone Call Receiving Log Synchronizing Function described in paragraphs [5009.21022] through [5009.21075] (FIG. 18107 through FIG. 18149f); 3D Advertisement Displaying Function described in paragraphs [5009.21076] through [5009.21217] (FIG. 18150 through FIG. 18277); Audiovisual Location Capability Function described in paragraphs [5009.21218] through [5009.21276] (FIG. 18278 through FIG. 18325c); Location Audio Notifying Function described in paragraphs [5009.21277] through [5009.21319] (FIG. 18326 through FIG. 18359b); Answering Machine Location Recording Function described in paragraphs [5009.21320] through [5009.21388] (FIG. 18360 through FIG. 18417e); Visual Phone File Sharing Function described in paragraphs [5009.21389] through [5009.21526] (FIG. 18418 through FIG. 18540b); Visual Phone Magnifying Function described in paragraphs [5009.21527] through [5009.21629] (FIG. 18541 through FIG. 18631); Multiple Home Page Displaying Function described in paragraphs [5009.21630] through [5009.21700] (FIG. 18632 through FIG. 18693b FIG. 18632 through FIG. 18693b); Multiple Visual Phone Party Location Identifying Function described in paragraphs [5009.21701] through [5009.21796] (FIG. 18694 through FIG. 18778g); Individual Party Conversation Replaying Function described in paragraphs [5009.21797] through [5009.21962] (FIG. 18779 through FIG. 18929d); Multiple Phone Notifying Function described in paragraphs [5009.21963] through [5009.22050] (FIG. 18930 through FIG. 19004i); Multiple Phone Dial Tone Function described in paragraphs [5009.22051] through [5009.22160] (FIG. 19005 through FIG. 19101f); Multiple Phone New Party Joining Function described in paragraphs [5009.22161] through [5009.22276] (FIG. 19102 through FIG. 19206j); and Music Property Setting Function described in paragraphs [5009.22277] through [5009.22302] (FIG. 19207 through FIG. 19226b).

Paragraph [0201] —<<Other Functions>>

Paragraph [0202]—For the avoidance of doubt, Communication Device 200 is capable to implement the following functions, modes, and systems: a header displaying function, wherein when a document is displayed on said display, a header is displayed in said document, a text, a font type, a font size, a font color, a location of said header displayed in said document is identified by said communication device, wherein said document and said text, said font type, said font size, said font color, and said location of said header are transferred to another device, and said another device displays said document with said header in accordance with said text, said font type, said font size, said font color, and said location received, wherein said header is said common text displayed at said upper portion of each page of said document; a footer displaying function, wherein when a document is displayed on said display, said footer is displayed in said document, a text, a font type, a font size, a font color, a location of said footer displayed in said document is identified by said communication device, wherein said document and said text, said font type, said font size, said font color, and said location of said footer are transferred to another device, and said another device displays said document with said footer in accordance with said text, said font type, said font size, said font color, and said location received, wherein said footer is said common text displayed at said upper portion of each page of said document; a location scheduled notifying function, wherein a 1st location which indicates the geographic location of said communication device is displayed on said communication device at the time and date identified by said communication device, and a 2nd location which indicates the geographic location of another device is displayed on said communication device at the time and date identified by said communication device; a zone leaving notifying function, wherein when said communication device leaves from a specific geographic zone identified by said communication device, a notice is output from said communication device and another device; a zone entering notifying function, wherein when said communication device enters a specific geographic zone identified by said communication device, a notice is output from said communication device and another device; a power off notifying function, wherein when said power of said communication device is being turned off, the geographic location of said communication device is notified to another device, a map is displayed on said another device and the geographic location of said communication device is indicated on said map, and a notification indicating that said power of said communication device is being turned off is output from said another device; a power on notifying function, wherein when said power of said communication device is being turned on, the geographic location of said communication device is notified to another device, a map is displayed on said another device and the geographic location of said communication device is indicated on said map, and a notification indicating that said power of said communication device is being turned on is output from said another device; a security alarm on notifying function, wherein when a security alarm of said communication device is activated, the geographic location of said communication device is notified to another device, a map is displayed on said another device and the geographic location of said communication device is indicated on said map, a notification indicating that said security alarm of said communication device is activated is output from said another device, a loud sound is output from said speaker when said security alarm is activated, and said communication device automatically makes an emergency call when said security alarm is activated; a security alarm off notifying function, wherein when a security alarm of said communication device is deactivated, the geographic location of said communication device is notified to another device, a map is displayed on said another device and the geographic location of said communication device is indicated on said map, a notification indicating that said security alarm of said communication device is deactivated is output from said another device, a loud sound is output from said speaker when said security alarm is activated, and said communication device automatically makes an emergency call when said security alarm is activated; an email transfer notifying function, wherein when an email is transferred via said wireless communication system, the geographic location of said communication device is notified to another device, a map is displayed on said another device and the geographic location of said communication device is indicated on said map, and a notification indicating that email is transferred is output from said another device; an email reception notifying function, wherein when an email is received via said wireless communication system, the geographic location of said communication device is notified to another device, a map is displayed on said another device and the geographic location of said communication device is indicated on said map, and a notification indicating that email is received is output from said another device; a making phone call notifying function, wherein when a phone call is implemented via said wireless communication system, the geographic location of said communication device is notified to another device, a map is displayed on said another device and the geographic location of said communication device is indicated on said map, and a notification indicating that said phone call is implemented is output from said another device; a phone call reception notifying function, wherein when a phone call is received via said wireless communication system, the geographic location of said communication device is notified to another device, a map is displayed on said another device and the geographic location of said communication device is indicated on said map, and a notification indicating that said phone call is received is output from said another device; a key pressed notifying function, wherein when a specific key of said input device is pressed, the geographic location of said communication device is notified to another device, a map is displayed on said another device and the geographic location of said communication device is indicated on said map, and a notification indicating that said specific key is pressed is output from said another device; a software activation notifying function, wherein when a specific software is activated, the geographic location of said communication device is notified to another device, a map is displayed on said another device and the geographic location of said communication device is indicated on said map, and a notification indicating that said specific software is activated is output from said another device; a document opening notifying function, wherein when a specific document is opened, the geographic location of said communication device is notified to another device, a map is displayed on said another device and the geographic location of said communication device is indicated on said map, and a notification indicating that a specific document is opened is output from said another device; a specified event notifying function, wherein when an event specified by the user of said communication device is occurred, the geographic location of said communication device is notified to another device, a map is displayed on said another device and the geographic location of said communication device is indicated on said map, and a notification indicating that said event specified by the user of said communication device is occurred is output from said another device; a television phone auto backup time lion, wherein a 1st audiovisual data which is the audiovisual data of the user of said communication device produced when implementing a television phone is automatically backed up and replayed afterwards, a 2nd audiovisual data which is the audiovisual data of the user of another device produced when implementing said television phone is automatically backed up and replayed afterwards, a 1st location data which indicates the geographic location of said communication device produced when implementing said television phone is automatically backed up and replayed afterwards, and a 2nd location data which indicates the geographic location of another device produced when implementing said television phone is automatically backed up and replayed afterwards, wherein said television phone is the function which enables the users of said communication device and said another device to converse with each other in an audiovisual fashion; a file auto saving function, wherein a file currently edited by the user of said communication device is automatically saved at a predetermined interval, a backup data of said file is produced at a predetermined interval, an original file data auto saving message data is output from said communication device and another device when said file is automatically saved, a backup file data auto saving message data is output from said communication device and said another device when said backup data of said file is produced, and said interval is capable to be identified by the user of said communication device and said another device; a file compressing function, wherein a file is compressed and a compressed file is produced by utilizing a specific format, said file is stored in a host computing system and another device, said specific format is capable to be selected by the user of said communication device, said message indicating that said file is compressed is displayed on said display, said compressed file is capable to be decompressed, when said compressed file is decompressed, a message indicating that said compressed file is decompressed is displayed on said display, and a password is required when decompressing said compressed file; a multiple phone number billing function, wherein said communication device is capable to make a phone call from a 1st phone number account and a 2nd phone number account, when a phone call is made from said 1st phone number account, a 1st phone bill is charged to said 1st phone number account, and when a phone call is made from said 2nd phone number account, a 2nd phone bill is charged to said 2nd phone number account; a multiple device door unlocking function, wherein a door is capable to be unlocked by said communication device and another device, when said door is unlocked by said communication device, a door unlocked message is displayed on said communication device and said another device, a door unlocking log is capable to be displayed on said communication device and said another device, wherein said door unlocking log includes the time and date at which said door is unlocked and an identification of the device which unlocked said door, a location data indicating the geographic locations of said communication device and said another device at which said door is unlocked is displayed on said communication device and said another device, said door is any type of door included in an artificial structure or carrier, wherein said artificial structure is a house or building, and said carrier is any type of carrier or transportation system designed to carry passenger(s); a multiple device door locking function, wherein a door is capable to be locked by said communication device and another device, when said door is locked by said communication device, a door locked message is displayed on said communication device and said another device, a door locking log is capable to be displayed on said communication device and said another device, wherein said door locking log includes the time and date at which said door is locked and an identification of the device which locked said door, a location data indicating the geographic locations of said communication device and said another device at which said door is locked is displayed on said communication device and said another device, said door is any type of door included in an artificial structure or carrier, wherein said artificial structure is a house or building, and said carrier is any type of carrier or transportation system designed to carry passenger(s); a phone call making log recording function, wherein when said voice communicating function is implemented, a phone call making log data is produced, said phone call making log data includes a selected phone number data to which said phone call was made, a current time data at which said phone call was made, a 1st location data at which said phone call was made, and/or a 2nd location data at which said phone call was made, wherein said 1st location data indicates the geographic location of said communication device, said 2nd location data indicates the geographic location of another device, when said phone call making log data is selected, said selected phone number data and said current time data are displayed on said display, and said 1st location data and said 2nd location data are indicated on said map displayed on said display of said communication device; a phone call receiving log recording function, wherein when said communication device receives a phone call, a phone call receiving log data is produced, said phone call receiving log data includes a phone number received data which indicates the phone number of a caller, a current time data at which said phone call was received, a 1st location data at which said phone call was received, a 2nd location data at which said phone call was received, and/or a personal data of said caller, when said phone call receiving log data is selected, said phone number received data, said current time data, said personal data are displayed on said display, and/or said 1st location data and said 2nd location data are indicated on said map displayed on said display; a phone call making log exporting function, wherein a phone call making log data is exported to another device, said phone call making log data includes a callee's phone number data, a phone call making time data, a callee's personal data, a 1st location data, and/or a 2nd location data, said callee's phone number data indicates the phone number of a cake, said phone call making time data indicates the time and date at which said phone call was made from said communication device, said callee's personal data indicates the data relating to said callee, said 1st location data indicates the geographic location of said communication device at which said phone call was made, said 2nd location data indicates the geographic location of said callee at which said phone call was made, and said phone call making log data is converted to a specific format when exported; a phone call receiving log exporting function, wherein a phone call receiving log data is exported to another device, said phone call receiving log data includes a caller's phone number data, a phone call receiving time data, a caller's personal data, a 1st location data, and/or a 2nd location data, said caller's phone number data indicates the phone number of a caller, said phone call receiving time data indicates the time and date at which said phone call was received by said communication device, said caller's personal data indicates the data relating to said caller, said 1st location data indicates the geographic location of said communication device at which said phone call was received, said 2nd location data indicates the geographic location of said caller at which said phone call was received, and said phone call receiving log data is converted to a specific format when exported; a phone call making log synchronizing function, wherein a phone call making log data is synchronized with another device, said phone call making log data includes a callee's phone number data, a phone call making time data, a callee's personal data, a 1st location data, and/or a 2nd location data, said callee's phone number data indicates the phone number of a callee, said phone call making time data indicates the time and date at which said phone call was made from said communication device, said callee's personal data indicates the data relating to said cake, said 1st location data indicates the geographic location of said communication device at which said phone call was made, said 2nd location data indicates the geographic location of said callee at which said phone call was made, said phone call making log data of said communication device is synchronized with said another device, and said phone call making log data of said communication device is synchronized with a host computing system; a phone call receiving tog synchronizing function, wherein a phone call receiving log data is synchronized with another device, said phone call receiving tog data includes a caller's phone number data, a phone call receiving time data, a caller's personal data, a 1st location data, and/or a 2nd location data, said caller's phone number data indicates the phone number of a caller, said phone call receiving time data indicates the time and date at which a phone call was received by said communication device, said caller's personal data indicates the data relating to said caller, said 1st location data indicates the geographic location of said communication device at which said phone call was received, said 2nd location data indicates the geographic location of said caller at which said phone call was received, said phone call receiving log data of said communication device is synchronized with said another device, said phone call receiving log data of said communication device is synchronized with a host computer; a 3D advertisement displaying function, wherein an advertisement is displayed in said computer generated three dimensional space, when said advertisement is selected, the website relating to said advertisement is displayed on said display, said advertisement is displayed by utilizing three dimensional image, said computer generated three dimensional space is a 3D game space, a 1st object, a game character, operated by the user of said communication device is located in said computer generated three dimensional space, a 2nd object, another game character, operated by the user of another device is located in said computer generated three dimensional space; an audiovisual location capability function, wherein when an audiovisual data is produced by utilizing said microphone and a camera of said communication device, the geographic location of said communication device is identified, and when said audiovisual data is output from said communication device, an audiovisual data geographic location which indicates the geographic location of said communication device at which said audiovisual data is produced is indicated on said display of said communication device, said audiovisual data geographic location is indicated on said display of said communication device by displaying the street address corresponding to said audiovisual data geographic location, said audiovisual data geographic location is indicated on said display of said communication device by identifying said audiovisual data geographic location on a map displayed on said display of said communication device, said audiovisual data is output from said another device, and said audiovisual data geographic location is indicated on the display of said another device by displaying the street address corresponding to said audiovisual data geographic location, said audiovisual data is output from said another device, and said audiovisual data geographic location is indicated on the display of said another device by identifying said audiovisual data geographic location on said map displayed on the display of said another device; a location audio notifying function, wherein a current location of said communication device is output in an audio fashion from said speaker, a street address corresponding to said current location is output in an audio fashion from said speaker, said street address corresponding to said current location is displayed on said display, and said current location is identified on said map displayed on said display; an answering machine location recording function, wherein when replaying a message left to the user of said communication device, a 1st location indicating the location of said communication device at which said message is left and a 2nd location indicating the location of another device at which said message is left are indicated on said communication device and said another device; a visual phone file sharing function, wherein a visual data of the user of said communication device is displayed on the display of another device, and a file displayed on said display of said communication device is displayed on the display of said another device, a mouse pointer controlled by the user of said communication device is displayed on the display of said another device, a personal data of the user of said communication device is displayed on the display of said another device, a street address corresponding to the current location of said communication device is displayed on the display of said another device, and the current locations of said communication device and said another device are indicated on said map displayed on said display; a visual phone magnifying function, wherein a 1st visual data and a 2nd visual data are displayed on said display of said communication device, said 1st visual data is the visual data retrieved via a camera of said communication device, said 2nd visual data is the visual data retrieved via the camera of another device, and a portion of said 1st visual data is magnified and displayed on said display of said communication device, a portion of said 2nd visual data is magnified and displayed on said display of said communication device, said portions of said 1st visual data and said 2nd visual data are identified by utilizing said mouse pointer; a multiple home page displaying function, wherein when an Internet browser is activated, a 1st home page and a 2nd home page are displayed on said display; a multiple visual phone party location identifying function, wherein when a personal data of the user of another device is displayed before implementing a visual phone, a 1st current location which indicates the current geographic location of said communication device and a 2nd current location which indicates the current geographic location of said another device are indicated on a map data displayed on said display of said communication device; an individual party conversation replaying function, wherein after implementing a visual phone between said communication device and another device, the audiovisual data of said communication device, the audiovisual data of said another device, or both are replayed by a command input by the user of said communication device, the coordinates of said communication device and said another device at which said visual phone is implemented are displayed on said display of said communication device, the street addresses at which said communication device and said another device are located at the time said visual phone is implemented are displayed on said display of said communication device, the locations of said communication device and said another device at the time said visual phone is implemented are indicated on said map displayed on said display of said communication device, the audiovisual data selected by the user of said, communication device is output from said communication device, and the location of the device corresponding to said audiovisual data selected is indicated on said display of said communication device; a multiple phone notifying function, wherein when a two-party communication request is received from another device, a 2nd ringtone is output from said communication device, and when a three-party communication request is received from said another device, a 3rd ringtone is output from said communication device, the coordinates of said communication device and said another device at which said request is received are displayed on said display of said communication device, the street addresses at which said communication device and said another device are located at the time said request is received are displayed on said display of said communication device, the locations of said communication device and said another device at the time said request is received are indicated on a map displayed on said display of said communication device; a multiple phone dial tone function, wherein when initiating a two-party communication, a 2nd dial tone is output from said communication device, and when initiating a three-party communication, a 3rd dial tone is output from said communication device, said 2nd dial tone or said 3rd dial tone is output from another device which is the callee's device; a multiple phone new party joining function, wherein when said communication device receives a phone call from a 3rd device while implementing a two-party communication with another device, a notice indicating that a phone call is received is output from said communication device, and a three-party communication is implemented including said 3rd device thereafter; and a music property setting function, wherein a music property data of each music audio data is set by the user of said communication device, said music property data indicates either to replay the corresponding music audio data repeatedly or replay said corresponding music audio data only for once, and when said music audio data is replayed, said music audio data is replayed repeatedly or only for once in accordance with said corresponding music property data.

The invention claimed is:

1. A system comprising:
a first communication device; and
a second communication device;
wherein each of said first communication device and said second communication device includes an input device, a microphone, a speaker, a display, and an antenna;
wherein a door is operable to be locked by said first communication device, wherein said door is the door included in an artificial structure or carrier, wherein said artificial structure is a house or building and said carrier is a vehicle designed to carry passenger(s);
wherein when said door is locked by said first communication device, a door locked message is operable to be displayed on said first communication device and/or said second communication device, a door locking log is operable to be displayed on said first communication device and/or said second communication device, wherein said door locking log includes the time and date at which said door is locked and the identification of said first communication device which locked said door, and the location data indicating the geographic locations of said first communication device and/or said second communication device at which said door is locked is operable to be displayed on said first communication device and/or said second communication device;
wherein when said door is unlocked by said first communication device, a door unlocked message is operable to be displayed on said first communication device and/or said second communication device, a door unlocking log is operable to be displayed on said first communication device and/or said second communication device, wherein said door unlocking log includes the time and date at which said door is unlocked and the identification of said first communication device which unlocked said door, and the location data indicating the geographic locations of said first communication device and/or said second communication device at which said door is unlocked is operable to be displayed on said first communication device and said second communication device; and
wherein when a phone call is received by said first communication device, a phone call receiving log data is produced, wherein said phone call receiving log data includes a caller's device identification which is the identification of a caller's device from which said phone call is received, a phone call receiving time/date data which indicates the time and/or date at which said phone call is received, a first location data which indicates the geographic location of said first communication device when said phone call is received, and/or a second location data which indicates the geographic location of said caller's device when said phone call is received, and said phone call receiving log data is operable to be displayed on said first communication device.

2. The system of claim 1, wherein said first communication device is a handheld device.

3. The system of claim 1, wherein said second communication device is a handheld device.

4. The system of claim 1, wherein said first communication device is a mobile phone.

5. The system of claim 1, wherein said second communication device is a mobile phone.

6. The system of claim 1, wherein said first communication device and said second communication device are operable to implement voice communication with each other.

7. A system comprising:
a first communication device; and
a second communication device;
wherein a door is operable to be locked by said first communication device, wherein said door is the door included in an artificial structure or carrier, wherein said artificial structure is a house or building and said carrier is a vehicle designed to carry passenger(s);
wherein when said door is locked by said first communication device, a door locked message is operable to be displayed on said first communication device and/or said second communication device, a door locking log is operable to be displayed on said first communication device and/or said second communication device, wherein said door locking log includes the time and date at which said door is locked and/or the identification of said first communication device which locked said door, and the location data indicating the geographic locations of said first communication device and/or said second communication device at which said door is locked is operable to be displayed on said first communication device and/or said second communication device;
wherein when said door is unlocked by said first communication device, a door unlocked message is operable to be displayed on said first communication device and/or said second communication device, a door unlocking log is operable to be displayed on said first communication device and/or said second communication device, wherein said door unlocking log includes the time and date at which said door is unlocked and/or the identification of said first communication device which unlocked said door, and the location data indicating the geographic locations of said first communication device and/or said second communication device at which said door is unlocked is operable to be displayed on said first communication device and/or said second communication device; and
wherein when a phone call is received by said first communication device, a phone call receiving log data is produced, wherein said phone call receiving log data includes a caller's device identification which is the identification of a caller's device from which said phone call is received, a phone call receiving time/date data which indicates the time and/or date at which said phone call is received, a first location data which indicates the geographic location of said first communication device when said phone call is received, and/or a second location data which indicates the geographic location of said caller's device when said phone call is received, and said phone call receiving log data is operable to be displayed on said first communication device.

8. The system of claim 7, wherein said first communication device is a handheld device.

9. The system of claim 7, wherein said second communication device is a handheld device.

10. The system of claim 7, wherein said first communication device is a mobile phone.

11. The system of claim 7, wherein said second communication device is a mobile phone.

12. The system of claim 7, wherein said first communication device and said second communication device are operable to implement voice communication with each other.

13. A system comprising:
a first communication device; and
a second communication device;
wherein a door is operable to be locked by said first communication device, wherein said door is the door included in an artificial structure or carrier, wherein said artificial structure is a house or building and said carrier is a vehicle designed to carry passenger(s);
wherein when said door is locked by said first communication device, a door locked message is operable to be displayed on said first communication device and/or said second communication device, and a door locking log is operable to be displayed on said first communication device and/or said second communication device, wherein said door locking log includes the time and date at which said door is locked and the identification of said first communication device which locked said door;
wherein when said door is unlocked by said first communication device, a door unlocked message is operable to be displayed on said first communication device and/or said second communication device, and a door unlocking log is operable to be displayed on said first communication device and/or said second communication device, wherein said door unlocking log includes the time and date at which said door is unlocked and the identification of said first communication device which unlocked said door; and
wherein when a phone call is received by said first communication device, a phone call receiving log data is produced, wherein said phone call receiving log data includes a caller's device identification which is the identification of a caller's device from which said phone call is received, a phone call receiving time/date data which indicates the time and/or date at which said phone call is received, a first location data which indicates the geographic location of said first communication device when said phone call is received, and/or a second location data which indicates the geographic location of said caller's device when said phone call is received, and said phone call receiving log data is operable to be displayed on said first communication device.

14. The system of claim 13, wherein said first communication device is a handheld device.

15. The system of claim 13, wherein said second communication device is a handheld device.

16. The system of claim 13, wherein said first communication device is a mobile phone.

17. The system of claim 13, wherein said second communication device is a mobile phone.

18. The system of claim 13, wherein said first communication device and said second communication device are operable to implement voice communication with each other.

* * * * *